US010241527B2

(12) United States Patent
Fadell et al.

(10) Patent No.: US 10,241,527 B2
(45) Date of Patent: Mar. 26, 2019

(54) THERMOSTAT GRAPHICAL USER INTERFACE

(75) Inventors: Anthony M. Fadell, Portola Valley, CA (US); Matthew L. Rogers, Los Gatos, CA (US); David Sloo, Menlo Park, CA (US); Michael J. Matas, San Francisco, CA (US); Michael Plitkins, Berkeley, CA (US)

(73) Assignee: Google LLC, Mountain View, CA (US)

( * ) Notice: Subject to any disclaimer, the term of this patent is extended or adjusted under 35 U.S.C. 154(b) by 568 days.

(21) Appl. No.: 13/356,762

(22) Filed: Jan. 24, 2012

(65) Prior Publication Data
US 2012/0131504 A1 May 24, 2012

Related U.S. Application Data

(63) Continuation-in-part of application No. PCT/US2011/061437, filed on Nov. 18, 2011, and a
(Continued)

(51) Int. Cl.
*G06F 3/0481* (2013.01)
*G06F 3/0482* (2013.01)
(Continued)

(52) U.S. Cl.
CPC ..... *G05D 23/1904* (2013.01); *F24D 19/1084* (2013.01); *F24F 11/30* (2018.01); *F24F 11/52* (2018.01)

(58) Field of Classification Search
USPC ........................................ 715/810, 764, 855
See application file for complete search history.

(56) References Cited

U.S. PATENT DOCUMENTS 2,558,648 A  6/1951  Gausmann
4,316,577 A  2/1982  Adams et al.
(Continued)

FOREIGN PATENT DOCUMENTS

DE   196 09 390 A1   9/1997
EP   0 207 295 A1    1/1987
(Continued)

OTHER PUBLICATIONS

Author Unknown, "Honeywell T8700C, An Electronic Round™ Programmable Thermostat—Owner's Guide," Honeywell, Inc., 1997, 12 pages.
(Continued)

*Primary Examiner* — Ryan F Pitaro
*Assistant Examiner* — Erik V Stitt
(74) *Attorney, Agent, or Firm* — Kilpatrick Townsend & Stockton LLP

(57) ABSTRACT

A thermostat for controlling an HVAC system is described, the thermostat having a user interface that is visually pleasing, approachable, and easy to use while also providing intuitive navigation within a menuing system. In a first mode of operation, an electronic display of the thermostat displays a population of tick marks arranged in an arcuate arrangement including a plurality of background tick marks, a setpoint tick mark representing a setpoint temperature, and an ambient temperature tick mark representing an ambient temperature, the setpoint temperature being dynamically changeable according to a tracked rotational input motion of a ring-shaped user interface component of the thermostat. In a second mode, the a plurality of user-selectable menu options is displayed in an arcuate arrangement along a menu option range area, and respective ones of the user-selectable menu options are selectively highlighted according to the
(Continued)

tracked rotational input motion of the ring-shaped user interface component.

20 Claims, 24 Drawing Sheets

Related U.S. Application Data continuation-in-part of application No. 13/269,501, filed on Oct. 7, 2011, now Pat. No. 8,918,219, which is a continuation-in-part of application No. 13/033,573, filed on Feb. 23, 2011, now Pat. No. 9,223,323, application No. 13/356,762, which is a continuation-in-part of application No. 13/033,573, filed on Feb. 23, 2011, now Pat. No. 9,223,323.

(60) Provisional application No. 61/627,996, filed on Oct. 21, 2011, provisional application No. 61/429,093, filed on Dec. 31, 2010, provisional application No. 61/415,771, filed on Nov. 19, 2010.

(51) Int. Cl.
| | | |
|---|---|---|
| G06F 3/0483 | (2013.01) | |
| G06F 3/0485 | (2013.01) | |
| G06Q 10/10 | (2012.01) | |
| G05D 23/19 | (2006.01) | |
| F24D 19/10 | (2006.01) | |
| F24F 11/30 | (2018.01) | |
| F24F 11/52 | (2018.01) | |

(56) References Cited

U.S. PATENT DOCUMENTS

| | | |
|---|---|---|
| 4,613,139 A | 9/1986 | Robinson, II |
| 4,621,336 A | 11/1986 | Brown |
| 4,751,961 A | 6/1988 | Levine et al. |
| 4,768,706 A | 9/1988 | Parfitt |
| 5,005,365 A | 4/1991 | Lynch |
| 5,224,649 A | 7/1993 | Brown et al. |
| 5,294,047 A | 3/1994 | Schwer et al. |
| 5,395,042 A | 3/1995 | Riley et al. |
| 5,482,209 A | 1/1996 | Cochran et al. |
| 5,485,954 A | 1/1996 | Guy et al. |
| 5,555,927 A | 9/1996 | Shah |
| 5,603,451 A | 2/1997 | Helander et al. |
| 5,627,531 A * | 5/1997 | Posso et al. ............... 341/22 |
| 5,673,850 A | 10/1997 | Uptegraph |
| 5,779,143 A | 7/1998 | Michaud et al. |
| 5,808,602 A * | 9/1998 | Sellers ............... 345/157 |
| 5,931,378 A | 8/1999 | Schramm |
| 6,032,867 A | 3/2000 | Dushane et al. |
| 6,164,374 A | 12/2000 | Rhodes et al. |
| 6,206,295 B1 | 3/2001 | LaCoste |
| 6,211,921 B1 * | 4/2001 | Cherian et al. ............ 348/565 |
| 6,213,404 B1 | 4/2001 | Dushane et al. |
| 6,286,764 B1 | 9/2001 | Garvey et al. |
| 6,298,285 B1 | 10/2001 | Addink et al. |
| 6,318,639 B1 * | 11/2001 | Toth ............... 236/46 R |
| 6,351,693 B1 | 2/2002 | Monie et al. |
| 6,453,687 B2 | 9/2002 | Sharood et al. |
| 6,502,758 B2 | 1/2003 | Cottrell |
| 6,519,509 B1 | 2/2003 | Nierlich et al. |
| D471,825 S | 3/2003 | Peabody |
| 6,595,430 B1 | 7/2003 | Shah |
| 6,636,197 B1 | 10/2003 | Goldenberg et al. |
| 6,641,054 B2 | 11/2003 | Morey |
| 6,641,055 B1 | 11/2003 | Tiernan |
| 6,644,557 B1 | 11/2003 | Jacobs |
| 6,726,112 B1 * | 4/2004 | Ho ............... 236/94 |
| 6,814,299 B1 | 11/2004 | Carey |
| 6,824,069 B2 | 11/2004 | Rosen |
| 6,851,621 B1 | 2/2005 | Wacker et al. |
| D503,631 S | 4/2005 | Peabody |
| 6,951,306 B2 | 10/2005 | DeLuca |
| 7,000,849 B2 | 2/2006 | Ashworth et al. |
| 7,028,912 B1 | 4/2006 | Rosen |
| 7,035,805 B1 | 4/2006 | Miller |
| 7,055,759 B2 | 6/2006 | Wacker et al. |
| 7,083,109 B2 | 8/2006 | Pouchak |
| 7,108,194 B1 | 9/2006 | Hankins, II |
| 7,109,970 B1 | 9/2006 | Miller |
| 7,111,788 B2 * | 9/2006 | Reponen ............... 235/472.01 |
| 7,114,554 B2 | 10/2006 | Bergman et al. |
| 7,140,551 B2 | 11/2006 | de Pauw et al. |
| 7,141,748 B2 | 11/2006 | Tanaka et al. |
| 7,142,948 B2 | 11/2006 | Metz |
| 7,152,806 B1 | 12/2006 | Rosen |
| 7,159,789 B2 | 1/2007 | Schwendinger et al. |
| 7,159,790 B2 | 1/2007 | Schwendinger et al. |
| 7,181,317 B2 | 2/2007 | Amundson et al. |
| 7,222,494 B2 | 5/2007 | Peterson et al. |
| 7,222,800 B2 | 5/2007 | Wruck |
| 7,225,054 B2 | 5/2007 | Amundson et al. |
| 7,258,280 B2 | 8/2007 | Wolfson |
| 7,264,175 B2 | 9/2007 | Schwendinger et al. |
| 7,274,972 B2 | 9/2007 | Amundson et al. |
| 7,287,709 B2 | 10/2007 | Proffitt et al. |
| 7,299,996 B2 | 11/2007 | Garrett et al. |
| 7,302,642 B2 | 11/2007 | Smith et al. |
| 7,333,880 B2 | 2/2008 | Brewster et al. |
| D566,587 S | 4/2008 | Rosen |
| 7,434,742 B2 | 10/2008 | Mueller et al. |
| 7,451,937 B2 | 11/2008 | Flood et al. |
| 7,455,240 B2 * | 11/2008 | Chapman et al. ............ 236/91 D |
| 7,509,753 B2 * | 3/2009 | Nicosia et al. ............... 33/716 |
| 7,555,364 B2 | 6/2009 | Poth et al. |
| 7,558,648 B2 | 7/2009 | Hoglund et al. |
| 7,584,899 B2 | 9/2009 | de Pauw et al. |
| 7,600,694 B2 | 10/2009 | Helt et al. |
| D603,277 S | 11/2009 | Clausen et al. |
| 7,614,567 B2 | 11/2009 | Chapman, Jr. et al. |
| 7,624,931 B2 | 12/2009 | Chapman, Jr. et al. |
| 7,634,504 B2 | 12/2009 | Amundson |
| 7,641,126 B2 | 1/2010 | Schultz et al. |
| 7,667,163 B2 | 2/2010 | Ashworth et al. |
| 7,693,582 B2 | 4/2010 | Bergman et al. |
| 7,703,694 B2 | 4/2010 | Mueller et al. |
| D614,976 S | 5/2010 | Skafdrup et al. |
| 7,802,618 B2 | 9/2010 | Simon et al. |
| 7,845,576 B2 | 12/2010 | Siddaramanna et al. |
| 7,890,195 B2 | 2/2011 | Bergman et al. |
| 7,904,209 B2 | 3/2011 | Podgorny et al. |
| 7,904,830 B2 | 3/2011 | Hoglund et al. |
| 7,913,925 B2 | 3/2011 | Ashworth |
| D651,529 S | 1/2012 | Mongell et al. |
| 8,195,313 B1 | 6/2012 | Fadell et al. |
| 8,280,536 B1 | 10/2012 | Fadell et al. |
| 2002/0005435 A1 | 1/2002 | Cottrell |
| 2003/0034898 A1 | 2/2003 | Shamoon et al. |
| 2003/0042320 A1 | 3/2003 | Decker |
| 2004/0034484 A1 * | 2/2004 | Solomita et al. ............... 702/62 |
| 2004/0055446 A1 | 3/2004 | Robbin et al. |
| 2004/0256472 A1 | 12/2004 | DeLuca |
| 2004/0260427 A1 | 12/2004 | Wimsatt |
| 2004/0262410 A1 | 12/2004 | Hull |
| 2005/0119766 A1 | 6/2005 | Amundson et al. |
| 2005/0204997 A1 | 9/2005 | Fournier |
| 2007/0001830 A1 * | 1/2007 | Dagci et al. ............... 340/438 |
| 2007/0045430 A1 | 3/2007 | Chapman, Jr. et al. |
| 2007/0045433 A1 | 3/2007 | Chapman, Jr. et al. |
| 2007/0045444 A1 * | 3/2007 | Gray et al. ............... 236/94 |
| 2007/0050732 A1 * | 3/2007 | Chapman et al. ............ 715/810 |
| 2007/0057079 A1 | 3/2007 | Stark et al. |
| 2007/0158442 A1 | 7/2007 | Chapman, Jr. et al. |
| 2007/0158444 A1 | 7/2007 | Naujok et al. |
| 2007/0173978 A1 | 7/2007 | Fein et al. |
| 2007/0225867 A1 | 9/2007 | Moorer et al. |
| 2007/0227721 A1 | 10/2007 | Springer et al. |
| 2007/0228183 A1 | 10/2007 | Kennedy et al. |
| 2007/0241203 A1 | 10/2007 | Wagner et al. |
| 2007/0257120 A1 | 11/2007 | Chapman, Jr. et al. |

(56) References Cited

U.S. PATENT DOCUMENTS

| | | | |
|---|---|---|---|
| 2007/0278320 | A1 | 12/2007 | Lunacek et al. |
| 2008/0006709 | A1 | 1/2008 | Ashworth et al. |
| 2008/0048046 | A1 | 2/2008 | Wagner et al. |
| 2008/0054082 | A1 | 3/2008 | Evans et al. |
| 2008/0245480 | A1* | 10/2008 | Knight et al. ............ 156/378 |
| 2008/0290183 | A1 | 11/2008 | Laberge et al. |
| 2009/0001180 | A1 | 1/2009 | Siddaramanna et al. |
| 2009/0024927 | A1 | 1/2009 | Schrock et al. |
| 2009/0140056 | A1 | 6/2009 | Leen |
| 2009/0140057 | A1 | 6/2009 | Leen |
| 2009/0143916 | A1 | 6/2009 | Boll et al. |
| 2009/0283603 | A1 | 11/2009 | Peterson et al. |
| 2010/0070085 | A1 | 3/2010 | Harrod et al. |
| 2010/0070086 | A1 | 3/2010 | Harrod et al. |
| 2010/0070089 | A1 | 3/2010 | Harrod et al. |
| 2010/0070093 | A1 | 3/2010 | Harrod et al. |
| 2010/0070907 | A1 | 3/2010 | Harrod et al. |
| 2010/0084482 | A1 | 4/2010 | Kennedy et al. |
| 2010/0106305 | A1 | 4/2010 | Pavlak et al. |
| 2010/0107070 | A1 | 4/2010 | Devineni et al. |
| 2010/0107076 | A1 | 4/2010 | Grohman et al. |
| 2010/0198425 | A1 | 8/2010 | Donovan |
| 2010/0289643 | A1 | 11/2010 | Trundle et al. |
| 2010/0318227 | A1 | 12/2010 | Steinberg et al. |
| 2011/0015798 | A1 | 1/2011 | Golden et al. |
| 2011/0015802 | A1 | 1/2011 | Imes |
| 2011/0046756 | A1 | 2/2011 | Park |
| 2012/0130547 | A1 | 5/2012 | Fadell et al. |

FOREIGN PATENT DOCUMENTS

| | | | |
|---|---|---|---|
| EP | 434926 | A2 | 7/1991 |
| EP | 0 720 077 | A2 | 7/1996 |
| EP | 0 802 471 | A2 | 10/1997 |
| EP | 1 065 079 | A2 | 1/2001 |
| EP | 1 731 984 | A1 | 12/2006 |
| EP | 1 283 396 | B1 | 3/2007 |
| EP | 2 157 492 | A2 | 2/2010 |
| EP | 1 703 356 | B1 | 9/2011 |
| GB | 2212317 | B | 5/1992 |
| JP | 59106311 | A | 6/1984 |
| JP | 2002087050 | A | 3/2002 |
| JP | 2003054290 | A | 2/2003 |
| NL | 1024986 | C2 | 6/2005 |
| WO | 200248851 | A2 | 6/2002 |
| WO | WO 2005/019740 | A1 | 3/2005 |
| WO | WO 2009/073496 | A2 | 6/2009 |
| WO | WO 2011/128416 | A2 | 10/2011 |

OTHER PUBLICATIONS

Author Unknown, "Honeywell T8775 The Digital Round™ Thermostat," Honeywell, 2003, 2 pages.
Author Unknown "Honeywell CT8775A,C, The Digital Round™ Non-Programmable Thermostats™ Owner's Guide," Honeywell International Inc., 2003, 20 pages.
Author Unknown, "Honeywell CT2700, An Electronic Round™ Programmable Thermostat—User's Guide," Honeywell, Inc., 1997, 8 pages.
Sanford, G., "iPod (Click Wheel) (2004)," www.apple-history.com, 1996-2012, [retrieved on Apr. 9, 2012], 2 pages. Retrieved from: http://apple-history.com/ipod.
Chen et al., "Demand Response-Enabled Residential Thermostat Controls," Abstract, ACEEE Summer Study on Energy Efficiency in Buildings, 2008, pp. 1-24 through 1-36, Mechanical Engineering Dept. and Architecture Dept., University of California Berkeley.
Peffer et al., "A Tale of Two Houses: The Human Dimension of Demand Response Enabling Technology from a Case Study of Adaptive Wireless Thermostat," Abstract, ACEEE Summer Study on Energy Efficiency in Buildings, 2008, pp. 7-242 through 7-253, Architecture Dept. and Mechanical Engineering Dept., University of California Berkeley.
Arens et al., "New Thermostat Demand Response Enbling Technology," Poster, Jun. 10, 2004, University of California Berkeley.
Auslander et al., "UC Berkeley DR Research Energy Management Group," Power Point Presentation, DR ETD Workshop, Jun. 11, 2007, pp. 1-35, State of California Energy Commission.
Arens et al., "Demand Response Enabling Technology Development," Phase I Report: Jun. 2003-Nov. 2005, Jul. 27, pp. 1-108, P:/DemandRes/UC Papers/DR-Phase1Report-Final DraftApril24-2006.doc, University of California Berkeley.
Dr. Peffer et al., "Smart Comfort At Home: Design of a residential thermostat to achieve thermal comfort, and save money and peak energy," Poster, Mar. 2007, University of California Berkeley.
Honeywell T8775A,C Digital Round Thermostat Manual No. 69-1679EF-1, Jun. 2004, p. 1-16, www.honeywell.com/yourhome.
The Clever Thermostat, ICY BV Web Page, http://www.icy.nl/en/consumer/products/clever-thermostate, 2012 ICY BV, 1 page.
The Clever Thermostat User Manual and Installation Guide, ICY BV ICY3815 Timer-Thermostat, 2009, pp. 1-36.
Meier et al., "Thermostat Interface and Usability: A Survey," Sep. 2010, pp. 1-73, Ernest Orlando Lawrence Berkeley National Laboratory, Environmental Energy Technologies Division, Berkeley, California.
Green, Lee, "Thermo Heat Tech Cool," Oct. 1985, pp. 155-158, Popular Mechanics Electronic Thermostat Guide.
Salus, "S-Series Digital Thermostat Instruction Manual-ST620 Model No. Instruction Manual," Apr. 29, 2010, 24 pages, Version 005, www.salus-tech.com.
Salus, "S-Series Digital Thermostat Instruction Manual-ST620 Model No. Instruction Manual," Apr. 29, 2010, 24 pages, www.salus-tech.com.
Arens, E., et al., "Demand Response Enabled Thermostat—Control Strategies and Interface," Demand Response Enabling Technology Development, UC Berkeley, 2004, 1 page. Retrieved from: dr.berkeley.edu/dream/posters/2004_11CEC_TstatPoster.pdf.
Arens, E., et al., "Demand Response Electrical Appliance Manager—User Interface Design, Development and Testing," Demand Response Enabling Technology Development, UC Berkeley, 2005, 1 page. Retrieved from: dr.berkeley.edu/dream/posters/2005_6GUIposter.pdf.
Author Unknown, "Energy Joule," Ambient Devices, 2011, [retrieved on Aug. 1, 2012], 3 pages. Retrieved from: http://web.archive.org/web/20110723210421/http://www.ambientdevices.com/products/energyjoule.html.
Author Unknown, "ICY3815 Timer-Thermostat (The Clever Thermostat)—User Manual and Original Packaging," I.C.Y B.V, 2009, 38 pages.
Wright, P., et al., "DR ETD—Summary of New Thermostat, TempNode, & New Meter (UC Berkeley Project)," UC Berkeley, 2005, 49 pages. Retrieved from: http://dr.berkeley.edu/dream/presentations/2005_6CEC.pdf.
Introducing the New Smart Si Thermostat. Datasheet [online]. Ecobee, No Date Given [retrieved on Feb. 25, 2013]. Retrieved from the Internet: <URL: https://www.ecobee.com/solutions/home/smart-si/>.
U.S. Appl. No. 60/512,886, Volkswagen Rotary Knob for Motor Vehicle—English Translation of German Application filed Oct. 20, 2003.

* cited by examiner

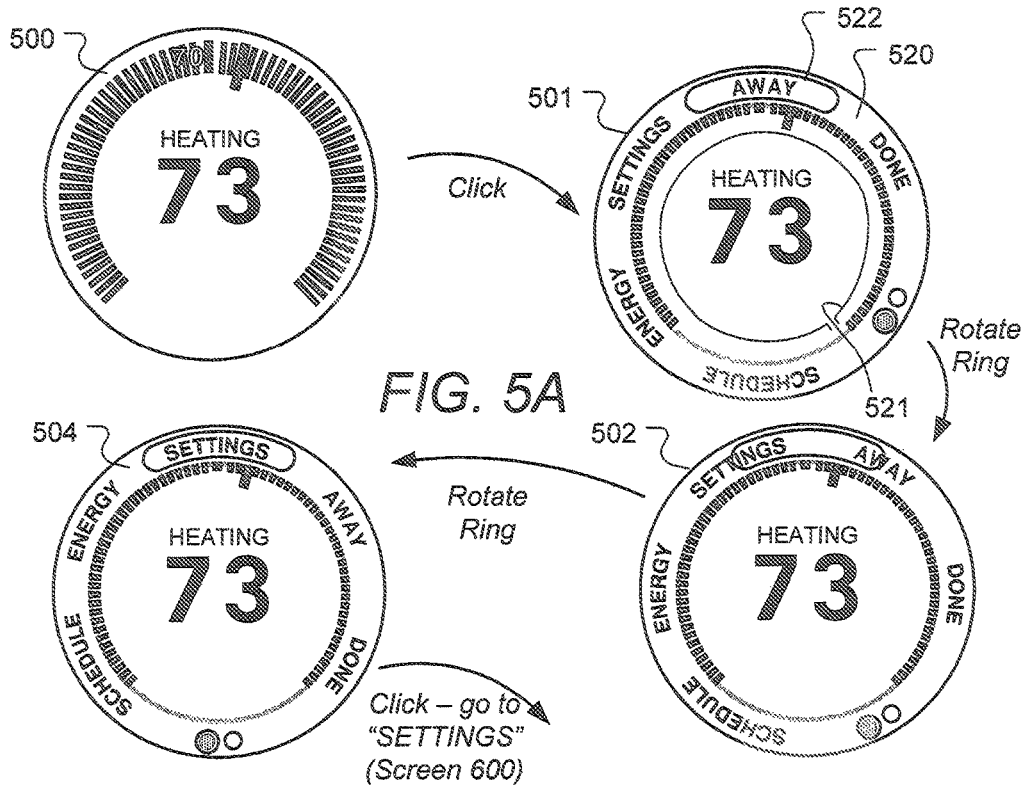
FIG. 5A
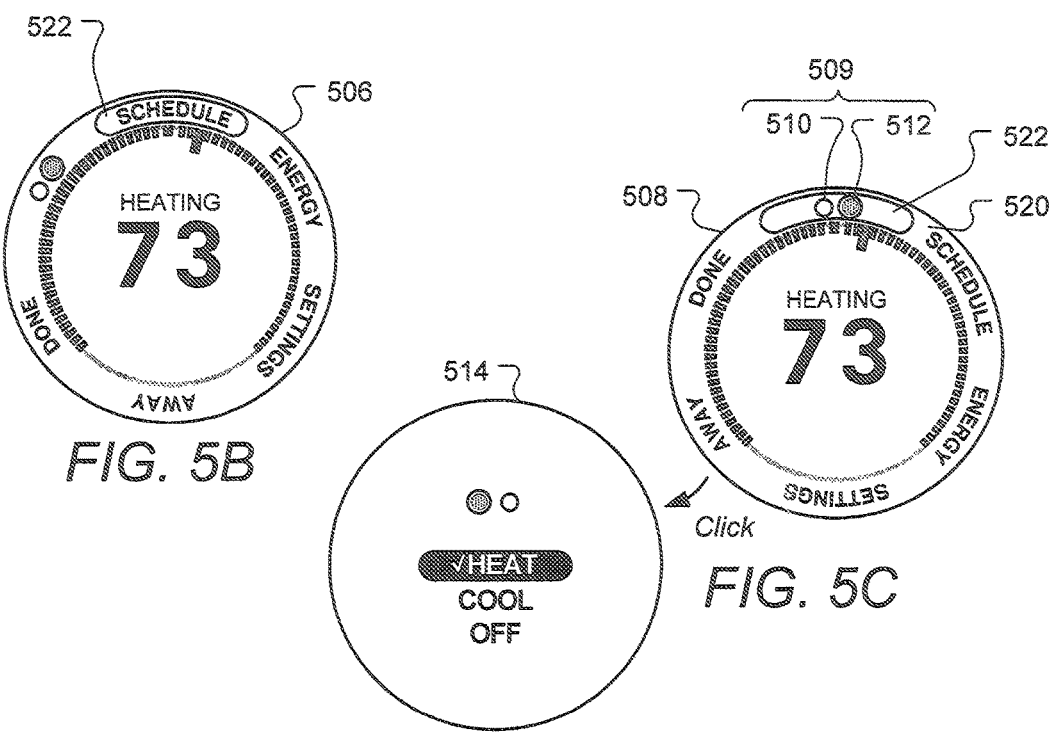
FIG. 5B
FIG. 5C

THERMOSTAT GRAPHICAL USER INTERFACE

CROSS-REFERENCES TO RELATED APPLICATIONS

This application is a continuation-in-part of PCT/US11/61437 filed Nov. 18, 2011 (Ref. No: NES0101-PCT), which claims the benefit of: U.S. Prov. Ser. No. 61/415,771 filed on Nov. 19, 2010 (Ref. No: NES0037-PROV); U.S. Prov. Ser. No. 61/429,093 filed on Dec. 31, 2010 (Ref. No: NES0037A-PROV); and U.S. Prov. Ser. No. 61/627,996 filed on Oct. 21, 2011 (Ref. No: NES0101-PROV).

This application is further a continuation-in-part of U.S. Ser. No. 13/033,573 filed on Feb. 23, 2011 (Ref. No: NES0016-US), which claims the benefit of U.S. Prov. Ser. No. 61/415,771 filed Nov. 19, 2010 (Ref. No: NES0037-PROV), and of U.S. Prov. Ser. No. 61/429,093 filed Dec. 31, 2010 (Ref. No: NES0037A-PROV.

This application is further a continuation-in-part of U.S. Ser. No. 13/269,501 filed on Oct. 7, 2011 (Ref. No: NES0120-US), which claims the benefit of U.S. Prov. Ser. No. 61/415,771 filed Nov. 19, 2010 (Ref. No: NES0037PR) and of U.S. Prov. Ser. No. 61/429,093 filed Dec. 31, 2010 (Ref. No: NES0037A-PROV), and which is a continuation-in-part of U.S. Ser. No. 13/033,573 filed Feb. 23, 2011 (Ref. No: NES0016-US), which claims the benefit of: U.S. Prov. Ser. No. 61/415,771 filed Nov. 19, 2010 (Ref. No: NES0037-PROV) and U.S. Prov. Ser. No. 61/429,093 filed Dec. 31, 2010 (Ref. No: NES0037A-PROV).

Each of the above-listed applications is hereby incorporated by reference in their entireties.

COPYRIGHT AUTHORIZATION

A portion of the disclosure of this patent document may contain material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This patent specification relates to systems, methods, and related computer program products for the monitoring and control of energy-consuming systems or other resource-consuming systems. More particularly, this patent specification relates to user interfaces for control units that govern the operation of energy-consuming systems, household devices, or other resource-consuming systems, including user interfaces for thermostats that govern the operation of heating, ventilation, and air conditioning (HVAC) systems.

BACKGROUND

While substantial effort and attention continues toward the development of newer and more sustainable energy supplies, the conservation of energy by increased energy efficiency remains crucial to the world's energy future. According to an October 2010 report from the U.S. Department of Energy, heating and cooling account for 56% of the energy use in a typical U.S. home, making it the largest energy expense for most homes. Along with improvements in the physical plant associated with home heating and cooling (e.g., improved insulation, higher efficiency furnaces), substantial increases in 5 energy efficiency can be achieved by better control and regulation of home heating and cooling equipment. By activating heating, ventilation, and air conditioning (HVAC) equipment for judiciously selected time intervals and carefully chosen operating levels, substantial energy can be saved while at the same time keeping the living space suitably comfortable for its occupants.

Some thermostats offer programming abilities that provide the potential for balancing user comfort and energy savings. However, users are frequently intimidated by a dizzying array of switches and controls. Thus, the thermostat may frequently resort to default programs, thereby reducing user satisfaction and/or energy-saving opportunities.

SUMMARY

Provided according to one or more embodiments are systems, methods, computer program products, and related business methods for controlling one or more heating, ventilation, and air conditioning (HVAC) systems based on one or more thermostats, each thermostat being configured and adapted to provide sophisticated, customized, energy-saving HVAC control functionality while at the same time being visually appealing, non-intimidating, elegant to behold, and delightfully easy to use. The thermostat may present a population of representative tick marks on an electronic display and/or present one or more menus and sub-menus to a user, and the user may use a single device component (e.g., a rotatable ring) to easily select a setpoint temperature (by rotating the rotatable ring to a respective tick mark) and navigate through the menus (by rotating the ring and pressing inwardly on the ring) to identify desired selections.

For example, a thermostat may operate in a plurality of modes. In a first mode, a plurality of tick marks are presented in an arcuate arrangement on the electronic display, including a setpoint tick mark representative of a setpoint temperature and an ambient temperature tick mark representative of an ambient temperature, the setpoint tick mark and ambient temperature tick mark being displayed more prominently (e.g., boldened, lengthened or highlighted) relative to background tick marks. A user's rotation of an input component (e.g., a ring) may result in an adjustment of a setpoint temperature (along with the visual representation of the setpoint temperature via the prominent presentation of the associated setpoint tick mark).

The thermostat may switch from the first mode to the second mode upon a user's exertion of inward pressure on the input component (e.g., an "inward click" of the ring). The thermostat may then display menu options arranged in an arcuate arrangement, one of which may be highlighted. A user may change the highlighted option by rotation of the input component, and select the highlighted option by exerting inward pressure thereon. Additional sub-menus and/or controllable variables may then be presented. For some embodiments, in response to the rotation of the input component, the menu options can spin such that a currently highlighted one of the plurality of menu options remains at a top position of the arcuate arrangement.

Dynamic electronic display screens may allow a user to easily understand the navigation and variable options and to manipulate the device in a desired manner. Features such as tick-mark sweeps, dynamic background coloring, and time-to-temperature displays may allow a user to understand an effect of one or more selections made. For example, a tick mark sweep may be presented that sweeps from the ambient temperature tick mark to the current setpoint tick mark, showing that effort is being made to change the ambient temperature to the setpoint temperature. As another example, display features may be dynamically colored in order to further increase a user's understanding of current selections and heating/cooling status information. For example, for a cooling mode, a background of a display may change to dark blue following a user's selection of a setpoint temperature much lower than an ambient temperature. As another example, a prediction as to how long it will take to heat or cool an environment to a setpoint temperature may be numerically and/or graphically presented to a user. Thus, users may easily interact with the device based on its intuitive interaction features, and have an enhanced understanding of the effects of their actions.

In some embodiments, a thermostat is provided that includes a housing, a ring-shaped user interface component configured to track a rotational input motion of a user, and an electronic display centrally disposed on a face of the housing relative to the ring-shaped user interface component. The thermostat is configured such that the electronic display displays a population of tick marks arranged in an arcuate arrangement along a tick mark range area on the electronic display, the tick marks including a plurality of background tick marks, a setpoint tick mark representing a setpoint temperature, and an ambient temperature tick mark representing an ambient temperature, wherein each of the setpoint tick mark and the ambient temperature tick mark is more prominent than the background tick marks. The setpoint temperature is dynamically changeable according to the tracked rotational input motion of the ring-shaped user interface component. The thermostat is further configured such that the electronic display displays a visually prominent numerical representation of the setpoint temperature centrally disposed relative to the tick mark range area on the display. The thermostat is further configured such that the electronic display displays a plurality of user-selectable menu options arranged in an arcuate arrangement along a menu option range area on the electronic display, wherein respective ones of the user-selectable menu options are selectively highlighted according to the tracked rotational input motion of the ring-shaped user interface component.

In some embodiments, a thermostat is provided that includes a housing, a ring-shaped user interface component configured to track a rotational input motion of a user, and an electronic display centrally disposed on a face of the housing relative to the ring-shaped user interface component. The thermostat is configured such that the electronic display displays a population of background tick marks arranged in an arcuate arrangement along a tick mark range area on the electronic display, including a setpoint tick mark that is more prominently visible than the background tick marks, the setpoint tick mark representing a setpoint temperature and being dynamically changeable according to the tracked rotational input motion of the ring-shaped user interface component. The electronic display further displays an ambient temperature tick mark within the tick mark range area such that the ambient temperature tick mark is more prominently visible than the background tick marks, the ambient temperature tick mark representing an ambient temperature. The electronic display further displays a visually prominent digital representation of the setpoint temperature centrally disposed relative to the tick mark range area on the display.

In some embodiments, a thermostat is provided that includes a housing, a ring-shaped user interface component configured to track a rotational input motion of a user, and an electronic display centrally disposed on a face of the housing relative to the ring-shaped user interface component. The thermostat is configured such that the electronic display displays a plurality of user-selectable menu options arranged in an arcuate arrangement along a menu option range area on the electronic display, and selectively highlights respective ones of the plurality of menu options responsive to the tracked rotational input motion of the ring-shaped user interface component.

BRIEF DESCRIPTION OF THE DRAWINGS

The inventive body of work will be readily understood by referring to the following detailed description in conjunction with the accompanying drawings, in which:

FIGS. 5A-5C show example screens of a rotating main menu on a user-friendly a programmable thermostat, according to some preferred embodiments;

DETAILED DESCRIPTION OF THE INVENTION

Figure 1:
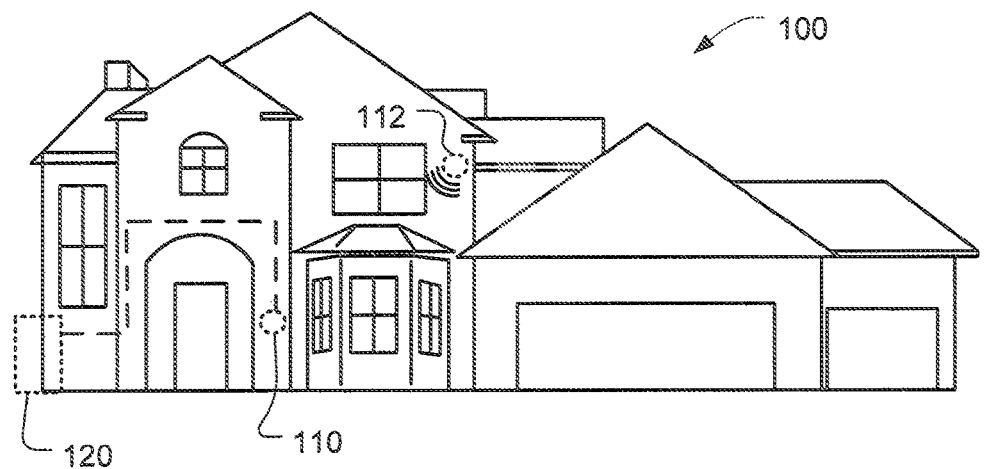
FIG. 1 is a diagram of an enclosure in which environmental conditions are controlled, according to some embodiments.

The subject matter of this patent specification relates to the subject matter of the following commonly assigned applications, each of which is incorporated by reference herein: U.S. Ser. No. 12/881,430 filed Sep. 14, 2010; U.S. Ser. No. 12/881,463 filed Sep. 14, 2010; U.S. Prov. Ser. No. 61/415,771 filed Nov. 19, 2010; U.S. Prov. Ser. No. 61/429,093 filed Dec. 31, 2010; U.S. Ser. No. 12/984,602 filed Jan. 4, 2011; U.S. Ser. No. 12/987,257 filed Jan. 10, 2011; U.S. Ser. No. 13/033,573 filed Feb. 23, 2011; U.S. Ser. No. 29/386,021, filed Feb. 23, 2011; U.S. Ser. No. 13/034,666 filed Feb. 24, 2011; U.S. Ser. No. 13/034,674 filed Feb. 24, 2011; U.S. Ser. No. 13/034,678 filed Feb. 24, 2011; U.S. Ser. No. 13/038,191 filed Mar. 1, 2011; U.S. Ser. No. 13/038,206 filed Mar. 1, 2011; U.S. Ser. No. 29/399,609 filed Aug. 16, 2011; U.S. Ser. No. 29/399,614 filed Aug. 16, 2011; U.S. Ser. No. 29/399,617 filed Aug. 16, 2011; U.S. Ser. No. 29/399,618 filed Aug. 16, 2011; U.S. Ser. No. 29/399,621 filed Aug. 16, 2011; U.S. Ser. No. 29/399,623 filed Aug. 16, 2011; U.S. Ser. No. 29/399,625 filed Aug. 16, 2011; U.S. Ser. No. 29/399,627 filed Aug. 16, 2011; U.S. Ser. No. 29/399,630 filed Aug. 16, 2011; U.S. Ser. No. 29/399,632 filed Aug. 16, 2011; U.S. Ser. No. 29/399,633 filed Aug. 16, 2011; U.S. Ser. No. 29/399,636 filed Aug. 16, 2011; U.S. Ser. No. 29/399,637 filed Aug. 16, 2011; U.S. Ser. No. 13/199,108, filed Aug. 17, 2011; U.S. Ser. No. 13/267,871 filed Oct. 6, 2011; U.S. Ser. No. 13/267,877 filed Oct. 6, 2011; U.S. Ser. No. 13/269,501, filed Oct. 7, 2011; U.S. Ser. No. 29/404,096 filed Oct. 14, 2011; U.S. Ser. No. 29/404,097 filed Oct. 14, 2011; U.S. Ser. No. 29/404,098 filed Oct. 14, 2011; U.S. Ser. No. 29/404,099 filed Oct. 14, 2011; U.S. Ser. No. 29/404,101 filed Oct. 14, 2011; U.S. Ser. No. 29/404,103 filed Oct. 14, 2011; U.S. Ser. No. 29/404,104 filed Oct. 14, 2011; U.S. Ser. No. 29/404,105 filed Oct. 14, 2011; U.S. Ser. No. 13/275,307 filed Oct. 17, 2011; U.S. Ser. No. 13/275,311 filed Oct. 17, 2011; U.S. Ser. No. 13/317,423 filed Oct. 17, 2011; U.S. Ser. No. 13/279,151 filed Oct. 21, 2011; U.S. Ser. No. 13/317,557 filed Oct. 21, 2011; U.S. Prov. Ser. No. 61/627,996 filed Oct. 21, 2011; PCT/US11/61339 filed Nov. 18, 2011; PCT/US11/61344 filed Nov. 18, 2011; PCT/US11/61365 filed Nov. 18, 2011; PCT/US11/61379 filed Nov. 18, 2011; PCT/US11/61391 filed Nov. 18, 2011; PCT/US11/61479 filed Nov. 18, 2011; PCT/US11/61457 filed Nov. 18, 2011; and PCT/US11/61470 filed Nov. 18, 2011. The above-referenced patent applications are collectively referenced herein as "the commonly assigned incorporated applications."

Provided according to one or more embodiments are systems, methods, computer program products, and related business methods for controlling one or more heating, ventilation, and air conditioning (HVAC) systems based on one or more versatile sensing and control units (VSCU units), each VSCU being configured and adapted to provide sophisticated, customized, energy-saving HVAC control functionality while at the same time being visually appealing, non-intimidating, elegant to behold, and delightfully easy to use.

The term "thermostat" is used hereinbelow to represent a particular type of VSCU unit (Versatile Sensing and Control) that is particularly applicable for HVAC control in an enclosure. Although "thermostat" and "VSCU unit" may be seen as generally interchangeable for the context of HVAC control of an enclosure, it is within the scope of the present teachings for each of the embodiments hereinabove and hereinbelow to be applied to VSCU units having control functionality over measurable characteristics other than temperature (e.g., pressure, flow rate, height, position, velocity, acceleration, capacity, power, loudness, brightness) for any of a variety of different control systems involving the governance of one or more measurable characteristics of one or more physical systems, and/or the governance of other energy or resource consuming systems such as water usage systems, air usage systems, systems involving the usage of other natural resources, and systems involving the usage of various other forms of energy.

A thermostat may present one or more menus and sub-menus to a user, and a user may use a single device component (e.g., a rotatable ring) to easily navigate through the menus and identify desired selections. For example, a thermostat's display may present an arcuate menu to a user. A user may rotate an input component, such as a rotatable ring, and a highlighted menu item (e.g., a putative selection item) is thereby also rotated across the menu items. In one instance, the menu itself actually rotates, with a menu item positioned, e.g., at a top position always being highlighted. Once satisfied with the highlighted item, a user may select the item by, e.g., pressing the rotatable ring inwards. In some instances, a sub-menu is then presented. A user may again use the rotatable ring to navigate through the sub-menu, though the menu- and sub-menu navigation may differ. For example, sub-menu items may each have an associated display. Rotation of the rotatable ring may cause an appearance of a first sub-menu item's display moving off of the display as a second sub-menu item's display moves onto the display. Thus, a user need not ever be overwhelmed with too many selection options.

The thermostat may be configured to allow a user to set one or more temperatures. Setpoint temperature selection options may be displayed in an intuitive manner, such that, e.g., a user may increase a setpoint temperature by rotating a rotatable ring clockwise. In some instances, a plurality of arcuately presented tick marks represent various temperatures. A user may then rotate the rotatable ring to adjust a setpoint temperature. For example, rotating the ring clockwise may increase a setpoint temperature. Select tick marks may be emphasized (e.g., prominently presented) in one or more manners to further convey selections and selection consequences. For example, tick marks corresponding to an ambient temperature and/or a setpoint temperature may be prominently displayed (e.g., bolded and/or lengthened). A number corresponding to a temperature of interest (e.g., an ambient and/or setpoint temperature) may also be presented. For example, a numerical representation of a setpoint temperature may be presented at a center of a thermostat's display and a numerical representation of an ambient temperature may be presented near an associated tick mark on a tick mark region of the display.

In some embodiments, a range of tick marks is emphasized or de-emphasized. For example, a first tick mark may correspond to an ambient room temperature and a second to a current setpoint temperature. As a system gradually heats or cools an environment towards the setpoint temperature, an animated visual sweep between the first and second tick marks may be provided. Thus, a user may be intuitively informed as to the presence and progress of a currently active heating or cooling activity.

Display features may be dynamically colored in order to further increase a user's understanding of current selections and heating/cooling status information. For example, in a cooling mode, a background of a display may change to blue following a user's selection of a setpoint temperature lower than the ambient temperature, or, in a heating mode, the background may change to red following a user's selection of a setpoint temperature higher than the ambient temperature. In some instances, the colors appear to indicate actual or predicted required heating (red) or cooling (blue) processes, the intensity of the color depending on a difference between the setpoint temperature and the ambient temperature. In some instances, other display features are colored. For example, tick marks may be colored to convey particular meanings, or colored icons may be presented (e.g., a green leaf representing an environmentally friendly temperature selection and a red smokestack representing an environmentally unfriendly temperature selection).

A prediction may be made as to how long it will take to heat or cool an environment to a target temperature (e.g., a programmed setpoint temperature or a temperature entered for immediate effect by a user). This time prediction may be numerically and/or graphically displayed to a user. For example, an arcuate region of a display may correspond to a maximum display time. A portion of the region may be shaded or filled with, e.g., tick marks, to indicate a predicted fraction of the maximum display time required to reach the target temperature.

In some embodiments, a single selection component (e.g., a rotatable ring) allows a user to navigate through a range of selection-option categories. A user may, e.g., rotate the component to switch between selection options and exert pressure on the ring to, e.g., confirm selections, change modes of the thermostat, etc. The effect of any selections is presented to the user in an intuitive way (e.g., using colors, numerical effect descriptions, graphical representations, etc.). Thus, users may be able to easily operate and understand the device.

A detailed description of the inventive body of work is provided herein. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body of work.

As used herein the term "HVAC" includes systems providing both heating and cooling, heating only, cooling only, as well as systems that provide other occupant comfort and/or conditioning functionality such as humidification, dehumidification and ventilation.

As used herein the terms power "harvesting," "sharing" and "stealing" when referring to HVAC thermostats all refer to the thermostat are designed to derive power from the power transformer through the equipment load without using a direct or common wire source directly from the transformer.

As used herein the term "residential" when referring to an HVAC system means a type of HVAC system that is suitable to heat, cool and/or otherwise condition the interior of a building that is primarily used as a single family dwelling. An example of a cooling system that would be considered residential would have a cooling capacity of less than about 5 tons of refrigeration (1 ton of refrigeration=12,000 Btu/h).

As used herein the term "light commercial" when referring to an HVAC system means a type of HVAC system that is suitable to heat, cool and/or otherwise condition the interior of a building that is primarily used for commercial purposes, but is of a size and construction that a residential HVAC system is considered suitable. An example of a cooling system that would be considered residential would have a cooling capacity of less than about 5 tons of refrigeration.

As used herein the term "thermostat" means a device or system for regulating parameters such as temperature and/or humidity within at least a part of an enclosure. The term "thermostat" may include a control unit for a heating and/or cooling system or a component part of a heater or air conditioner. As used herein the term "thermostat" can also refer generally to a versatile sensing and control unit (VSCU unit) that is configured and adapted to provide sophisticated, customized, energy-saving HVAC control functionality while at the same time being visually appealing, non-intimidating, elegant to behold, and delightfully easy to use.

It is to be appreciated that although exemplary embodiments are presented herein for the particular context of HVAC system control, there are a wide variety of other resource usage contexts for which the embodiments are readily applicable including, but not limited to, water usage, air usage, the usage of other natural resources, and the usage of other (i.e., non-HVAC-related) forms of energy, as would be apparent to the skilled artisan in view of the present disclosure. Therefore, such application of the embodiments in such other resource usage contexts is not outside the scope of the present teachings.

FIG. 1 is a diagram of an enclosure in which environmental conditions are controlled, according to some embodiments. Enclosure 100, in this example is a single-family dwelling. According to other embodiments, the enclosure can be, for example, a duplex, an apartment within an apartment building, a light commercial structure such as an office or retail store, or a structure or enclosure that is a combination of the above. Thermostat 110 controls HVAC system 120 as will be described in further detail below. According to some embodiments, the HVAC system 120 is has a cooling capacity less than about 5 tons. According to some embodiments, a remote device 112 wirelessly communicates with the thermostat 110 and can be used to display information to a user and to receive user input from the remote location of the device 112. Although many of the embodiments are described herein as being carried out by a thermostat such as thermostat 110, according to some embodiments, the same or similar techniques are employed using a remote device such as device 112.

Figure 2:
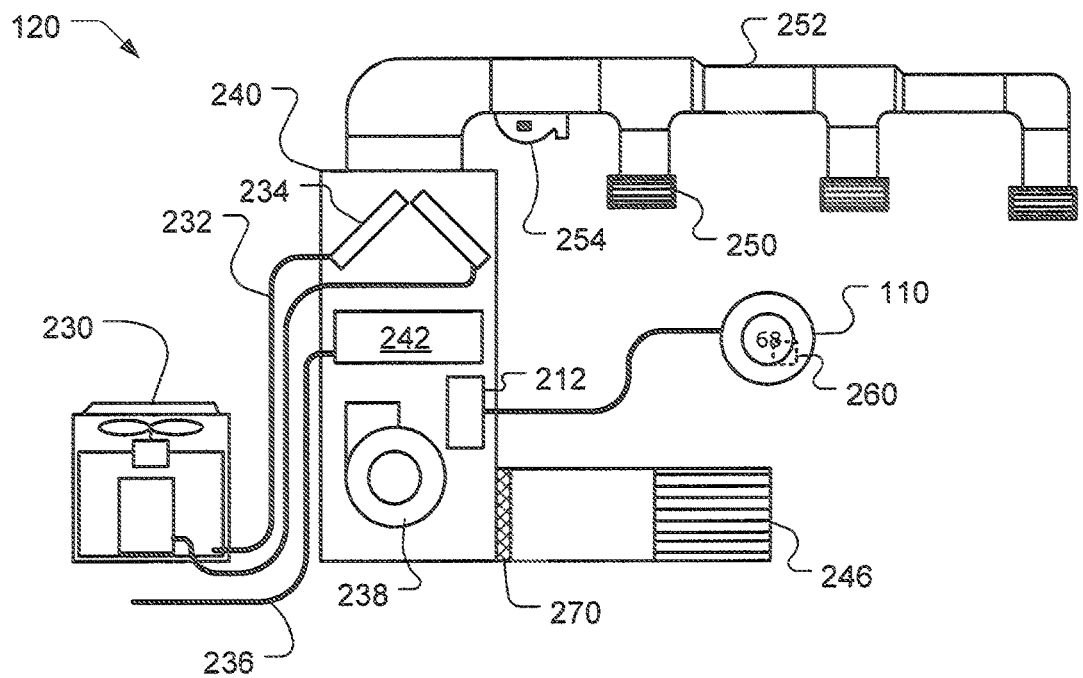
FIG. 2 is a diagram of a heating, ventilation, and air conditioning (HVAC) system, according to some embodiments.

FIG. 2 is a diagram of an HVAC system, according to some embodiments. HVAC system 120 provides heating, cooling, ventilation, and/or air handling for the enclosure, such as a single-family home 100 depicted in FIG. 1. The system 120 depicts a forced air type heating system, although according to other embodiments, other types of systems could be used. In heating, heating coils or elements 242 within air handler 240 provide a source of heat using electricity or gas via line 236. Cool air is drawn from the enclosure via return air duct 246 through filter 270, using fan 238 and is heated heating coils or elements 242. The heated air flows back into the enclosure at one or more locations via supply air duct system 252 and supply air grills such as grill 250. In cooling, an outside compressor 230 passes gas such a Freon through a set of heat exchanger coils to cool the gas. The gas then goes to the cooling coils 234 in the air handlers 240 where it expands, cools and cools the air being circulated through the enclosure via fan 238. According to some embodiments a humidifier 254 is also provided. Although not shown in FIG. 2, according to some embodiments the HVAC system has other known functionality such as venting air to and from the outside, and one or more dampers to control airflow within the duct systems.

The system is controlled by control electronics 212 whose operation is governed by a thermostat such as the thermostat 110. Thermostat 110 controls the HVAC system 120 through a number of control circuits. Thermostat 110 also includes a processing system 260 such as a microprocessor that is adapted and programmed to controlling the HVAC system and to carry out the techniques described in detail herein.

For example, as known in the art, for a typical simple scenario of a four-wire configuration in which the control electronics 212 includes four control wires (power (R), heat (W), cool (Y), and fan (G)) the thermostat 110 will short-circuit W to R to actuate a heating cycle (and then disconnect W from R to end the heating cycle), will short-circuit Y to R to actuate a cooling cycle (and then disconnect Y from R to end the cooling cycle), and will short-circuit G to R to turn on the fan (and then disconnect G from R to turn off the fan). For a heating mode, when thermostat 110 determines that an ambient temperature is below a lower threshold value equal to a setpoint temperature minus a swing value, the heating cycle will be actuated until the ambient temperature rises to an upper threshold value equal to the setpoint value plus the swing value. For a cooling mode, when thermostat 110 determines that an ambient temperature is above an upper threshold value equal to a setpoint temperature plus a swing value, the cooling cycle will be actuated until the ambient temperature lowers to a lower threshold value equal to the setpoint value minus the swing value. Without limitation, the swing values for heating and cooling can be the same or different, the upper and lower swing amounts can be symmetric or asymmetric, and the swing values can be fixed, dynamic, or user-programmable, all without departing from the scope of the present teachings.

Figure 3A:
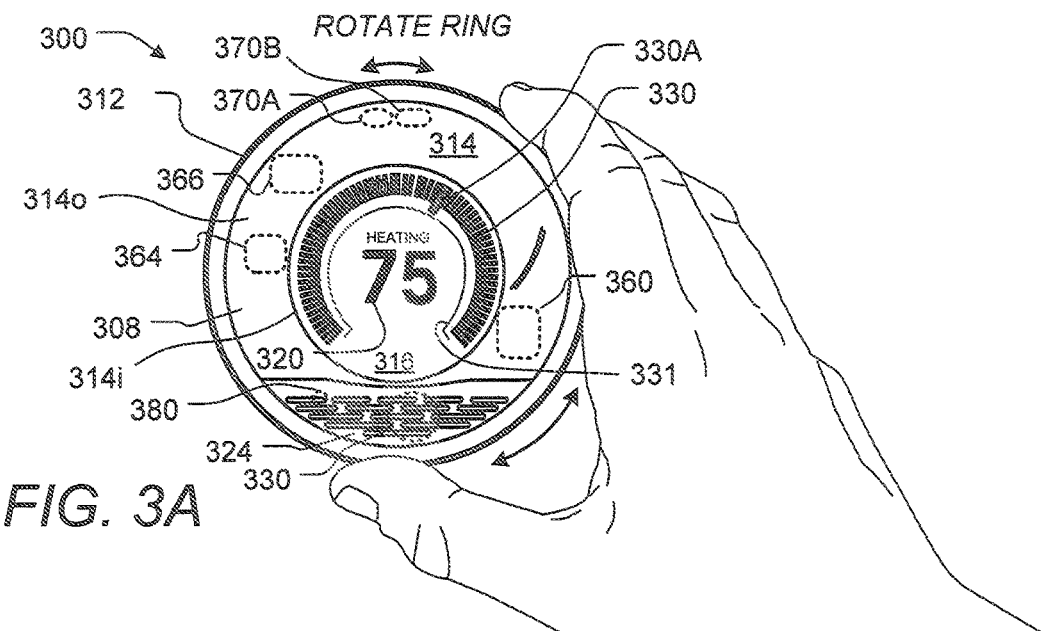
FIGS. 3A-3B illustrate a thermostat having a user-friendly interface, according to some embodiments.
Figure 3B:
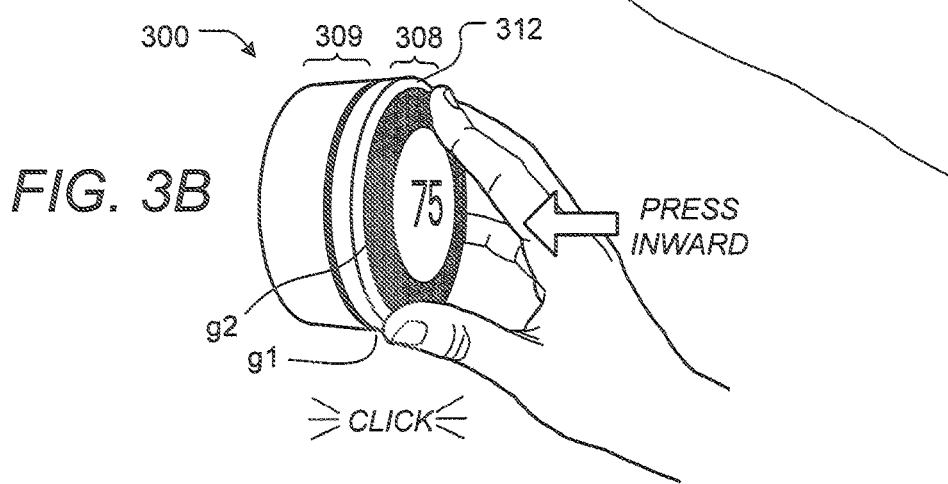

FIGS. 3A-3B illustrate a thermostat having a user-friendly interface, according to some embodiments. Unlike many prior art thermostats, thermostat 300 preferably has a sleek, simple, uncluttered and elegant design that does not detract from home decoration, and indeed can serve as a visually pleasing centerpiece for the immediate location in which it is installed. Moreover, user interaction with thermostat 300 is facilitated and greatly enhanced over known conventional thermostats by the design of thermostat 300. Thermostat 300 includes control circuitry and is electrically connected to an HVAC system, such as is shown with thermostat 110 in FIGS. 1 and 2. Thermostat 300 is wall mounted, is circular in shape, and has an outer rotatable ring 312 for receiving user input.

Thermostat 300 is circular in shape in that it appears as a generally disk-like circular object when mounted on the wall. According to some embodiments, thermostat 300 is approximately 80 mm in diameter. Thermostat 300 has a large front face lying inside the outer ring 312. The front face of thermostat 300 comprises a clear cover 314 that according to some embodiments is polycarbonate, and a metallic portion 324 preferably having a number of slots formed therein as shown. According to some embodiments, the surface of cover 314 and metallic portion 324 form a common outward arc or spherical shape gently arcing outward, and this gentle arcing shape is continued by the outer ring 312.

Outer rotatable ring 312 allows the user to make adjustments, such as selecting a new target temperature. For example, by rotating outer ring 312 clockwise, a target setpoint temperature can be increased, and by rotating the outer ring 312 counter-clockwise, the target setpoint temperature can be decreased.

Although being formed from a single lens-like piece of material such as polycarbonate, the cover 314 has two different regions or portions including an outer portion 314o and a central portion 314i. According to some embodiments, cover 314 is painted or smoked around outer portion 314o, but leaves central portion 314i visibly clear so as to facilitate viewing of an electronic display 316 disposed thereunderneath. According to some embodiments, the curved cover 314 acts as a lens that tends to magnify the information being displayed in electronic display 316 to users. Central electronic display 316 may include, e.g., a dot-matrix layout (individually addressable) such that arbitrary shapes can be generated (rather than being a segmented layout); a combination of a dot-matrix layout and a segmented layout' or a backlit color liquid crystal display (LCD). An example of information displayed on electronic display 316 is illustrated in FIG. 3A, and includes central numerals 320 that are representative of a current setpoint temperature. As further illustrated in FIG. 3A, the display visible to a user may be circular and/or may parallel an outer shape of thermostat 300, an outer shape of outer ring 312 and/or an inner shape of outer ring 312. In some instances, the shape of the display visible to a user is partly or fully controlled by a shape of outer ring 312.

Thermostat 300 is preferably constructed such that electronic display 316 is at a fixed orientation and does not rotate with the outer ring 312, so that the electronic display 316 remains easily readable by the user. For some embodiments, cover 314 and metallic portion 324 also remain at a fixed orientation and do not rotate with the outer ring 312. According to one embodiment in which the diameter of the thermostat 300 is about 80 mm, the diameter of the electronic display 316 is about 45 mm. According to some embodiments an LED indicator 380 is positioned beneath portion 324 to act as a low-power-consuming indicator of certain status conditions. For, example the LED indicator 380 can be used to display blinking red when a rechargeable battery of the thermostat (see FIG. 4A, infra) is very low and is being recharged. More generally, the LED indicator 380 can be used for communicating one or more status codes or error codes by virtue of red color, green color, various combinations of red and green, various different blinking rates, and so forth, which can be useful for troubleshooting purposes.

As further detailed below, thermostat 300 may include a plurality of tick marks 330. Tick marks 330 may be presented, e.g., via electronic display 316. For example, the tick marks may be presented in an arcuate arrangement along a tick mark range area 331 of the electronic display. One or more tick marks 330A may be emphasized or prominently displayed (e.g., by lengthening the mark, bolding the mark, highlighting the mark, putting an indicator such as a dot near the mark, etc.). Which tick mark is emphasized may be at least partly controlled by a user input and/or a current setting value.

According to some embodiments, metallic portion 324 has number of slot-like openings so as to facilitate the use of a passive infrared motion sensor 330 mounted therebeneath. Metallic portion 324 can alternatively be termed a metallic front grille portion. Further description of the metallic portion/front grille portion is provided in the commonly assigned U.S. Ser. No. 13/199,108, supra.

Motion sensing as well as other techniques can be use used in the detection and/or predict of occupancy, as is described further in the commonly assigned U.S. Ser. No. 12/881,430, supra. According to some embodiments, occupancy information is used in generating an effective and efficient scheduled program. Preferably, an active proximity sensor 370A is provided to detect an approaching user by infrared light reflection, and an ambient light sensor 370B is provided to sense visible light. Proximity sensor 370A can be used to detect proximity in the range of about one meter so that the thermostat 300 can initiate "waking up" when the user is approaching the thermostat and prior to the user touching the thermostat. Such use of proximity sensing is useful for enhancing the user experience by being "ready" for interaction as soon as, or very soon after the user is ready to interact with the thermostat. Further, the wake-up-on-proximity functionality also allows for energy savings within the thermostat by "sleeping" when no user interaction is taking place our about to take place. Ambient light sensor 370B can be used for a variety of intelligence-gathering purposes, such as for facilitating confirmation of occupancy when sharp rising or falling edges are detected (because it is likely that there are occupants who are turning the lights on and off), and such as for detecting long term (e.g., 24-hour) patterns of ambient light intensity for confirming and/or automatically establishing the time of day.

According to some embodiments, for the combined purposes of inspiring user confidence and further promoting visual and functional elegance, thermostat 300 is controlled by only two types of user input, the first being a rotation of the outer ring 312 as shown in FIG. 3A (referenced hereafter as a "rotate ring" or "ring rotation" input), and the second being an inward push on an outer cap 308 (see FIG. 3B) until an audible and/or tactile "click" occurs (referenced hereafter as an "inward click" or simply "click" input), as further described in the commonly assigned PCT/US11/61437 application, supra. Further descriptions of this configuration and process, advantageous mechanical user-interfaces and related designs, which are employed according to some embodiments, can be found in PCT/US11/61437, supra, U.S. Ser. No. 13/269,501, supra, U.S. Ser. No. 13/033,573, supra, U.S. Ser. No. 29/386,021, supra, and U.S. Ser. No. 13/199,108, supra. For some embodiments, an interior dome switch (not shown) disposed in mechanical communication with the outer ring 312 provides the audible and/or tactile "click" associated with a completed inward pressing of the ring, the dome switch also providing an associated outward restorative force.

According to some embodiments, thermostat 300 includes a processing system 360, display driver 364 and a wireless communications system 366. Processing system 360 is adapted to cause the display driver 364 and display area 316 to display information to the user, and to receiver user input via the rotatable ring 312. Processing system 360, according to some embodiments, is capable of carrying out the governance of the operation of thermostat 300 including the user interface features described herein. Processing system 360 is further programmed and configured to carry out other operations as described further hereinbelow and/or in other ones of the commonly assigned incorporated applications. For example, processing system 360 may be programmed and configured to dynamically display a tick-mark emphasis (e.g., boldening a tick mark, lengthening a tick mark, outlining a tick mark, etc.) based on setpoint temperature and/or a current ambient temperature data point. Processing system 360 may be programmed and configured to maintain and update a thermodynamic model for the enclosure in which the HVAC system is installed, such as described in U.S. Ser. No. 12/881,463, supra. According to some embodiments, wireless communications system 366 is used to communicate with devices such as personal computers and/or or other thermostats or HVAC system components, which can be peer-to-peer communications, communications through one or more servers located on a private network, or and/or communications through a cloud-based service.

Figure 3C:
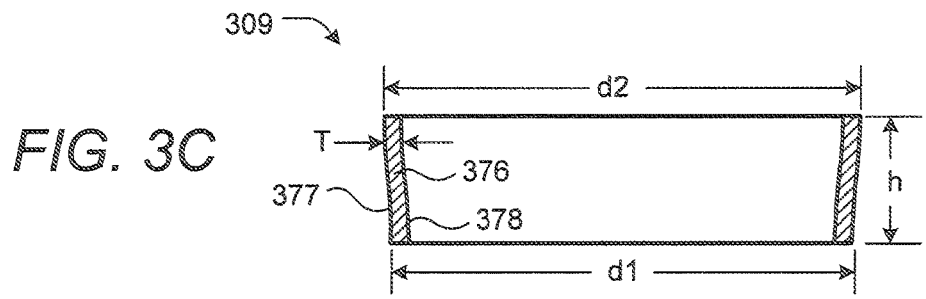
FIG. 3C illustrates a cross-sectional view of a shell portion of a frame of the thermostat of FIGS. 3A-3B.

FIG. 3C illustrates a cross-sectional view of a shell portion 309 of a frame of the thermostat of FIGS. 3A-3B, which has been found to provide a particularly pleasing and adaptable visual appearance of the overall thermostat 300 when viewed against a variety of different wall colors and wall textures in a variety of different home environments and home settings. While the thermostat itself will functionally adapt to the user's schedule as described herein and in one or more of the commonly assigned incorporated applications, supra, the outer shell portion 309 is specially configured to convey a "chameleon" quality or characteristic such that the overall device appears to naturally blend in, in a visual and decorative sense, with many of the most common wall colors and wall textures found in home and business environments, at least in part because it will appear to assume the surrounding colors and even textures when viewed from many different angles. The shell portion 309 has the shape of a frustum that is gently curved when viewed in cross-section, and comprises a sidewall 376 that is made of a clear solid material, such as polycarbonate plastic. The sidewall 376 is backpainted with a substantially flat silver- or nickel-colored paint, the paint being applied to an inside surface 378 of the sidewall 376 but not to an outside surface 377 thereof. The outside surface 377 is smooth and glossy but is not painted. The sidewall 376 can have a thickness T of about 1.5 mm, a diameter d1 of about 78.8 mm at a first end that is nearer to the wall when mounted, and a diameter d2 of about 81.2 mm at a second end that is farther from the wall when mounted, the diameter change taking place across an outward width dimension "h" of about 22.5 mm, the diameter change taking place in either a linear fashion or, more preferably, a slightly nonlinear fashion with increasing outward distance to form a slightly curved shape when viewed in profile, as shown in FIG. 3C. The outer ring 312 of outer cap 308 is preferably constructed to match the diameter d2 where disposed near the second end of the shell portion 309 across a modestly sized gap g1 therefrom, and then to gently arc back inwardly to meet the cover 314 across a small gap g2. It is to be appreciated, of course, that FIG. 3C only illustrates the outer shell portion 309 of the thermostat 300, and that there are many electronic components internal thereto that are omitted from FIG. 3C for clarity of presentation, such electronic components being described further hereinbelow and/or in other ones of the commonly assigned incorporated applications, such as U.S. Ser. No. 13/199,108, supra.

Figure 4:
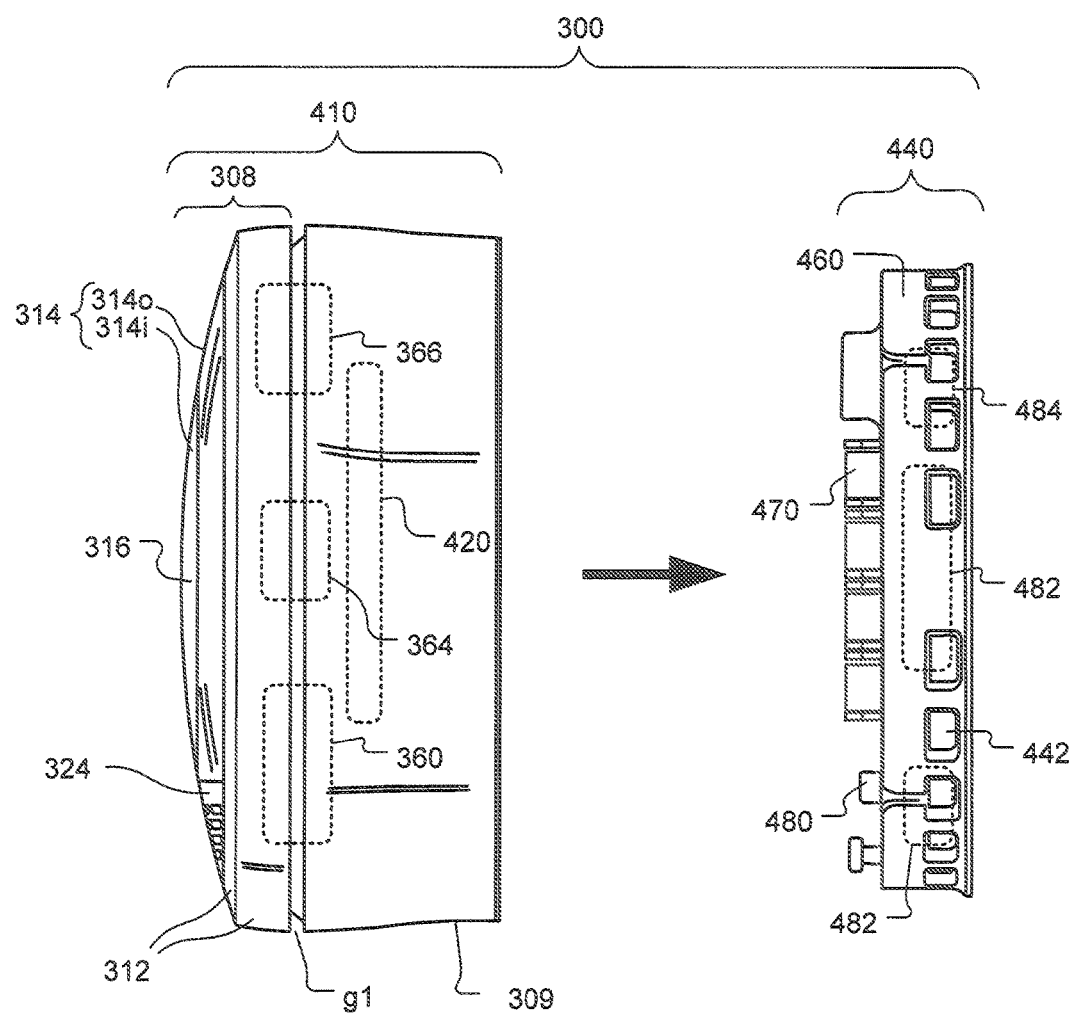
FIG. 4 illustrates a thermostat having a head unit and a backplate (or wall dock) for ease of installation, configuration and upgrading, according to some embodiments.

FIG. 4 illustrates a side view of the thermostat 300 including a head unit 410 and a backplate (or wall dock) 440 thereof for ease of installation, configuration and upgrading, according to some embodiments. As is described hereinabove, thermostat 300 is wall mounted and has circular in shape and has an outer rotatable ring 312 for receiving user input. Head unit 410 includes the outer cap 308 that includes the cover 314 and electronic display 316. Head unit 410 of round thermostat 300 is slidably mountable onto back plate 440 and slidably detachable therefrom. According to some embodiments the connection of the head unit 410 to backplate 440 can be accomplished using magnets, bayonet, latches and catches, tabs or ribs with matching indentations, or simply friction on mating portions of the head unit 410 and backplate 440. According to some embodiments, the head unit 410 includes a processing system 360, display driver 364 and a wireless communications system 366. Also shown is a rechargeable battery 420 that is recharged using recharging circuitry 422 that uses power from backplate that is either obtained via power harvesting (also referred to as power stealing and/or power sharing) from the HVAC system control circuit(s) or from a common wire, if available, as described in further detail in co-pending patent application U.S. Ser. Nos. 13/034,674, and 13/034,678, which are incorporated by reference herein. According to some embodiments, rechargeable battery 420 is a single cell lithium-ion, or a lithium-polymer battery.

Backplate 440 includes electronics 482 and a temperature/humidity sensor 484 in housing 460, which are ventilated via vents 442. Two or more temperature sensors (not shown) are also located in the head unit 410 and cooperate to acquire reliable and accurate room temperature data. Wire connectors 470 are provided to allow for connection to HVAC system wires. Connection terminal 480 provides electrical connections between the head unit 410 and backplate 440. Backplate electronics 482 also includes power sharing circuitry for sensing and harvesting power available power from the HVAC system circuitry.

A selection component (e.g., outer ring 312) and electronic display 316 may enable a user to: (1) identify a type of variable to be set or information to be input; and/or (2) identify a value for one or more variables and/or for one or more information fields. For example, an HVAC system may include a plurality of categories (e.g., energy, schedule, settings, heating/cooling mode, etc.). As described in greater detail below, display 316 may be configured to present a circular menu: as the user rotates outer ring 312, a different category may appear at or near a top of the display. A category appearing at or near a top of the display may be highlighted. A user may select the highlighted category by clicking outer ring 312. Selection of some categories allows a user to view available sub-menus. For example, rotation of outer ring 312 may cause an apparent translation of the entire screen, such that a first sub-menu moves off of the screen as a second sub-menu moves on to the screen. In some instances, the user may be able to instantly interact with the displayed sub-menu even without clicking ring 312. For example, rotation of the ring may immediately adjust a setpoint temperature (e.g., when the thermostat is not in a menu-interacting mode).

Each variable and/or information field may be defined by a value. The value may include, e.g., a numeric value (e.g., a setpoint-temperature variable is set at "75"), a word (e.g., a password is set as "Password"), a letter (e.g., a thermostat is identified as Thermostat "A"), a selection amongst a plurality of options (e.g., smart learning is "Enabled"), etc. An active variable or field may be identified based on a user's selection of the variable or field, a default thermostat state and/or other information.

Various value options may then be presented to the user. For example, a list of options may be presented in an arcuate, circular, list or grid arrangement on the display. A user may adjust a selection or highlighted option by rotating outer ring 312. Actual selection of an option may or may not require clicking of the ring. In some embodiments, at least some options are indicatively presented (e.g., by presenting a series of tick marks, representing options of evenly spaced values). In some embodiments, a selected value is expressly presented (e.g., displaying a value of a current setpoint temperature at or near a center of the display). The express presentation may provide immediate feedback as to meaning of the indicative presentations and allow a user to adjust their selections appropriately.

A user may identify a variable or field to be set and/or identify a value of one or more variables during a set-up stage and/or anytime thereafter. For example, a user may set settings for network connections, locations, passwords, temperature preferences, and initial temperature setpoints during a set-up stage, and then alter temperature preferences and temperature setpoints at a later time. More specific details regarding set-up-stage inputs of settings/information fields may be found in commonly assigned U.S. Ser. No. 13/269,501. It is also understood that embodiments described below with respect to inputs received during operational stages may similarly be applied to the set-up stage.

FIGS. 5A-5C show example screens of a rotating main menu, according to some preferred embodiments. The screens shown, according to some embodiments, are displayed on a thermostat 300 on a round dot-matrix electronic display 316 having a rotatable ring 312 such as shown and described in FIGS. 3A-4. FIG. 5A shows an example screen 500 in a first mode of operation, which might be termed a "standard" or "normal" or "default" mode of operation, and which corresponds to when the thermostat is not being manipulated by the user but instead is simply operating the HVAC system normally to maintain the ambient temperature at the current setpoint temperature. Notably, according to one preferred embodiment, the screen 500 does not actually appear to the user unless the user is detected to be close to the thermostat 300 (for example 1 meter away or less) as detected by the proximity detection facility of the thermostat 300, and if the user is not close to the thermostat 300, the electronic screen remains dark. However, the scope of the present teachings is not so limited, and in other embodiments the screen 500 could be displayed all of the time that the thermostat is in the first mode. In this first mode of operation, if the user walks up to the thermostat and turns the outer ring 316, the setpoint temperature will change in real-time responsive to the turning ring (downward setpoint temperature for counter-clockwise turn, upward setpoint temperature for clockwise turn). Advantageously, this first mode of operation is somewhat reminiscent of old round mechanical thermostats and will be very intuitive for practically all users. Advantageously, however, using this same physical facility, there is also provided an ability for the user to instantiate, from the first mode of operation, a second mode of operation which can be termed a menu mode or user-interactive menuing mode, in which more advanced operational control can be achieved. More particularly, according to an embodiment, there is instantiated a change from the first mode of operation (screen 500) to the second mode of operation (screen 501) when the user makes in inward click input on the outer ring 316. The inward click from the normal display screen 500 causes a circumferential main menu 520 to appear as shown in screen 501. In this example the main menu 520 displays about the perimeter of the circular display area various menu names such as "SETTINGS," "ENERGY," "SCHEDULE," "AWAY," "DONE," as well one or more icons. The top of the circular menu 520 includes an active window 522 that shows the user which menu item will be selected if an inward click is performed at that time. Window 522 is highlighted, filled in, circumscribed, or otherwise marked such that a user can easily identify that a menu item within this window is active. The circular menu 520 comprises a plurality of user-selectable menu options arranged along a menu option range area 521 on the electronic display which, for this particular example, occupies an annular area around a periphery of the electronic display as shown for the screen 501 of FIG. 5A.

Upon user rotation of the rotatable ring 312 (see FIG. 3A, supra) the menu items turn clockwise or counter clockwise, matching the direction of the rotatable ring 312, so as to allow different menu items to be selected. For example, screen 502 and 504 show examples displayed in response to a clockwise rotation of the rotatable ring 312. One example of a rotating menu that rotates responsive to ring rotations according to some embodiments is illustrated in the commonly assigned U.S. Ser. No. 29/399,632, supra. From screen 504, if an inward click is performed by the user, then the Settings menu is entered. It has been found that a circular rotating menu such as shown, when combined with a rotatable ring and round display area, allows for highly intuitive and easy input, and so therefore greatly enhances the user interface experience for many users. For one embodiment, as illustrated in FIG. 5A, the circular menu 520 spins around the menu option range area 521 in a manner such that the currently highlighted one of the plurality of menu options remains at a top position of the menu option range area 521.

Menu items may include text (e.g., "Schedule") and/or icons (e.g., disks 510 and 512). FIG. 5B shows an example screen 506 that allows for the schedule mode to be entered. FIG. 5C shows the selection of a mode icon 509 representing a heating/cooling/off mode screen, the mode icon 509 comprising two disks 510 and 512 and causing the display of a mode menu if it appears in the active window 522 when the user makes an inward click. In screen 508, a small blue disk 510 represents cooling mode and a small orange-red disk 512 represents heating mode. According to some embodiments the colors of the disks 510 and 512 match the background colors used for the thermostat, as described in greater detail below.

Menu items may further indicate currently active selection or heating-versus-cooling mode of HVAC operation. For example, one of disks 510 and 512, in this case the heating disk 512, is highlighted with a colored outline, to indicate the current operating mode (i.e. heating or cooling) of the thermostat. In one alternative embodiment, the mode icon 509 can be replaced with the text string "HEAT/COOL/OFF" or simply the word "MODE".

If in inward click is performed from screen 508, a menu screen 514 appears (e.g. using a "coin flip" transition). In screen 514 the user can view the current mode (marked with a check mark). Screen 514 illustrates another way in which rotatable ring 312 may be used to make a selection. A plurality of selection options may be presented, with one or more options being emphasized (e.g., highlighted). A user may highlight a different option by rotating rotatable ring 312. For example, as a user rotates rotatable ring 312 in a clockwise fashion, options further down the list become highlighted. Once the user is satisfied that the desired option is highlighted, he may click the ring to confirm the selection. Thus, in the example shown in screen 514, a user may rotate rotatable ring 312 clockwise to move the highlighting from "HEAT" to "COOL" or "OFF." The user may then establish the selection by inward-clicking the ring, and thereby change the mode. If "COOL" is selected then the thermostat will change over to cooling mode (such changeover as might be performed in the springtime), and the cooling disk icon will highlighted on screens 514 and 508. The menu can also be used to turn the thermostat off by selecting "OFF." In cases the connected HVAC system only has heating or cooling but not both, the words "HEAT" or "COOL" or "OFF" are displayed on the menu 520 instead of the colored disks.

FIGS. 6A-6F illustrate example user interface screens for making various settings, according to some embodiments. The screens shown, according to some embodiments, are displayed on a thermostat 300 on round dot-matrix electronic display 316 having a rotatable ring 312 such as shown and described in FIGS. 3A-4.

Figure 6A:
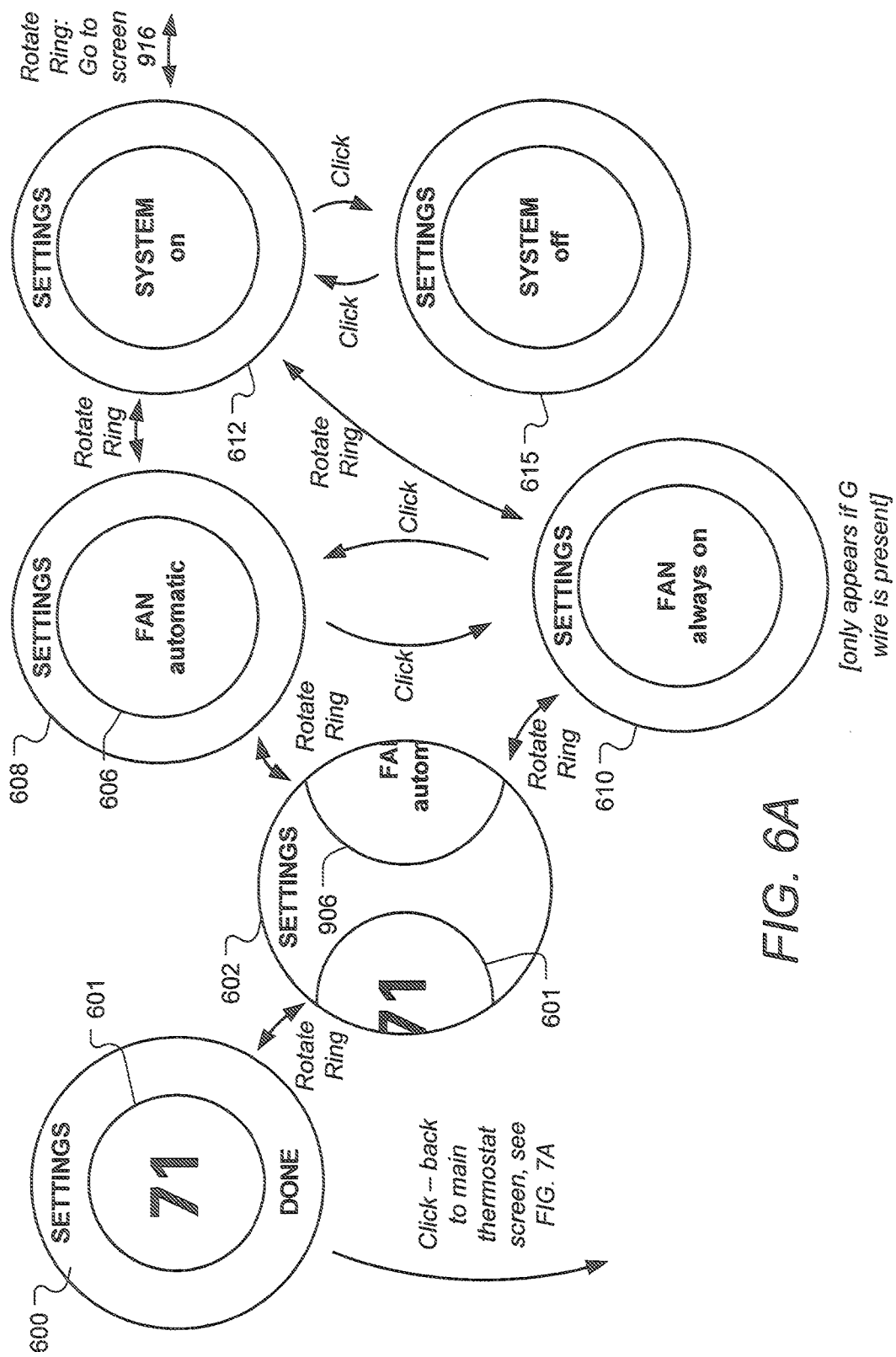
FIGS. 6A-6G illustrate example user interface screens on a user-friendly a programmable thermostat for making various settings, according to some embodiments.

In FIG. 6A, screen 600 is initially displayed following a user selection of "SETTINGS" from the main menu, such as shown in screen 504 of FIG. 5A. The general layout of the settings menu in this example is a series of sub-menus that are navigated using the rotatable ring 312. In one embodiment, the sub-menus may appear and function similar to the menu as shown in FIGS. 5A-C and described in the accompanying text. Specifically, menu items may rotate around a perimeter as rotatable ring is rotated. In some embodiments, rotation of outer ring 312 results in linear movement along sub-menu items. For example, sub-menu items may be presented in a row, column or grid, and rotation of outer ring 312 may control a temporary selection of the sub-menu item. FIGS. 6A-6F illustrate yet another embodiment of selecting options, wherein rotation of outer ring 312 gradually causes one or more hidden screens (corresponding to sub-menu items) to appear on the display 316.

For example, with reference to FIG. 6A, the user can cause the initial screen 600 to be shifted or translated to the left by a clockwise rotation of the rotatable ring 312, as shown in the succession of screens 602 and 608. The animated translation or shifting effect is illustrated in FIG. 6A by virtue of a portion of the previous screen disk 601 and a portion of the new screen disk 606 shifting as shown, and is similar to the animated shifting translation illustrated in the commonly assigned U.S. Ser. No. 29/399,621, supra. Further rotation of the ring leads to successive sub-menu items such as "system on" screen 612, and lock setting screen 616 (see FIG. 6B). Rotating the ring in the opposite direction, i.e., counterclockwise, translates or shifts the screens in the opposite direction (e.g., from 616 to 608 to 600).

The "initial screen" 600 is thus also used as a way to exit the settings menu by an inward click. This exit function is also identified by the "DONE" label on the screen 600. Note that inner disk 601 shows the large central numerals that correspond to the current setpoint temperature and can include a background color to match the thermostat background color scheme as described further below, so as to indicate to a user, in an intuitive way, that this screen 600 is a way of exiting the menu and going "back" to the main thermostat display. According to some embodiments, another initial/done screen such as screen 600 is displayed at the other end (the far end) of the settings menu, so as to allow means of exit from the settings menu from either end. According to some embodiments, the sub-menus are repeated with continued rotation in one direction, so that they cycle through in a circular fashion and thus any sub menu can eventually be accessed by rotating the ring continuously in either one of the two directions.

Screen 608 has a central disk 606 indicating the name of the sub-menu, in this case the Fan mode. For example, some sub menus only contain a few options which can be selected or toggled among by inward clicking alone. For example, the Fan sub-menu 608 only has two settings "automatic" (shown in screen 608) and "always on" (shown in screen 610). In this case the fan mode is changed by inward clicking, which simply toggles between the two available options. Ring rotation shifts to the next (or previous) settings sub-menu item. Thus rotating the ring from the fan sub-menu shift to the system on/off sub-menu shown in screens 612 (in the case of system "ON") and 614 (in the case of system "OFF"). The system on/off sub-menu is another example of simply toggling between the two available options using the inward click user input.

Figure 6B:
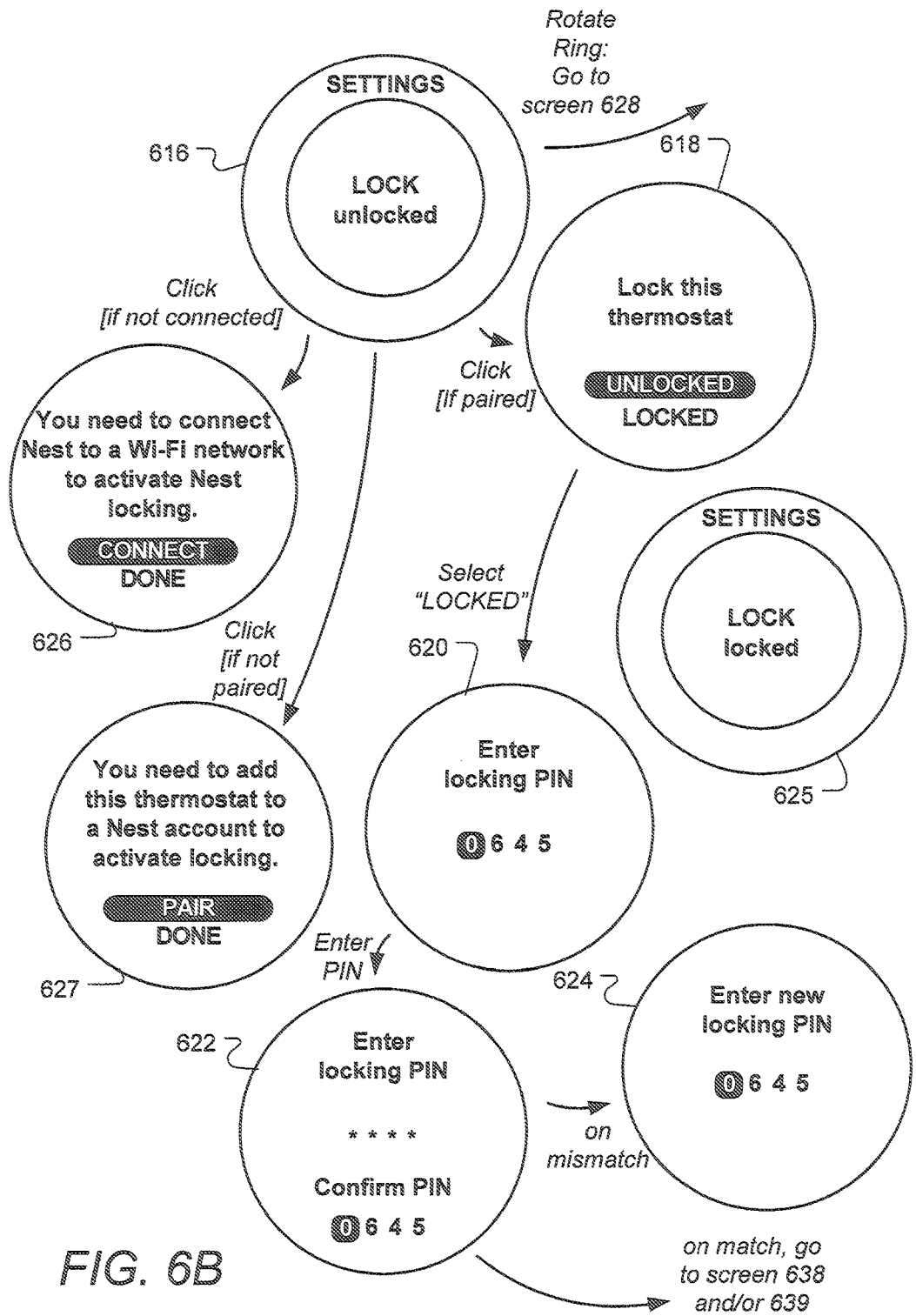

In FIG. 6B, screen 616 is the top level of the lock sub-menu. If the thermostat is connected and paired (i.e., has Internet access and is appropriately paired with a user account on a cloud-based server), an inward click will lead to screen 618. At screen 618, the user can vary the highlighting between the displayed selections by rotating the rotatable ring 312, and then can select the currently displayed menu item by inward clicking the rotatable ring 312. If "LOCKED" is selected then the user is asked to enter a locking PIN in screen 620.

Advantageously, the user may input a PIN by using the same rotatable ring 312 that was used to navigate through the menus and sub-menus. Screen 620 shows another technique for displaying selection options. The user rotates the rotatable ring 312 (see FIG. 3A, supra) to change the value of the highlighted character, followed by a click to select that value. Thus, only a temporarily selected option is presented to the user (not all possible options). In the depicted instance, a fixed length character entry field is presented. In other embodiments, a more flexible length entry field may be presented (e.g., by allowing some characters to be left blank or allowing the user to input a "DONE" type option).

If the thermostat is already locked, then screen 625 is displayed instead of screen 616. If the thermostat is unlocked, then a PIN confirmation is requested such as in screen 622. If the confirmation PIN does not match, then the user is asked to enter a new PIN in screen 624. If the confirmation PIN matches, then the temperature limits are set in screens 638 and/or 639 in FIG. 6C. The described locking capability can be useful in a variety of contexts, such as where a parent desires the limit the ability of their teenager to set the temperature too high in winter or too low in summer. According to some embodiments, locking of the thermostat is not permitted if the thermostat is not connected to the Internet or is not paired to an account, so that an online backup method of unlocking the thermostat is available should the user forget the PIN number. In such case, if the thermostat is not connected to the Internet, then screen 626 is displayed, and if the thermostat is not paired then screen 627 is displayed.

Figure 6C:
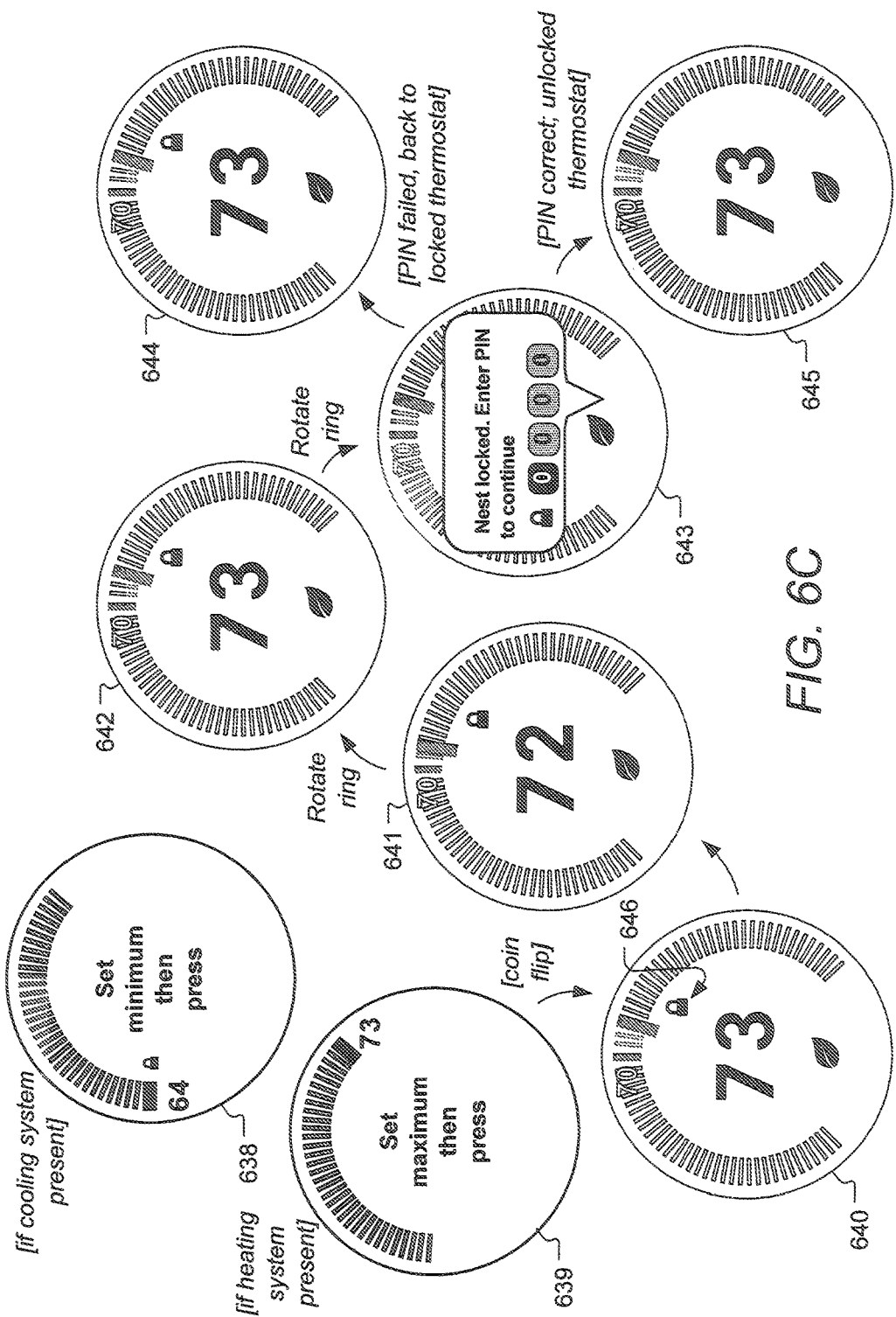

FIG. 6C shows further details of the locking feature, according to some embodiments. In screen 638 the user is allowed to set the minimum setpoint temperature using the rotatable ring followed by an inward click (in the case where a cooling system is present). Screen 639 similarly allows the user to set the maximum setpoint temperature (when a heating system is present).

After setting the limits in screens 638 and/or 639, a coin flip transition returns to the main thermostat operation screen, such as shown in screen 640. In the case shown in screen 640, a maximum setpoint of 73 degrees F. has been input. A lock icon 646 is displayed on the dial to notify the user that a maximum setpoint temperature has been set for the heating system. Screens 641, 642, 643, 644 and 645 show the behavior of the thermostat when locked, according to some embodiments. In this example, the user is trying to adjust the setpoint temperature above the maximum of 73 degrees. In screen 643 the user is asked for the PIN. If the PIN is incorrect, then the thermostat remains locked as shown in screen 644. If the PIN is correct the thermostat is unlocked and lock icon is removed as shown in screen 645, in which case the user can then proceed to change the current setpoint above 73 degrees F.

Figure 6D:
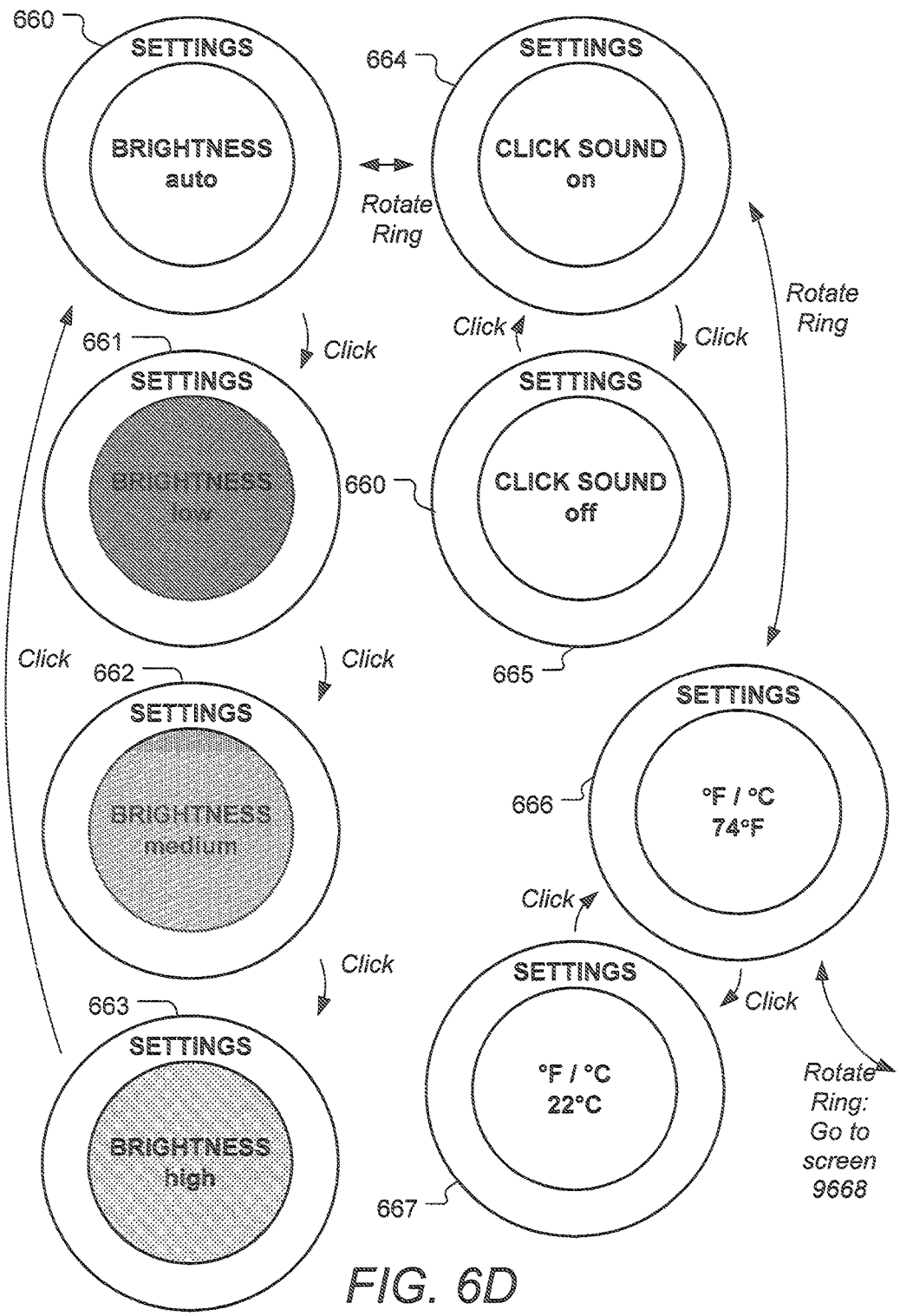

FIG. 6D shows sub-menu screen examples for settings for brightness, click sounds and Celsius/Fahrenheit units, according to some embodiments. Screens 660, 661, 662 and 663 toggle among four different brightness settings using the inward click input as shown in FIG. 6D. Specifically, the settings for auto-brightness, low, medium and high can be selected. According to some embodiments, the brightness of the display is changed to match the current selection so as to aid the user in selecting an appropriate brightness setting. Screens 664 and 665 toggle between providing, and not providing, audible clicking sounds as the user rotates the rotatable ring 312, which is a form of sensory feedback that some users prefer and other users do not prefer.

Screens 666 and 667 are used to toggle between Celsius and Fahrenheit units, according to some embodiments. According to some embodiments, if Celsius units is selected, then half-degrees are displayed by the thermostat when numerical temperature is provided (for example, a succession of 21, $21^5$, 22, $22^5$, 23, $23^5$, and so forth in an example in which the user is turning up the rotatable ring on the main thermostat display).

According to another embodiment, there is another sub-menu screen disk (not shown) that is equivalent to the "Brightness" and "Click Sound" disks in the menu hierarchy, and which bears one of the two labels "SCREEN ON when you approach" and "SCREEN ON when you press," the user being able to toggle between these two options by an inward click when this disk is displayed. When the "SCREEN ON when you approach" is active, the proximity sensor-based activation of the electronic display screen 316 is provided (as described above with the description accompanying FIG. 8C), whereas when the "SCREEN ON when you press" option is selected, the electronic display screen 316 does not turn on unless there is a ring rotation or inward click.

Figure 6E:
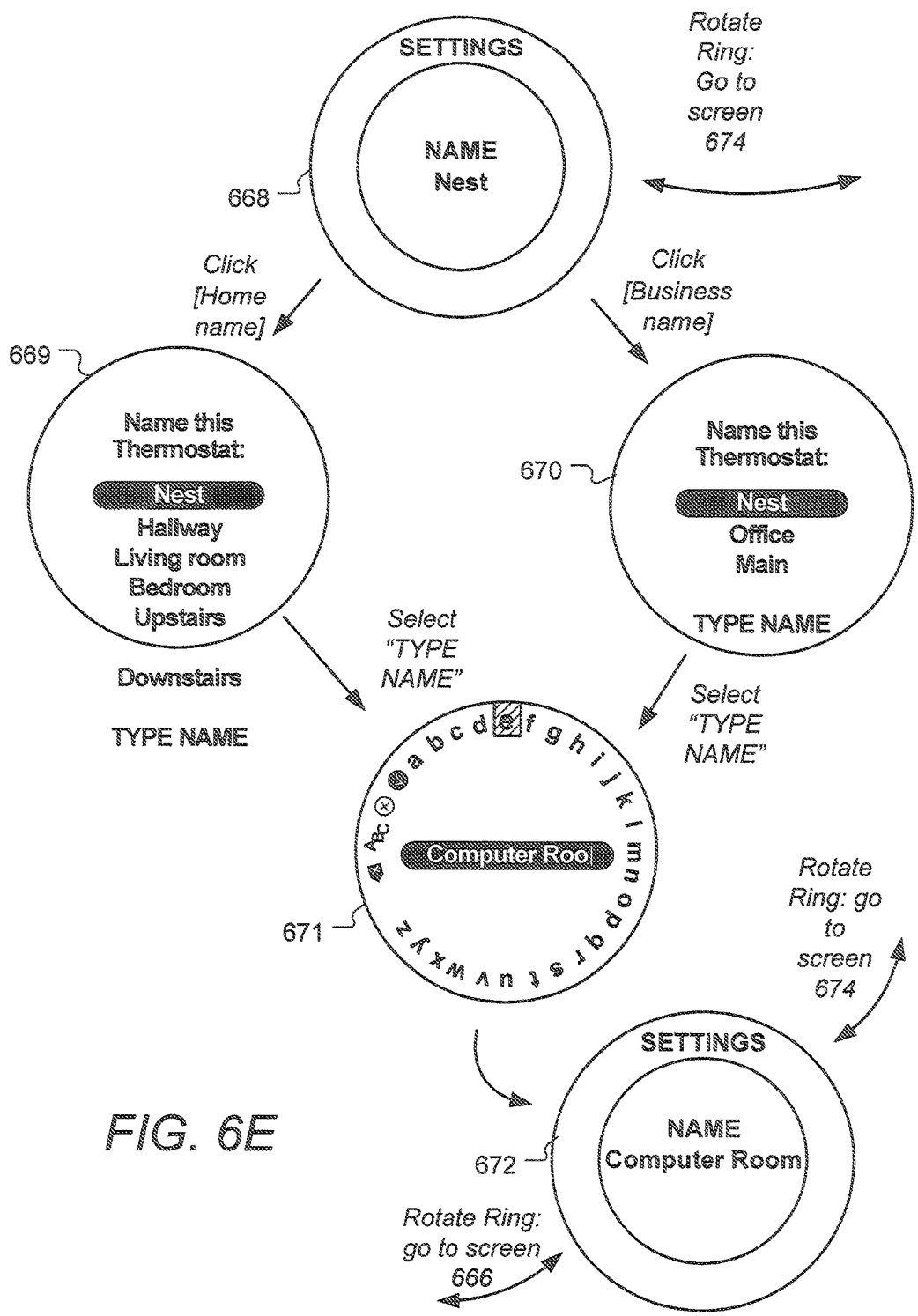

FIG. 6E shows a sub menu for entering or modifying a name for the thermostat, according to some embodiments. Clicking on screen 668 leads to either screen 669 in the case of a home installation or screen 670 in the case of a business installation. In screens 669 and 670 several common names are offered, along with the option of entering a custom name. Screen 669 shows an example of displaying a partially hidden list of selection options. As presented, only five of the seven options can fit on the screen. However, a user may be able to use rotatable ring 312 to view all of the options. Specifically, in this instance, sufficient clockwise rotation of rotatable ring 312 may allow "Downstairs" and "TYPE NAME" to appear on the screen. Either the entire screen may scroll upwards (which may partly or fully clip "Name this Thermostat") or just the options may scroll up (e.g., such that "Nest" and "Hallways" disappear).

If "TYPE NAME" is selected from either screen a character input interface 671 is presented through which the user can enter a custom name. As the user rotates rotatable ring 312, the alphanumeric characters may rotate at a similar or a same angular velocity. A temporarily selected character may be emphasized. For example, a character positioned at 12 o-clock on the device may be identified as the temporarily selected character. This character may be highlighted to emphasize this selection, as illustrated in FIG. 5B. A user may confirm their temporary selection of a first character of the name by clicking rotatable ring 312, and he may then select a second character of the name. The displayed characters may further comprise icons that, upon selection, will delete a most recently selected character, indicate that the password has been completely entered, return to a menu screen, etc. The newly selected (or inputted) name for the thermostat is displayed in the central disk as shown in screen 672.

Figure 6F:
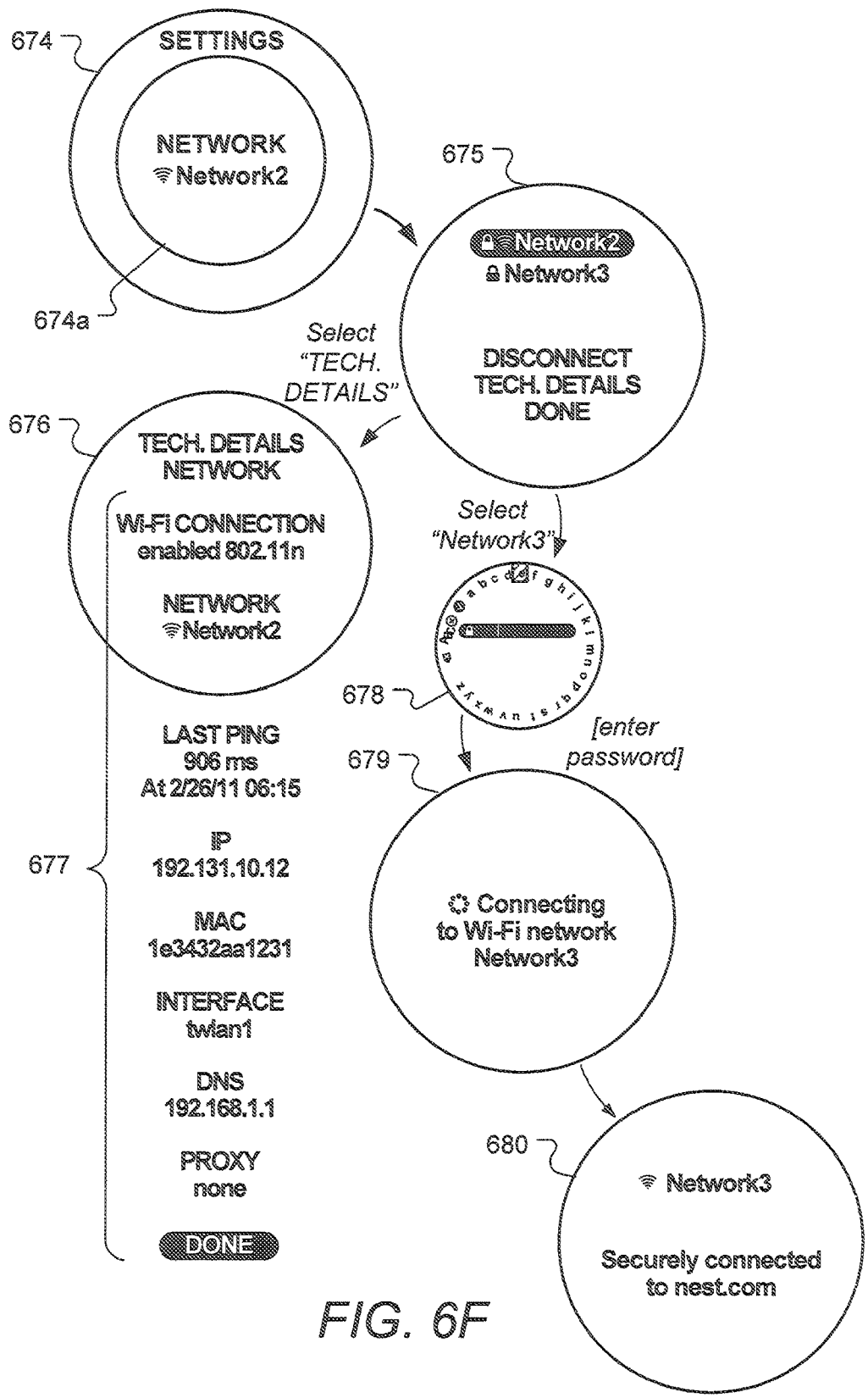

FIG. 6F shows sub-menu screens relating to network connection, according to some embodiments. In FIG. 6F, screen 674 shows a network sub menu disk 674*a* showing the current connected network name, in this case "Network2." The wireless symbol next to the network name indicates that the wireless connection to that network is currently active. Clicking leads to screen 675 which allows the user to select a different wireless network if available (in this case there is another available network called "Network3"), disconnect or obtain technical network details. If "TECH. DETAILS" is selected then screen 676 is displayed which, by scrolling using the rotatable ring 312, the user can view various technical network details such as shown in the list 677. If a different network is selected from screen 675, then the user is prompted to enter a security password (if applicable) using interface 678, after which a connection attempt is made while screen 679 is displayed. If the connection is successful, then screen 680 is displayed. Thus, FIG. 6F shows a plurality of types of input options: at screen 675, a user may select among a completely displayed, linear list of options; at screen 676, a user may select among a partly hidden, linear list of options that is scrollable; at screen 678, a user may select among an arcuately presented list of character options. All of these selections may be performed with a same and intuitive component, such as rotatable ring 312.

Figure 6G:
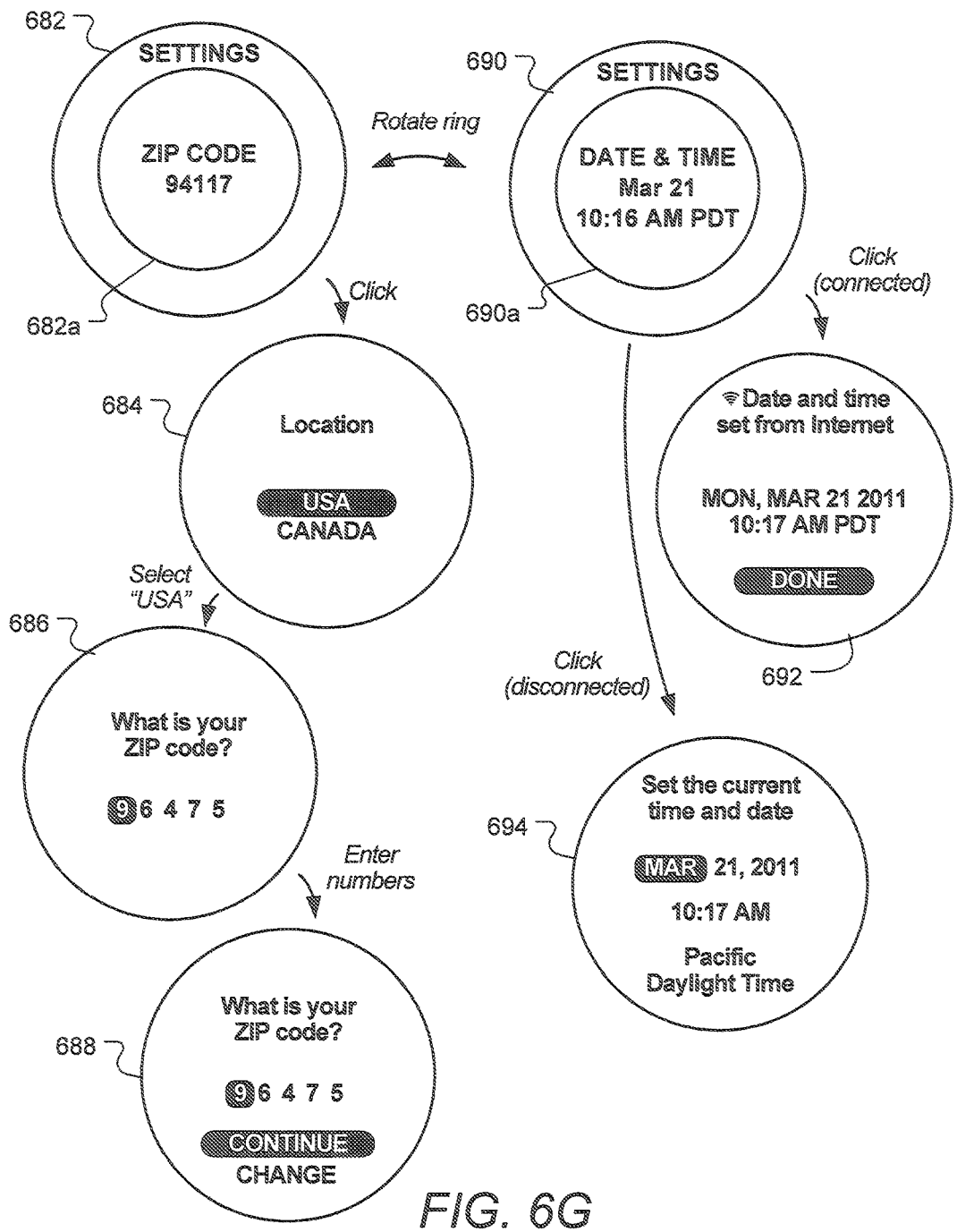

FIG. 6G shows settings screens relating to location and time, according to some embodiments. Screen 682 shows a sub-menu disk 682*a* having the currently assigned zip code (or postal code). Clicking leads to screen 684 for selecting the country. Selecting the country (e.g. "USA") provides the appropriate ZIP code/postal code format for the following screen. In this case "USA" is selected and the ZIP code is entered on screens 686 and 688. Screen 690 shows a sub-menu disk 690*a* having the current time and date. Clicking when the thermostat is connected to the Internet and in communication with the associated cloud-based server automatically sets the time and date as shown in screen 692. If the thermostat is not connected to the Internet, clicking leads to screen 694 in which the user can manually enter the time, date and daylight savings time information.

FIG. 6G shows yet another type of input option. As shown, when a user is inputting their ZIP code (on screens 686 and 688) or the date (on screen 694), only a temporarily selected option is presented to the user (not all possible options). For example, only "Mar" is shown in FIG. 5F, while additional possible months are not. A displayed number or month may be changed via rotation of rotatable ring 312.

Thus, FIG. 6A-6G the menuing system as navigated by outer-ring rotations and inward clicks may be used to receive many types of user inputs. One or more of these techniques may be used to present options and receive user selections. In some instances, a single component or combination of components may be used to present options and receive selections in different ways. For example, an outer ring and electronic display may allow a user to: (1) simultaneously view a plurality of options presented in a linear or semi-linear manner and use a rotatable ring to select an option; (2) simultaneously view a plurality of options presented in a arcuate manner and use a rotatable ring to select an option; and/or (3) view a subset of options (e.g., one option) corresponding to a temporarily selected option and use a rotatable ring to change the temporarily selected option (and thus the displayed option). Commonly assigned U.S. Ser. No. 13/269,501 includes additional details of set-up processes.

Figure 7A:
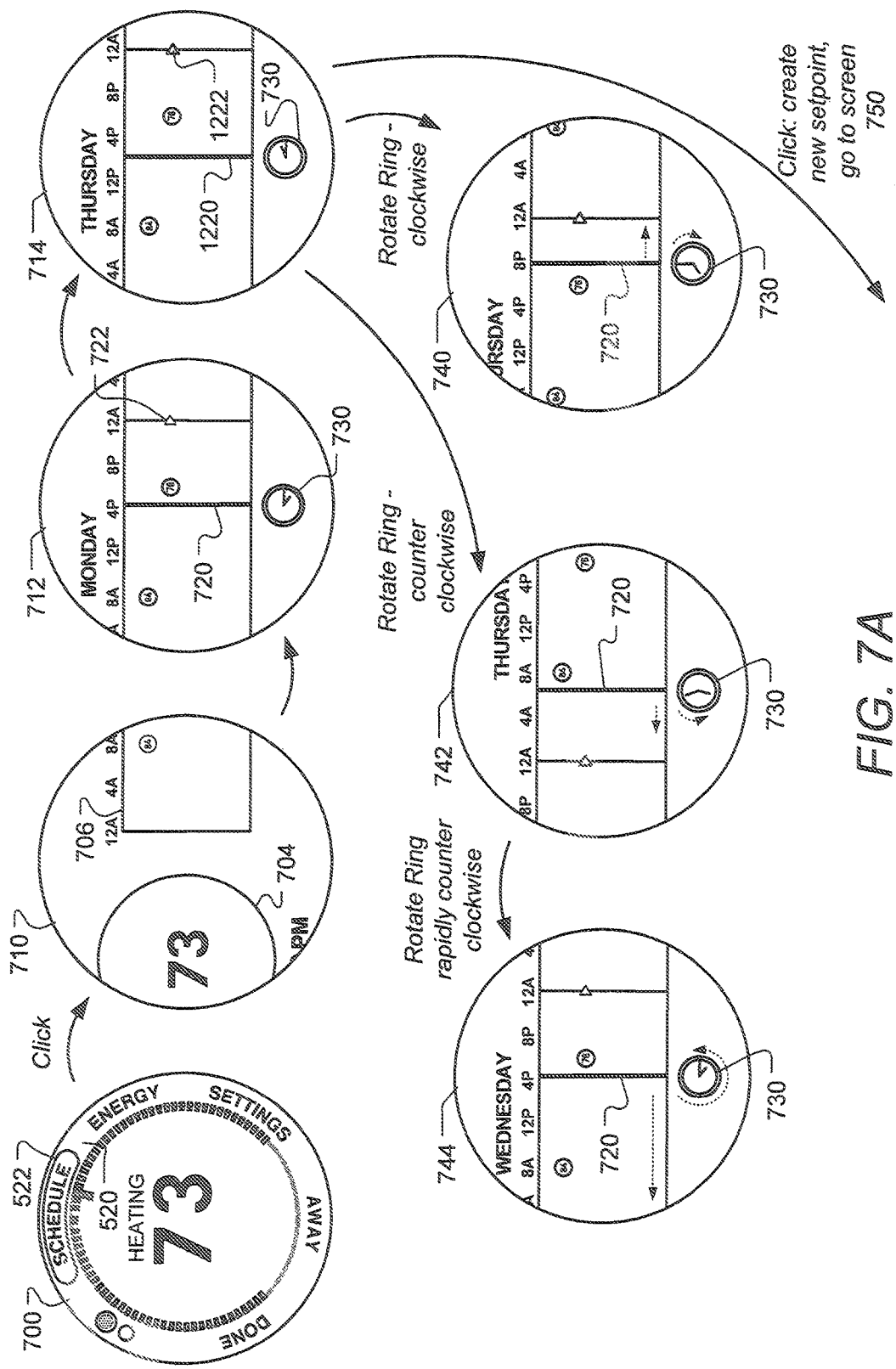
FIGS. 7A-7B show certain aspects of user interface navigation trough a multi-day program schedule on a user-friendly programmable thermostat, according to some preferred embodiments.

FIGS. 7A-7K show aspects of a general layout of a graphical user interface for a thermostat, according to some embodiments. The screens shown, according to some embodiments, are displayed on a thermostat 300 on round dot-matrix electronic display 316 having a rotatable ring 312 such as shown and described in FIGS. 3A-4. FIG. 7A shows a basic thermostat screen 700 in heating mode.

According to some embodiments, the foreground symbols and characters remain a constant color such as white, while the background color of the screen can vary according to thermostat and HVAC system function to provide an intuitive visual indication thereof. For example, according to a preferred embodiment, a background orange-red color (e.g. R/G/B values: 231/68/0) is used to indicate that the thermostat is currently calling for heating from the HVAC system, and a background blueish color (e.g., R/G/B values: 0/65/226) is used to indicate that the thermostat is currently calling for cooling from the HVAC system.

Further, according to some embodiments, the intensity, hue, saturation, opacity or transparency of the background color can be changed to indicate how much heating and/or cooling will be required (or how "hard" the HVAC system will have to work) to achieve the current setpoint. For example, according to some preferred embodiments, a black background is used when the HVAC system is not activated (i.e., when neither heating or cooling is being called for), while a selected background color that represents heat (e.g., orange, red, or reddish-orange) is used if the setpoint temperature is at least 5 degrees F. higher than the current ambient temperature, and while a selected background color that represents cooling (e.g., blue) is used if the setpoint temperature is at least 5 degrees F. lower than the current ambient temperature.

Further, according to preferred embodiments, the color can be faded or transitioned between the neutral color (black) and the HVAC active color (red-orange for heating or blue for cooling) to indicate the increasing amount of "work" the HVAC system must do to change the ambient temperature to reach the current setpoint. For example, according to some preferred embodiments, decreasing levels of transparency (i.e., an increasing visibility or "loudness" of the HVAC active color) are used to correspond to increasing discrepancy between the current ambient temperature and the setpoint temperature. Thus, as the discrepancy between the setpoint temperature and the current ambient temperature increases from 1 to 5 degrees, the "loudness" of the background HVAC active color increases from an almost completely transparent overlay on the black background to a completely non-transparent "loud" heating or cooling color.

It has been found that the use of variations in color display, such as described, can be extremely useful in giving the user a "feel" for the amount of work, and therefore the amount of energy and cost, that is going to be expended by the HVAC system at the currently displayed setpoint value. This, in turn, can be extremely useful in saving energy, particularly when the user is manually adjusting the setpoint temperature in real time, because the background color provides an immediate feedback relating to the energy consequences of the user's temperature setting behavior.

According to some alternate embodiments, parameters other than simply the difference in current to setpoint temperature can be used in displaying background colors and intensity. For example, time-to-temp (the estimated amount of time it will take to reach the current setpoint temperature), amount of energy, and/or cost, if accurately known can also be used alone or in combination determine which color and how intense (or opaque) is used for the background of the thermostat display.

According to some preferred embodiments the characters and other graphics are mainly displayed in white overlying the black, orange or blue backgrounds as described above. Other colors for certain displayed features, such green for the "leaf" logo are also used according to some embodiments. Although many of the screens shown and described herein are provided in the accompanying drawings with black characters and graphics overlaying a white background for purposes of clarity and print reproduction, it is to be understood that the use of white or colored graphics and characters over black and colored backgrounds such is generally preferable for enhancing the user experience, particularly for embodiments where the electronic display 316 is a backlit dot matrix LCD display similar to those used on handheld smartphones and touchpad computers. Notably, although the presently described color schemes have been found to be particularly effective, it is to be appreciated that the scope of the present teachings is not necessarily so limited, and that other impactful schemes could be developed for other types of known or hereinafter developed electronic display technologies (e.g., e-ink, electronic paper displays, organic LED displays, etc.) in view of the present description without departing from the scope of the present teachings.

Figure 7B:
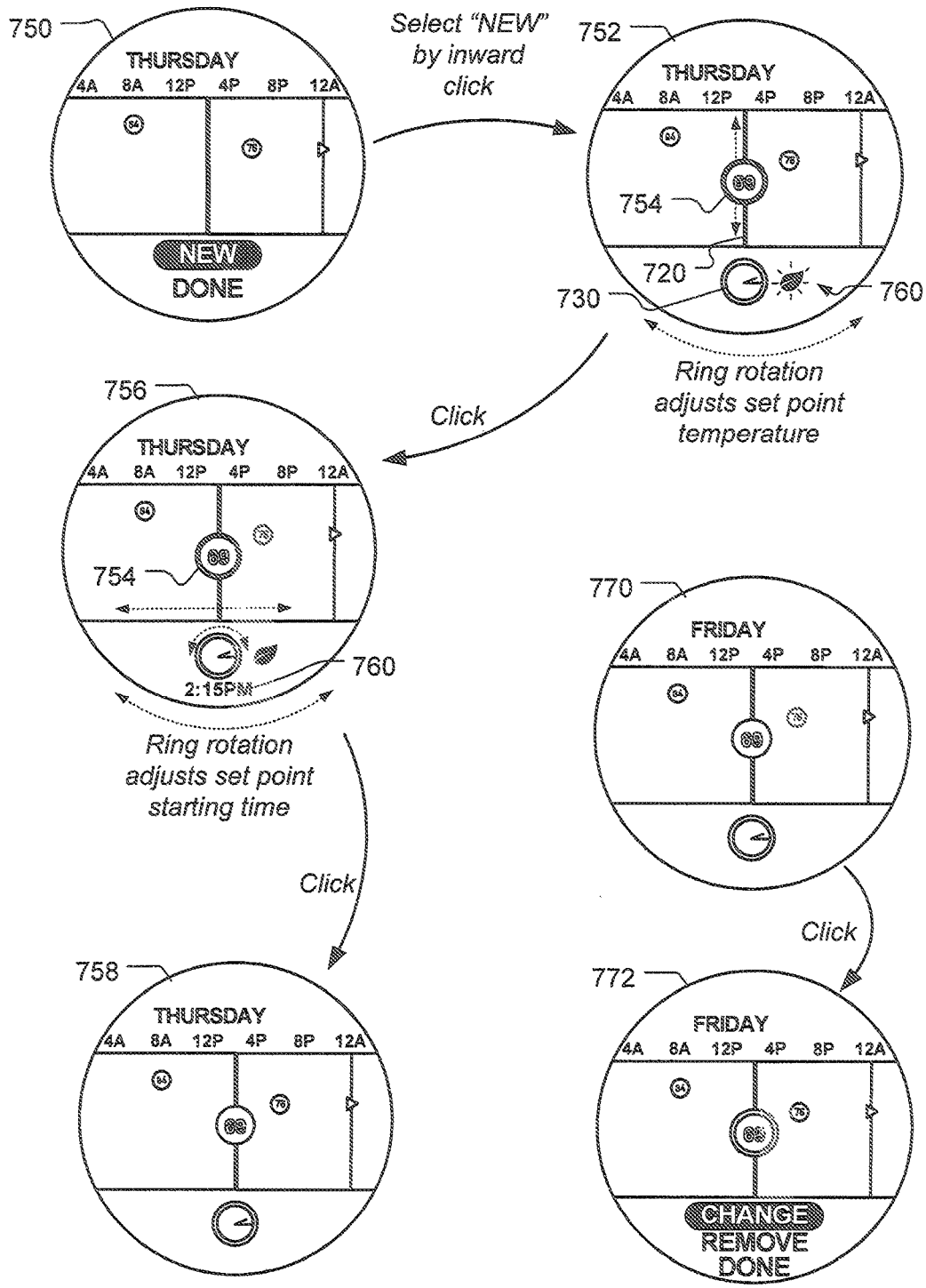

FIGS. 7A and 7B show certain aspects of user interface navigation through a multi-day program schedule, according to some preferred embodiments. The screens shown, according to some embodiments, are displayed on a thermostat 300 on round dot-matrix electronic display 316 having a rotatable ring 312 such as shown and described in FIGS. 3A-4. In FIG. 7A, screen 700 includes a rotating main menu 520 with an active window 522, as shown and described with respect to FIG. 5A. Selecting "SCHEDULE" leads to an animated transition from the rotating main menu screen to a horizontally-oriented week-long schedule viewer/editor. One example of an animated transition from the rotating main menu screen to a horizontally-oriented week-long schedule according to some embodiments is illustrated in the commonly assigned U.S. Ser. No. 29/399,636, supra.

Screens 710, 712 and 714 show portions of the animated transition. Screen 710 shows a shifting or translation to the schedule display that preferably begins with a removal of the circular main menu, followed by a shrinking (or zoom-out) of the circular standard thermostat view 704. Along with the shrinking, the circular standard view 704 begins to shift or translate to the left while the rectangular horizontally-oriented week-long schedule 706 begins to appear from the right as shown in screen 710. The week-long schedule begins with Monday, as shown in screen 712, and continues to translate to a position that corresponds to the current time and day of the week, which in this example is 2:15 PM on Thursday, which is shown in screen 714.

The horizontally-oriented schedule has a plot area in which the vertical axis represents the temperature value of the setpoints and the horizontal axis represents the effective time (including the day) of the setpoints. The schedule display includes a day of the week label, labels for each 4 hours (e.g. 12 A, 4 A, 8 A, 12 P, 4 P, 8 P and 12 A), a central horizontal cursor bar 720 marking the current schedule time, as well as a small analog clock 730 that displays hands indicating the current schedule time. Setpoints are indicated as circles with numbers corresponding to the setpoint temperature, and having a position corresponding to the setpoint temperature and the time that the setpoint becomes effective. According to some embodiments, the setpoint disks are filled with a color that corresponds to heating or cooling (e.g. orange or blue). Additionally, a continuation indicator mark 722 may be included periodically, for example at each day at midnight, that show the current setpoint temperature at that point in time. The continuation indicator mark can be especially useful, for example, when there are large time gaps between setpoints such that the most recent setpoint (i.e. the active setpoint) may no longer be visible on the current display.

According to some embodiments, timewise navigation within the week-long schedule is accomplished using the rotatable ring 312 (shown in FIG. 3A). Rotating the ring clockwise shifts the schedule in one direction, such as in screen 740, which is moves forward in time (i.e. the schedule plot area shifts to the left relative to the centrally located current schedule time cursor bar 720, and the analog clock 730 spins forward in displayed time). Rotating the ring counter-clockwise does the opposite, as shown in screen 742, shifting the schedule backwards in time (i.e. the schedule plot area shifts to the right relative to the centrally located current schedule time cursor bar 720, and the analog clock 730 spins backward in displayed time).

Thus, FIG. 7A shows yet another type of displaying input options and receiving user inputs. In this instance, available options are not presented as discrete options, but options along a continuum. Despite the apparent continuity of options, in some embodiments (though not in others) available options are actually discrete, as further described below. For example, it may only be possible for a user to set a time in 15-minute increments. The discretization may, or may not, be made apparent to the user depending on the input goal to be achieved. For example, rotation of rotatable ring 312 may cause cursor bar 720 to jump from one time point to a next time point, or audible clicks or tactile sensations may be produced by the device each time rotatable ring 312 was rotated by a sufficient angular amount to move to a next discrete option.

According to some preferred embodiments, the schedule time adjustment using the rotatable ring is acceleration-based. That is, the speed that the schedule time is adjusted is based on the speed of rotation of the ring, such that detailed adjustments in the current schedule time can be made by slowly rotating the ring, while shifts from day to day or over multiple days can be made by rapidly rotating the ring. According to some embodiments, the difference in acceleration rate factor is about 4 to 1 between the fastest and slowest rotating speeds to achieve both adequate precision and easy movement between days, or to the end of the week. Screen 744 shows an example of more rapid movement of the rotatable ring, where the schedule has been shifted at a higher rate factor than in screen 742. According to some embodiments the schedule time adjustments are accompanied by audible "click sound" or other noise to provide further feedback and further enhance the user interface experience. According to some preferred embodiments, the audible clicks correspond to each 15 minutes of schedule time that passes the time cursor bar 720.

If the time cursor bar 720 is not positioned on an existing setpoint, such as shown in screen 714, and an inward click is received, a create new setpoint option will be offered, as in screen 750 of FIG. 7B. In screen 750, if the user selects "NEW" then a new setpoint disk 754 will appear on the time cursor bar 720, as shown in screen 752. For some embodiments, this "birth" of the new setpoint disk 754 proceeds by virtue of an animation similar to that illustrated in the commonly assigned U.S. Ser. No. 29/399,637, supra, wherein, as soon as the user clicks on "NEW," a very small disk (much smaller than the disk 754 at screen 752) appears near the top of the cursor bar 720, and then progressively grows into its full-size version 754 as it visibly "slides" downward to "land" at a vertical location corresponding to a starting temperature setpoint value. For some embodiments, the starting temperature setpoint value is equal to that of an immediately preceding setpoint in the schedule. Rotating the ring will then adjust the setpoint temperature of the new setpoint disk 754 upward or downward from that starting temperature setpoint value.

According to some embodiments, an energy savings encouragement indicator, such as the leaf logo 760, is displayed when the new setpoint temperature corresponds to energy-saving (and/or cost saving) parameters, which aids the user in making energy-saving decisions. Once the temperature for the new setpoint is satisfactory, an inward click allows adjustment of the setpoint time via the rotatable ring, as shown in screen 756. Once the start time for the new setpoint is satisfactory, another inward click establishes the new setpoint, as shown in screen 758. If the time cursor bar 720 is positioned on an existing setpoint, such as shown in screen 770, an inward click brings up a menu screen 772 in which the user can choose to change the setpoint, remove the setpoint or return out of the schedule viewer/editor. If the user selects "CHANGE" then the user can make adjustments to the temperature and start time similar to the methods shown in screens 752 and 756, respectively.

According to some embodiments, setpoints must be created on even quarter-hours (i.e. on the hour, or 15, 30 or 45 minutes past), and two setpoints cannot be created or moved to be less than 60 minutes apart. Although the examples shown herein display a week-long schedule, according to other embodiments, other time periods can be used for the displayed schedule, such as daily, 3-day, two weeks, etc.

Figure 8:
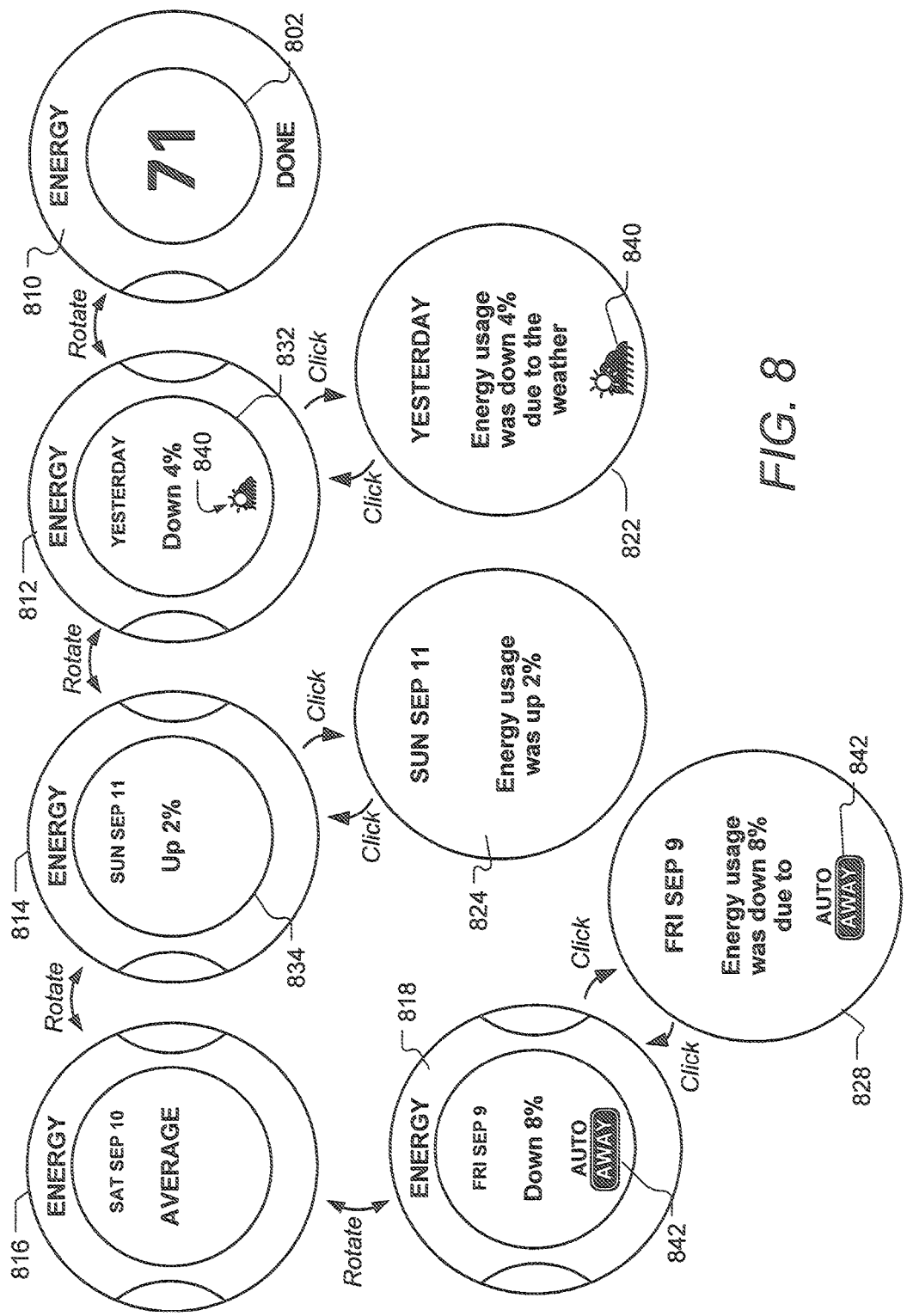
FIG. 8 shows example screens relating to the display of energy usage information on a user-friendly a programmable thermostat, according to some embodiments.

FIG. 8 shows example screens relating to the display of energy usage information, according to some embodiments. The screens shown, according to some embodiments, are displayed on a thermostat 300 on round dot-matrix electronic display 316 having a rotatable ring 312 such as shown and described in FIGS. 3A-4. From the rotating main menu such as shown in FIG. 5A, if the "ENERGY" option is selected, an interactive energy information viewer is displayed. According to some embodiments a shrinking and shifting of the standard thermostat display transition is used similar to the transition to the schedule viewer/editor described above. For example, screen 810 (see upper right side of FIG. 8) includes a shrunken disk 802 that corresponds to the current standard thermostat display, except that it is reduced in size.

Rotating the ring shifts the energy viewer to display energy information for a progression of prior days, each day being represented by a different window or "disk". For example, rotating the ring from the initial position in screen 810 leads first to screen 812 (showing energy information for "yesterday"), then to screen 814 (showing energy information for the day before yesterday), then to screen 816 (for three days prior), and then to screen 818 (for four days prior), and so on. Preferably, the shifts between progressive disks representative of respectively progressive time periods proceeds as an animated shifting translation in a manner similar to that described for FIG. 6A (screens 600-602-608) and the commonly assigned U.S. Ser. No. 29/399,621, supra.

According to some embodiments, the shifting information disks continue for 7 days prior, after which summary information is given for each successive prior week.

Shown on each energy information disk is a measure of the amount of energy used relative to an average. For example, in disk 832 for "yesterday" the energy usage was 4% below average, while in disk 834 for Sunday September 11 the energy usage was up 2%. Additionally, according to some embodiments, an explanatory icon or logo is displayed where a primary reason for the change in energy usage can be determined (or estimated). For example, in screen 822 a weather logo 840 is displayed when the usage change is deemed primarily due to the weather, and an auto-away logo 842 is displayed when the usage change is deemed primarily due to the auto-away detection and settings. Other logos can be used, for example, to represent changes in usage due to manual setpoint changes by users. Clicking on any of the information disk screens 812, 814 and 818 lead to more detailed information screens 822, 824 and 828 respectively.

As described herein, embodiments of the present invention allow for a user to set a setpoint temperature and for a thermostat to display information related to target temperatures to a user. A setpoint temperature may be associated with a particular time period (e.g., as set according to FIG. 7A-7B) or may be one for immediate effect.

As described further herein and in the commonly assigned applications, a thermostat may include a plurality of tick marks. Each tick mark may, e.g., represent a temperature that may be selected by a user as a setpoint temperature. The tick marks may be presented in an arcuate manner, such as around an outer portion of a circular display. One or more tick marks may be emphasized (e.g., lengthened, thickened, highlighted, surrounded, colored, adding nearby text or an icon, etc.). Emphasizing a tick mark may make it more prominent than other tick marks. One or more tick marks may also be de-emphasized (e.g., by shortening, thickening, graying, etc.). De-emphasizing a tick mark may make it more less prominent than other tick marks. In some instances, a tick mark corresponding to a current or previous selection is emphasized (e.g., identifying a current or previous setpoint). In some instances, a tick mark corresponding to an actual ambient temperature is emphasized. In some instances, a range of tick marks is emphasized or de-emphasized (e.g., identifying a range between an actual temperature and a new setpoint temperature).

Figure 9A:
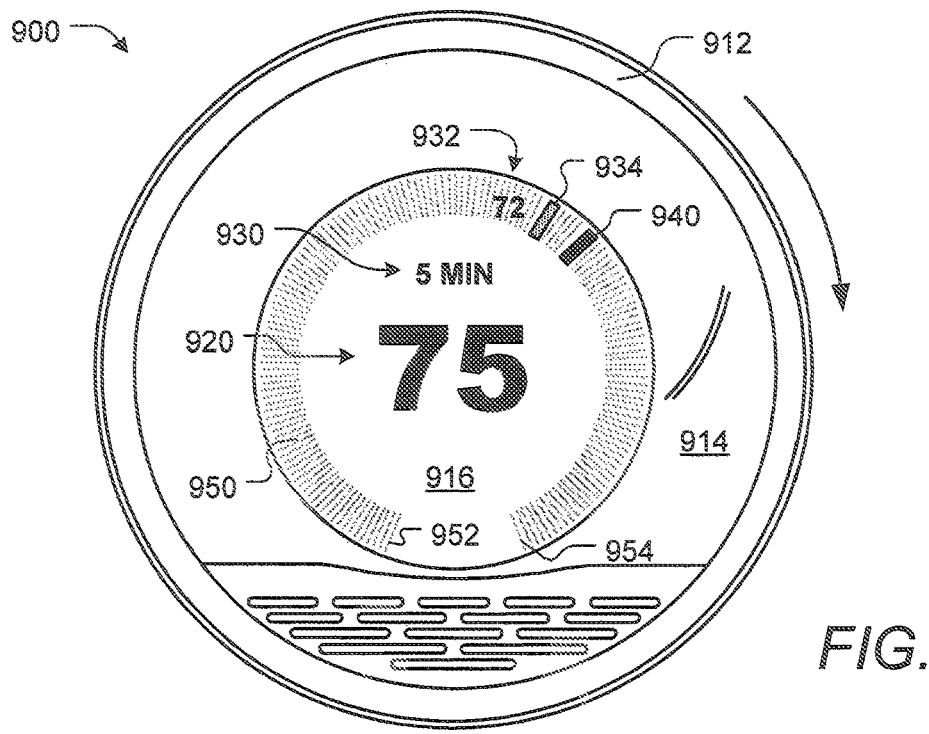
FIGS. 9A-9B illustrate further aspects of a user interface for a thermostat according to some embodiments.
Figure 9B:
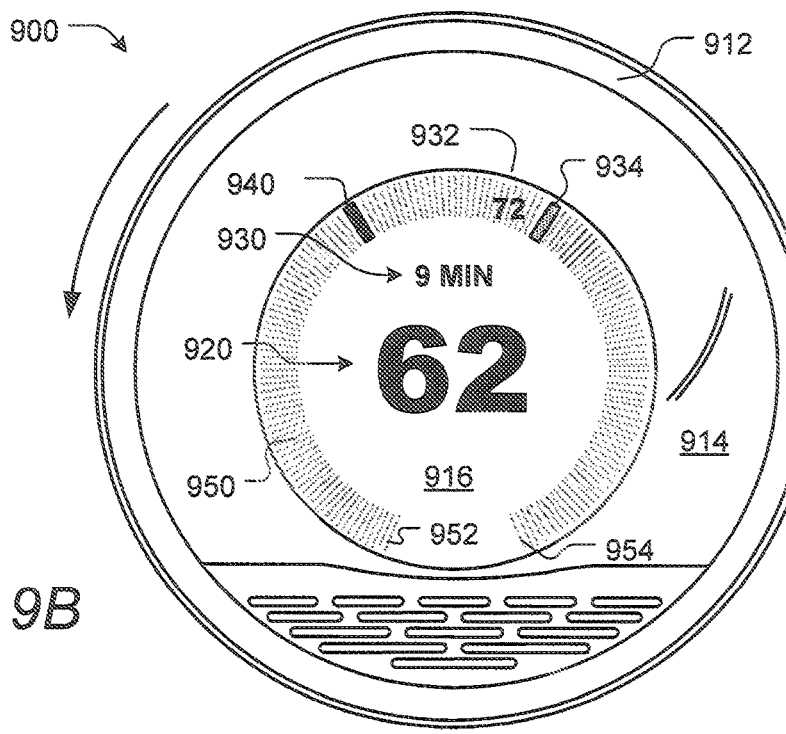

FIGS. 9A-9B illustrate further aspects of a user interface for a thermostat according to some embodiments. When the user rotates the ring 912 in either direction, thermostat 900 responds by displaying scale tick marks 950 around the outer area of display 916 as shown. According to some embodiments, the tick marks 950 are shown in decreased contrast with respect to the background, such as decreased brightness in cases there the information is displayed in lighter colors against a darker background. For example, according to some embodiments, the scale ticks 950 are shown at a brightness value of 75, where a value of 100 represents full brightness. The current temperature is shown by numerals 932, and graphically along the tick scale 950 by current temperature tick 934. According to some embodiments, current temperature tick 934 is wider than the scale ticks 950 and/or have higher contrast from the background, such as a brightness value of 86 against a darker background.

As the rotating ring 912 is moved by the user in the clockwise direction, the setpoint temperature is adjusted in an upward direction. For example, by rotating the outer ring 912 clockwise, the target temperature can be increased, and by rotating the outer ring 912 counter-clockwise, the target temperature can be decreased. The thermostat 900 may be configured to receive a plurality of types of inputs by virtue of the rotatable ring 912, such as a scrolling input and a selection input. For example, a rotation of the ring may allow a user to scroll through an array of selection options, and inwards pressure exerted on the ring (inward click) may allow a user to select one of the options (e.g., corresponding to a particular scroll position).

The outer rotatable ring 912 may include a component that may be physically rotated, or, in other embodiments, a static component that may sense a user's virtual rotation of the ring. For some embodiments, the outer rotatable ring 912 may include a touch pad configured to track arcuate motion of a user's finger on the touch pad. The touch pad may comprise, e.g., a ring-shaped or circular area. In some instances, the touch pad includes multiple portions (e.g., to detect arcuate motion in a first ring-shaped area and to detect tapping in a second inner circular area). Boundaries of a touch pad area may be identified to a user using, e.g., visual or tactile cues. For example, a ring-shaped touchpad area may be indented compared to neighboring areas on the thermostat 900, or the area may be a different color than neighboring areas.

For preferred embodiments such as those of FIG. 9A in which the outer ring 912 is a continuous loop without fiducial markers, one or more advantages are brought about. Thus, a user may physically rotate the ring (in embodiments in which the ring is configured to be physically rotatable) regardless of a starting position of the ring. Further, a user may select, e.g., a value of a variable (e.g., select a particular menu, a particular setpoint temperature value, etc.) by rotating the ring multiple times. This feature may be particularly advantageous as the user need not worry about precise rotations in order to select a desired option.

The setpoint temperature is displayed numerically using central numerals 920. Smaller words may be displayed used to indicate to the user that the central numbers represent the target temperature, instead of the current temperature, as well as indicate the HVAC function (e.g. heating or cooling) that is currently active. According to some embodiments, when the current temperature and the target temperature differ by more than a predetermined amount, for example 2 degrees, the central numbers 920 alternate between the current temperature. According to some embodiments, other graphical means, such as slowly oscillating the size of the numbers 920 can also be used to indicate that the HVAC system in the process of moving the enclosure temperature towards a target temperature.

The setpoint temperature is also displayed graphically in the form of a setpoint tick 940. According to some embodiments, the setpoint tick is wider and/or has even higher contrast than the current temperature tick 934, for example a brightness value of 100 against a darker background. Note that the location of the setpoint tick 940 depends on the setpoint temperature, with higher temperatures being represented in the clockwise direction and lower temperatures in the counter-clockwise directions.

In FIG. 9B, the setpoint temperature is being adjusted to be lower than the current temperature (for example, when the user is calling for cooling rather than heating) in which case the setpoint tick 940 is shown to the left of the current temperature tick 934. According to some embodiments, the current temperature numerals 932 is located on the left side of the of the current temperature tick 934 while heating and on the right side when cooling. Note also that the ends 952 and 954 of the scale ticks 950 can represent the safety minimum temperature and maximum temperature, respectively. According to some embodiments, after a suitable amount of time, such as three seconds, of user inactivity (i.e. no further rotation of ring 912), the scale ticks 950 fade to transparent. Note that although in this example, clockwise is used for higher temperatures and counter clockwise for lower temperatures, according to some embodiment these directions are reversed.

Figure 10A:
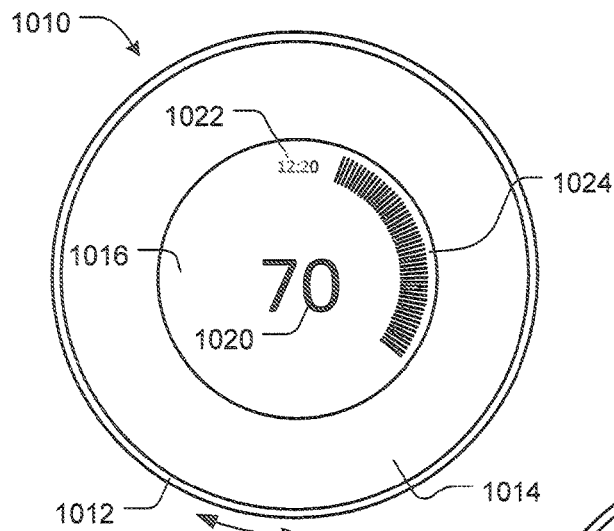
FIGS. 10A-10C illustrate a thermostat for controlling temperature in an enclosure, according to some embodiments.
Figure 10B:
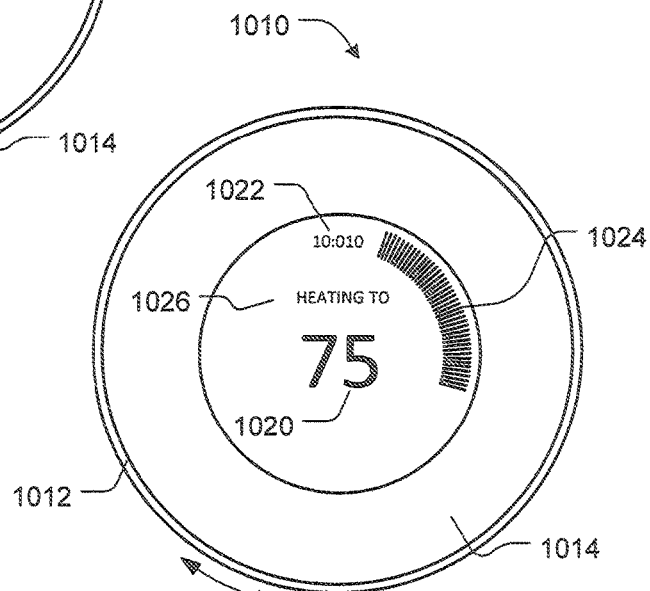
Figure 10C:
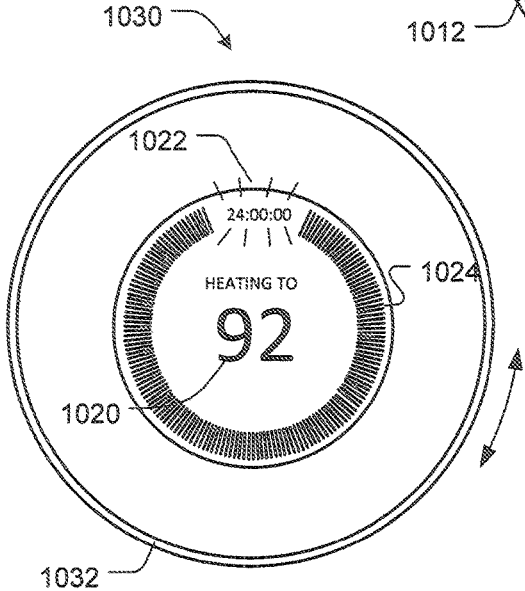

In FIGS. 9A-9B, an estimated time interval 930 for reaching the setpoint temperature is displayed. According to some embodiments, a thermostat may display an estimated time to reach the current target temperature. The time to reach the target temperature may be, e.g., displayed to the user in one, two or more ways. For example, FIGS. 9A-9B present a numerical indication minute-rounded estimate of the time period. FIGS. 10A-10C also illustrate numerical indications of an estimated time-to-target temperature period. In these embodiments, the numerical time includes an estimate with hours-, minutes- and seconds places. In contrast to the example shown in FIGS. 9A-9B, no units are shown.

Additionally, or alternatively according to some embodiments, a graphical display 1024 is used to indicate the amount of time to reach the target temperature. Thus, as time elapses and the temperature in the enclosure gets closer to the target temperature, the numerical display 1022 and the graphical display 1024 change to reflect shorter times. For example, an initial area may be associated with a maximum display heating time (e.g., 24 hours). A fraction may be calculated based on the predicted time-to-target temperature time relative to the maximum time. A portion of the initial area corresponding to the fraction may be distinguished from the rest of the area. For example, the portion may be filled with tick marks or shaded. FIGS. 10A-10C illustrate an example in which the initial area comprises an arcuate region around most of the display. A portion of the area is filled with tick marks, the filled portion being representative of a time-to-target temperature prediction relative to a 24-hour period.

According to some embodiments, a maximum time can be displayed, such as 24 hours, if the estimated time to reach the target temperature is greater than that amount, or if it is estimated that the HVAC system is unable to obtain the target temperature given its capacity and/or other conditions (e.g. such as outdoor temperature). FIG. 10C illustrates an example of such a display mode. In this example, the target temperature has been set to a high temperature as indicated by central number display 1020. The graphical display 1024 is showing a maximum time. Numerical display 1022 is showing a maximum time, in this case 24 hours. According to some embodiments, the either the numerical display 1022 and/or the graphical display 1024 can blink so as to indicate a warning or error to the user.

Figure 11:
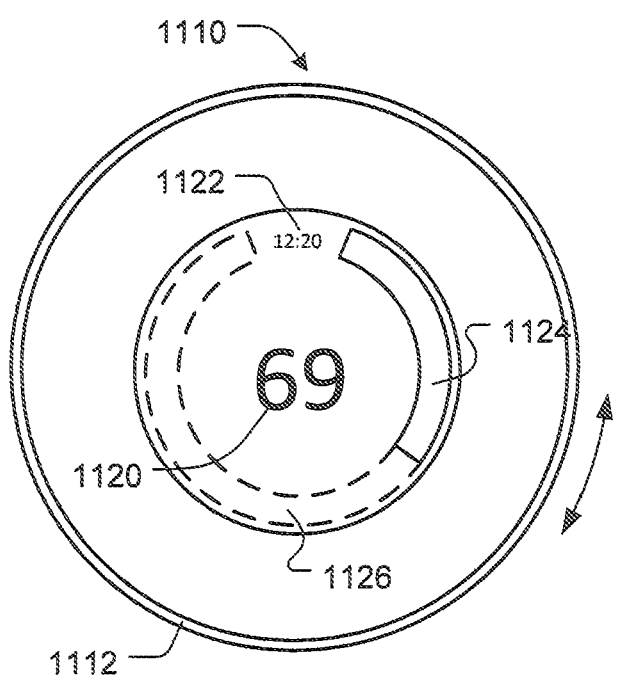
FIG. 11 shows a thermostat adapted to display time to reach a target temperature, according to some other embodiments.

FIG. 11 shows a thermostat adapted to display time to reach a target, temperature according to some other embodiments. Thermostat 1110 is similar to thermostat 1010 as shown in FIGS. 10A-10C with a large display area, rotatable outer ring 1112, large central numbers 1120 and numerical time to reach a target temperature display 1122. However, the graphical display 1124 is slightly different in that is shows a solid curved bar that fills up an annular section 1126 instead of group of radial bars such as shown in FIGS. 10A-10C.

Figure 12A:
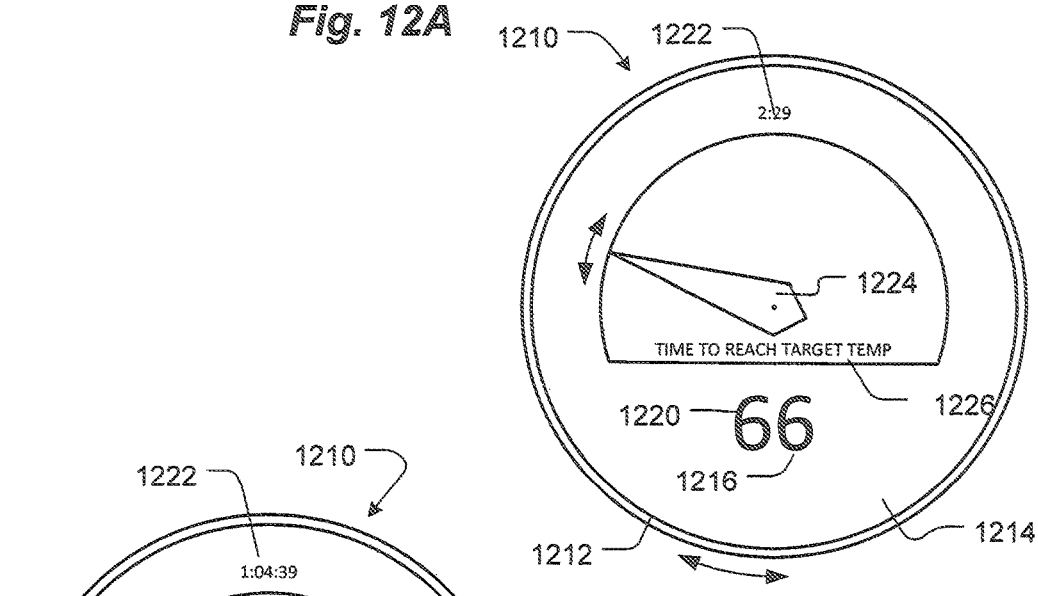
FIGS. 12A-12C show a thermostat adapted to display time to reach a target temperature, according to some other embodiments.
Figure 12B:
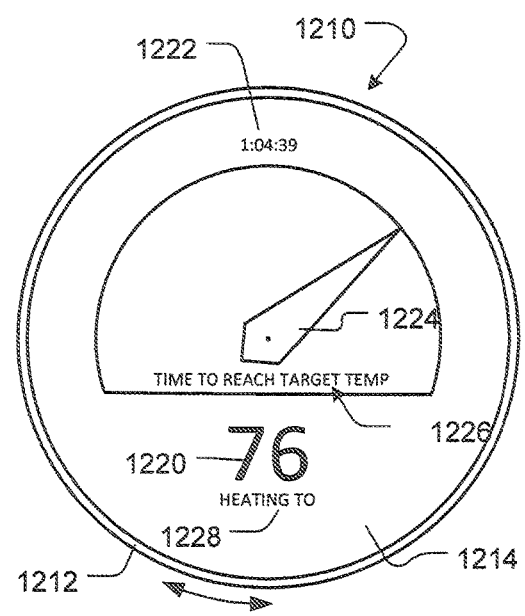
Figure 12C:
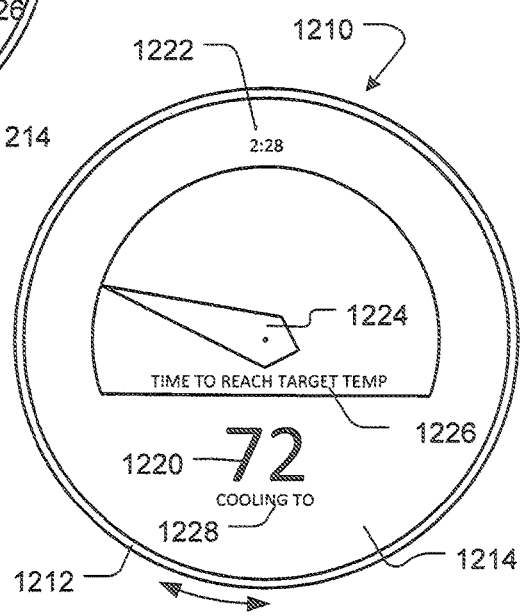

FIGS. 12A-12C show a thermostat adapted to display time to reach a target temperature, according to some other embodiments. In addition to a numerical display 522 of an estimated time-to-target temperature period, according to some embodiments, a graphical display in the form of a needle 1224 is used to indicate the amount of time to reach the target temperature. Label 1226 informs the user that the needle position represents the estimated time for each the target temperature. Thus, as time elapses and the temperature in the enclosure gets closer to the target temperature, the numerical display 1222 and the graphical display 1224 change to reflect shorter times.

In FIG. 12B, the central numbers 1220 display the target temperature, which in this case is 76 degrees. The smaller words 1228 are used to indicate to the user that the central numbers represent the target temperature, instead of the current temperature, as well as indicate the HVAC function (e.g. heating or cooling) that is currently active. FIG. 12C illustrates an example when the HVAC cooling system is active, according to some embodiments. In the example shown, the central numbers 1220 display the target temperature, which in this case is 72 degrees. The smaller words 1228 are used to indicate to the user that the central numbers represent the target temperature, instead of the current temperature, as well as indicate that the HVAC cooling function is currently active.

Other embodiments of displaying time-to-target temperature indicators (such as those described in U.S. Ser. No. 12/984,602) are further contemplated. For example, a thermostat may calculate and display multiple times, such as a time-to-target temperature when using a single stage and when using two stages in a building having a multi-stage HVAC system. By displaying such information, a user can be educated as to the behavior of the conditioned enclosure under the influence of various passive and active conditioning systems.

As further examples, a time to reach the target temperature may be calculated and displayed as drifting, that is, without active HVAC, input. For example such a display could be used when the target temperature is being lowered during the nighttime or and expected un-occupied time. A target temperature may further comprise a resting temperature which is calculated as the temperature the conditioned area would come to rest at without any active HVAC system input. By displaying such information, a user can be further educated as to behavior of the conditioned enclosure.

Providing a thermostat that displays the estimated time to reach a target temperature advantageously conveys to the user an impact of the target temperature decision on energy use as well as an increased awareness of HVAC system usage. When a user make a decision to manually input a new target temperature, the user receives important feedback as to how hard the HVAC system needs to work to obtain that temperature. It has been found that time is a very good parameter to display to a user in order to convey to an average non-technical user the relative effort or difficulty for the HVAC system to obtain a given target temperature. As described more fully below, according to some embodiments, the display of the estimated time to reach the new target temperature is made in real time, so that the user can nearly immediately see the impact of the user's decisions. It has been found that in this way, the user is advantageously trained or educated so as to become more intuitively familiar with the HVAC system, which in turn leads to more economical and environmentally friendly use of energy. It has been found that many HVAC users are falsely believe that setting a higher target temperature will make the space warm up faster in the case of heating, and/or believe that setting a lower target temperature will make the space cool down faster in the case of cooling. Displaying the time to reach the target temperature thus educates that user that this is usually not the case. Although displaying the time to the target temperature may not directly save energy, it gives the user a better understanding about HVAC usage and may therefore allow for greater savings in the long run. According to other embodiments, other parameters than time can be displayed to a user to provide useful feedback to the user.

Figure 13:
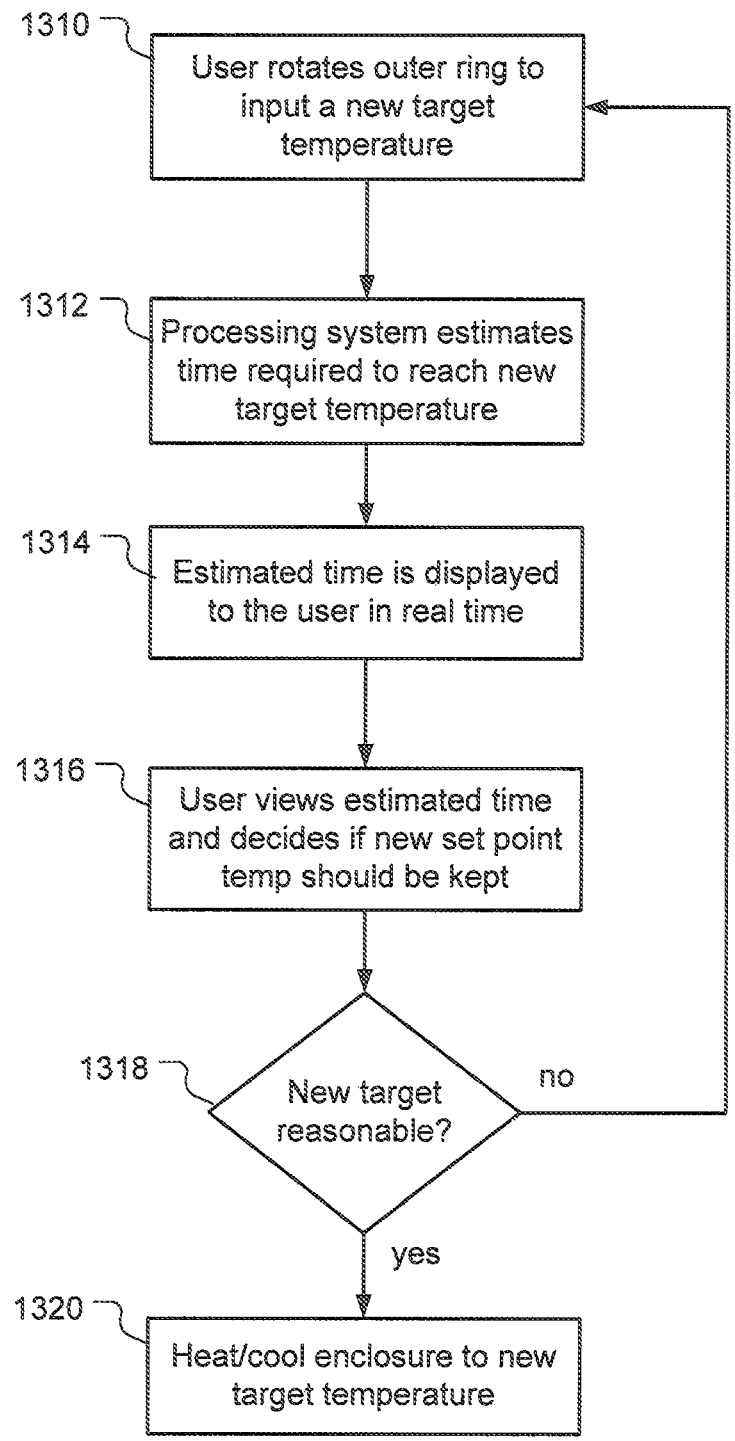
FIG. 13 is a flow chart showing steps in real time display of estimated time to reach a target, temperature according to some embodiments.

FIG. 13 is a flow chart showing steps in real time display of estimated time to reach a target temperature, according to some embodiments. In step 1310 the user inputs a new target temperature, for example by rotating an outer ring of a thermostat. In step 1312, the thermostat's processing system calculates a time estimated to reach the target temperature. In step 1314 the estimated time is displayed to the user. The steps 1312 and 1314 are preferably performed quickly, such as a few hundreds of milliseconds or less, such that the user perceives a nearly instantaneous response to the new target temperature input. In step 1316, the user view the displayed estimated time and decides in step 1318 if the new target should be kept in light of the estimated time to reach the new target temperature. If the estimated time is not reasonable, the user sets a new target. If the estimated time is reasonable, in step 1320, the target temperature is kept and the HVAC system heats or cools the enclosure to the new target temperature. It has been found that if the calculation and display is performed in real time, a beneficial education of the user as to the workings, efficiencies and limitations of the HVAC system is provided.

Figure 14:
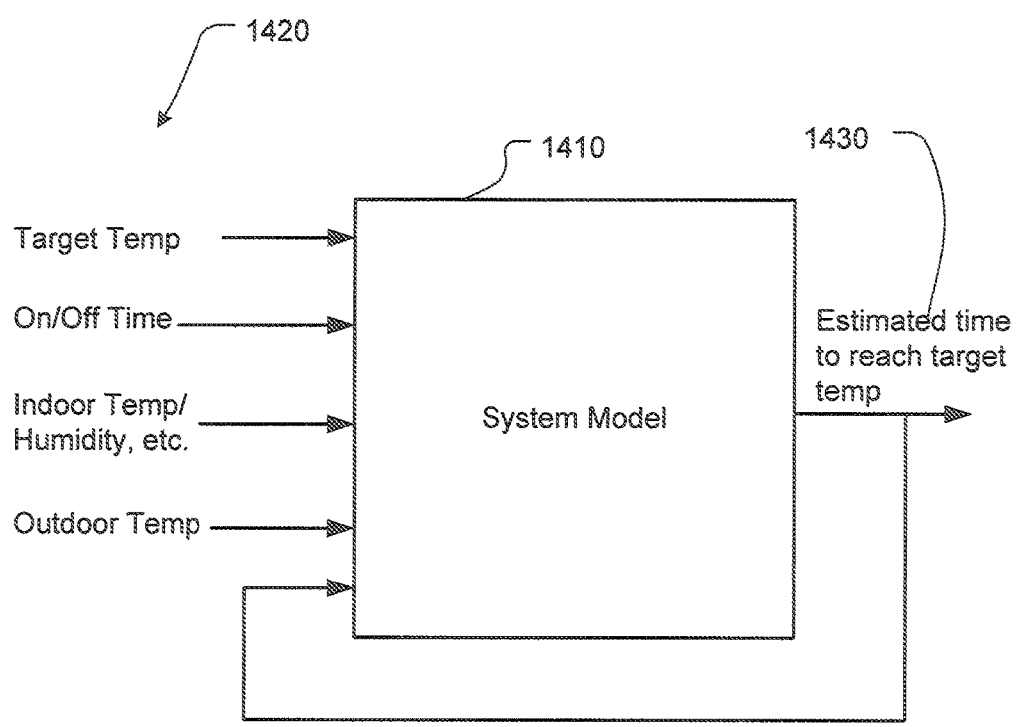
FIG. 14 is a block diagram illustrating the calculation of a time to reach a target temperature, according to some embodiments.

FIG. 14 is a block diagram illustrating the calculation of a time to reach a target temperature, according to some embodiments. A model of thermodynamic characteristics of the enclosure is preferably used. Additional detail regarding such models may be found in commonly assigned U.S. Ser. No. 12/881,463. According to some embodiments, a system model 1410 is used as described in the '463 Application.

According to some embodiments, system model in 1410 is a mathematical model that can learn the dependence of time-to-target temperature on several thermal and climate factors. The system model 1410 may be based on a system identification algorithm, which may be selected from amongst a plurality of algorithms (e.g., including different inputs, coefficients, etc.), the identified algorithm being estimated to effectively calculate a time to reach a target temperature. According to some embodiments, the inputs 1420 can include both current indoor temperature and a window of temperature measurements immediately prior to the calculation. Other inputs can be an indicator of whether a single stage or several stages of cooling or heating are activated at the time. The model may also take the length of each of the cooling or heating time elapsed. Other environmental factors such as outdoor temperature, indoor and/or outdoor humidity can also be inputs to the models. The output 1430 of the model is the estimated time to reach the target temperature. In some embodiments, the output may also contain an optional statistical confidence value representing our belief in the estimate.

The model may learn the dependence of the outputs on the inputs using statistical methods and machine learning algorithms. For example, the computation may be done using a weighted mean of past observations, linear or non-linear regression, recursive filtering including Kalman filtering or other online or batch system identification methods for dynamical systems.

According to some embodiments, the computation is carried out continuously to account for continually changing inputs. The display of the time to temperature is updated continually to reflect the current estimate from the algorithm.

According to some embodiments, other types of algorithms are used to calculate the time to reach a target temperature. For example other techniques can be used to calculate certain intermediate values, such as house rest temperature, which can be used along with current temperature and outdoor temperature to calculate the time to target. According to some embodiments, a look up table is used in the model 1410.

According to some embodiments the computation system that carries out the algorithm may reside at a location external to the thermostat, such as a computer located within the structure being conditioned or a computer or processing system located at a remote location. According to such embodiments. The computer or processing system making the computation may communicate with the thermostat to gather the inputs and communicate back the output for display.

According to some embodiments, the computation and display is made to the user during the time in which an observer sees the display. According to some embodiments, the computation and display is made in less than about 1 second. According to some embodiments, the computation and display is made in less than about 0.5 seconds.

In the normal, standard, or default mode of operation, a single default setpoint temperature may be displayed. A user may select a different setpoint temperature by, e.g., rotating outer ring 312 clockwise to increase the temperature or counter-clockwise to decrease the temperature. As the selection changes, the temperature numerically displayed on the display changes. Further a plurality of tick marks are presented around an outer edge of the display, and a tick mark corresponding to the modified setpoint temperature is emphasized (e.g., by lengthening, thickening, darkening or surrounding the mark).

Available setpoint temperature options may be discretized (e.g., to allow a user to set the temperature with a granularity of, e.g., about 1° F.) and bounded (e.g., to set a maximum heating temperature at 90° F. and a minimum cooling temperature at 55° F.). A symbol may further be displayed to symbolize, e.g., how energy friendly or economical a current setpoint temperature is. For example, a green leaf/smokestack may represent environmentally friendly/wasteful temperature options.

As described above, dynamic predictions of time-to-target temperature may be provided to a user. Thus, a user may have an absolute-time estimate about how much longer it will take before arriving at their desired temperature. In some embodiments, a relative estimate is further or alternatively provided. The relative estimate may include, e.g., a temperature-based or time-based estimate of a fraction of a total heating or cooling that has occurred since a given time point (e.g., a setpoint time or a time at which a user input a new temperature) or is yet remaining. This indication may be, e.g., textually provided (e.g., "Temperature Adjustment 40% Complete") and/or graphical.

Figure 15:
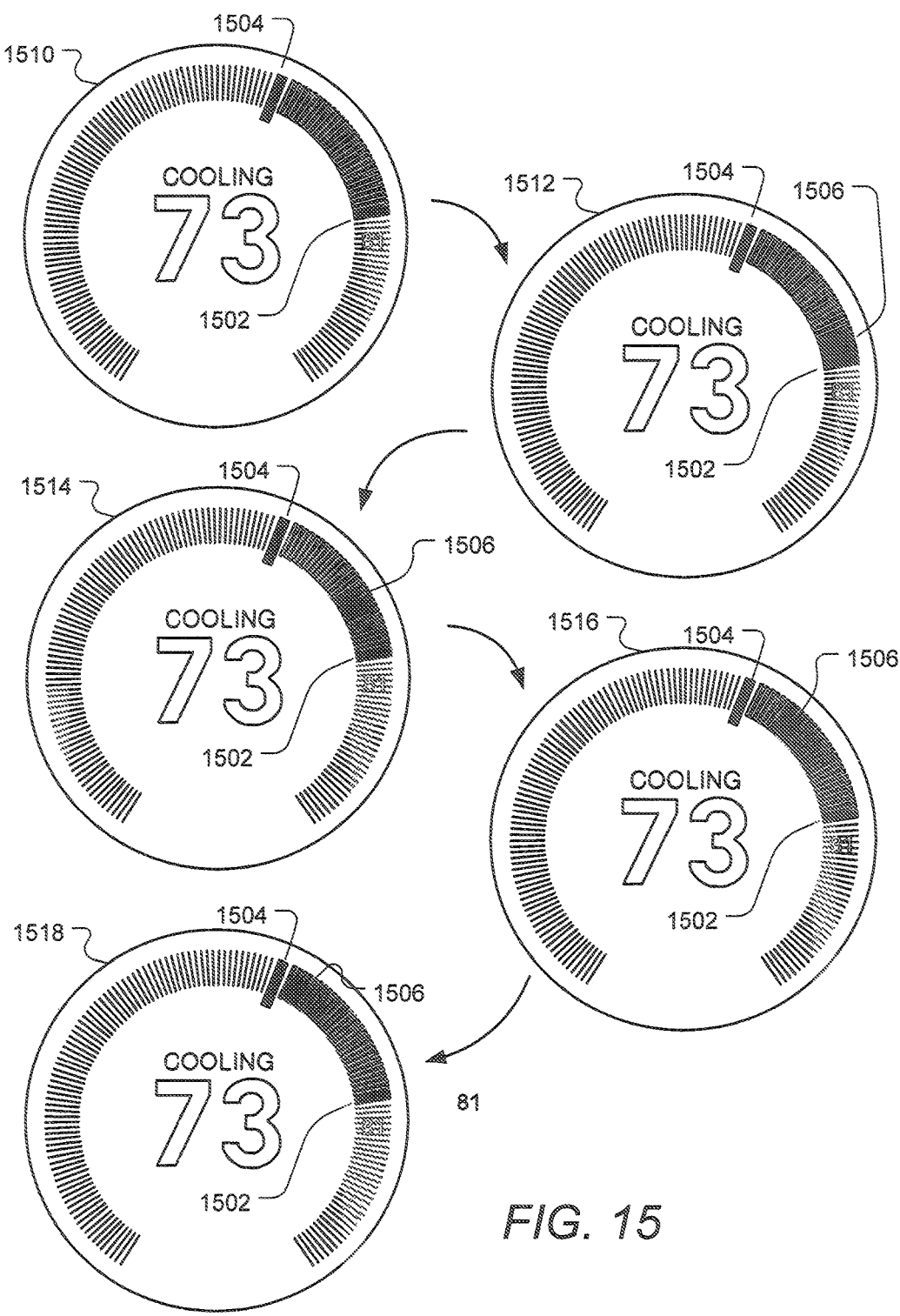
FIG. 15 shows example screens for displaying an animated tick-sweep on a user-friendly a programmable thermostat, according to some embodiments.

For example, FIG. 15 provides an illustration of an animated tick-sweep, according to some embodiments, identifying in a visually pleasing manner to the user that the HVAC system is actively working to move the ambient temperature closer to the setpoint temperature. The animated tick sweep of FIG. 15 represents one of the ways in which a thermostat user interface according to the present teachings can both delight and inform the user. In this instance, the system is cooling an environment to 73 degrees F. Current ambient temperature tick mark 1502 and setpoint tick mark 1504 graphically represent starting and ending points associated with the cooling process.

An animation is preferably displayed to enhance the user interface experience in which several highlighted background tick marks "sweep" across the space starting at the current temperature tick mark and ending at the setpoint temperature tick mark. One example of an animated tick-sweep according to some embodiments is illustrated in the commonly assigned U.S. Ser. No. 29/399,630, supra. In the case of cooling, shown in successive screens 1510, 1512, 1514, 1516 and 1518, highlighted background tick marks 1506 "sweep" from the current temperature tick mark 1502 to the setpoint tick mark 1504. In the case of heating, the highlighted background tick marks sweep in the opposite direction. By way of example and not by way of limitation, the animated "tick sweep" of FIG. 15 (i.e., the progression of screens 1510 through 1518) can take place over a time period of about one second, and then be repeated about once every ten seconds, for the duration of the cooling cycle. Notably, the "tick sweep" will be viewable by the user only if the electronic display screen is active, and will not be viewable if the electronic display screen is inactive. For example, for embodiments in which the electronic display is not active all the time but rather is proximity-triggered, the viewer will only see the tick mark sweep when they walk up to the thermostat unit, whereas if they are merely sitting in a chair across the room they will not see the tick mark sweep, even though the heating or cooling cycle of the HVAC system is indeed active, because the electronic display will be dark. On the other hand, for optional embodiments in which the electronic display is indeed active all the time, or is active according to some manufacturer-defined or user-defined criterion other than proximity-triggering, the tick sweep will be viewable whenever both the HVAC system (heating or cooling) and the electronic display are active.

Another feature that may be used to convey information or messages to a user is color or shading. For example, text, tick marks or backgrounds may be shaded to convey particular meanings. As described in greater detail herein, colors may represent current activity (e.g., a blue color identifying a cooling process), environmental messages (e.g., a red-colored icon identifying environmentally unfriendly settings), etc. Color may also be used to distinguish amongst symbols or tick marks. For example, one or more tick marks may be differentially colored (e.g., to identify a tick mark/temperature of interest), and/or a shaded region may be associated with one or more tick marks (e.g., to represent progress of a cooling or heating process).

Figure 16A:
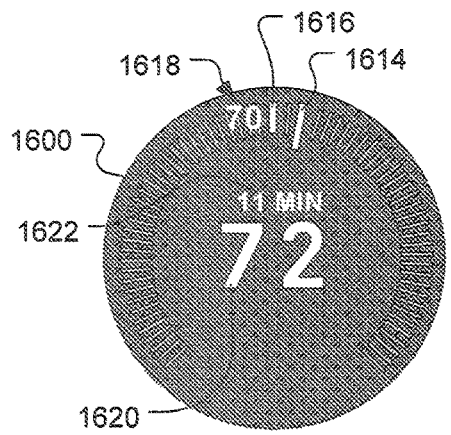
FIGS. 16A-16K show aspects of a general layout of a graphical user interface for a thermostat, according to some embodiments.

In FIG. 16A, screen 1600 has a red-orange background color with white central numerals 1620 indicating the current setpoint of 72 degrees F. The current setpoint of 72 degrees is also shown by the large tick mark 1614. The current ambient temperature is 70 degrees as shown by the small numerals 1618 and the tick mark 1616. Other tick marks in a circular arrangement are shown in a more transparent (or more muted) white color, to give the user a sense of the range of adjustments and temperatures, in keeping with the circular design of the thermostat, display area and rotatable ring. According to some embodiments, the circular arrangement of background tick marks are sized and spaced apart so that 180 tick marks would complete a circle, but 40 tick marks are skipped at the bottom, such that a maximum of 140 tick marks are displayed. The setpoint tick mark 1614 and the current temperature tick mark 1616 may replace some the of the background tick marks such that not all of the background tick marks are displayed.

Additionally, the current temperature is displayed numerically using numerals 1618 which can also be overlaid, or displayed in muted or transparent fashion over the background tick marks. A tick mark may be emphasized by, e.g., lengthening the tick mark, thickening the tick mark, differentially coloring the tick mark, highlighting the tick mark, adding text or a symbol near the tick mark, etc. According to some embodiments, so as to accentuate visibility the setpoint tick mark 1614 is displayed in 100% opacity (or 0% transparency), is sized such that it extends 20% farther towards the display center than the background tick marks, and is further emphasized by the adjacent background tick marks not being displayed. In some embodiments, different tick marks are emphasized or de-emphasized in different ways. For example, a current-temperature tick mark may be presented at 12 o-clock and accompanied by numerical text (identifying the current temperature), a setpoint temperature may be lengthened and thickened compared to other tick marks, tick marks corresponding to environmentally friend or un-friendly options may be color-coded, and/or non-selectable tick marks may be de-emphasized (e.g., "greyed").

Figure 16B:
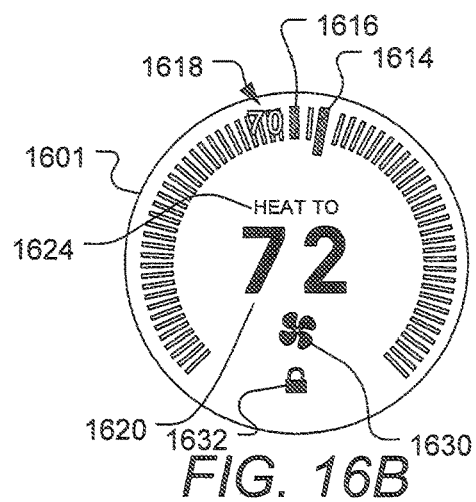
Figure 16C:
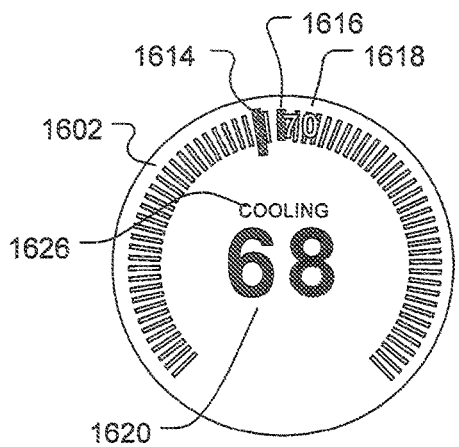
Figure 16D:
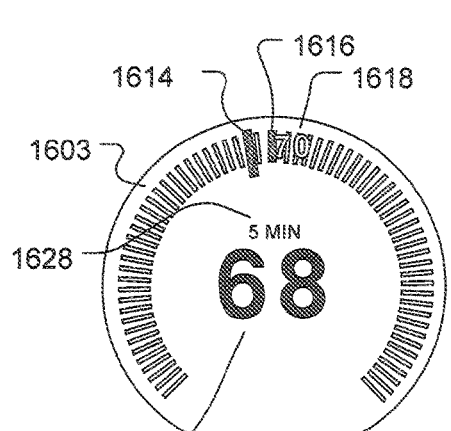
Figure 16E:
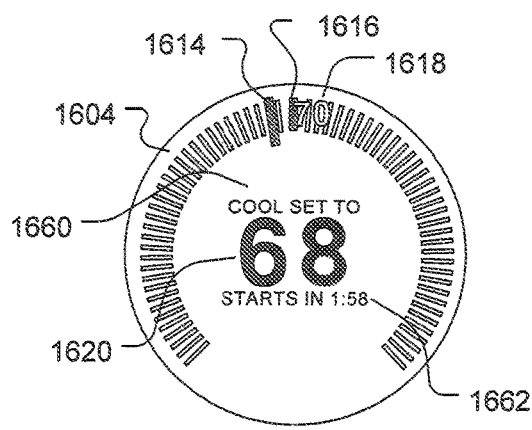
Figure 16F:
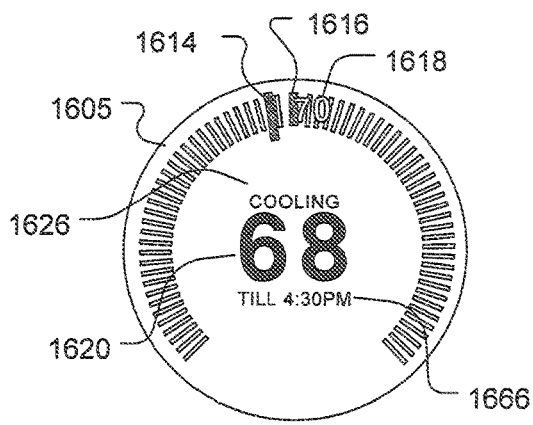

According to some embodiments, a time-to-target temperature display 1622 is used to indicate the estimated time needed to reach the current setpoint, as is described more fully co-pending commonly assigned patent application U.S. Ser. No. 12/984,602. FIG. 16B shows a screen 1601, which displays a "HEAT TO" message 1624 indicating that the HVAC system is in heating mode, although currently is not active ("HEATING" will be displayed when the HVAC system is active). According to some embodiments, the background color of screen 1601 is a neutral color such as black. A fan logo 1630 can be displayed indicating the fan is active without any associated heating or cooling. Further, a lock icon 1632 can be displayed when the thermostat is locked. FIG. 16C shows a screen 1602 which has the message 1626 "COOLING" indicating that cooling is being called for, in addition to a background color such as blue. In this case, the message 1626 "COOLING" is displayed instead of the time-to-temp display since there may be low confidence in the time-to-temp number may (such as due to insufficient data for a more accurate estimation). In FIG. 16D, screen 1603 shows an example similar to screen 1602, but with the time-to-temp 1628 displayed instead of message 1626, indicating that there is a higher confidence in the time-to-temp estimation. Note that the background color of screen 1602 and 1603 are bluish so as to indicate HVAC cooling is active, although the color may be partially muted or partially transparent since the current setpoint temperature and current ambient temperature is relatively close. Thus, features such as background-color intensity, texture, etc. may be adjusted to reflect a difference between a setpoint temperature and current ambient temperature, energy required to maintain an absolute setpoint temperature, etc.

Figure 16G:
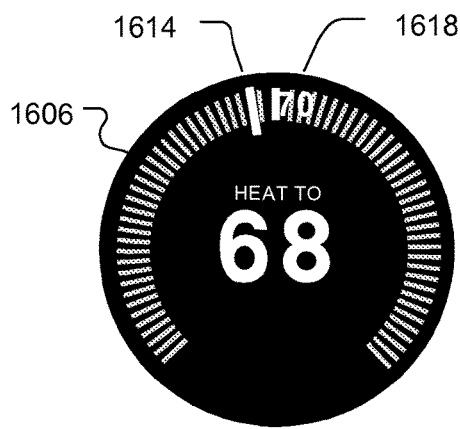
Figure 16H:
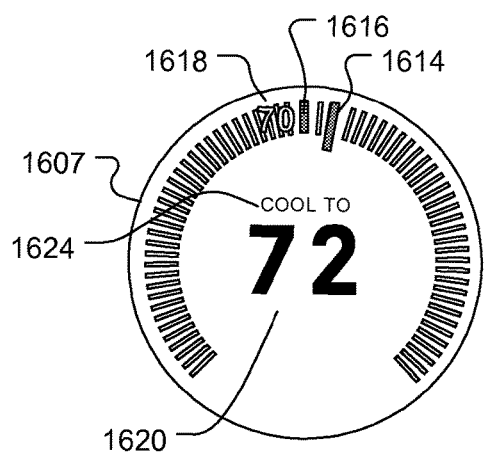

FIG. 16G shows an example screen 1606 in which a message "HEAT TO" is displayed, which indicates that the thermostat 300 is in heating mode but that the heating system is not currently active (i.e., heat is not being called for by the thermostat). In this example, the current temperature, 70 degrees F., is already higher than the setpoint of 68 degrees F., so an active heating call is not necessary. Note that screen 1606 is shown with a black background with white characters and graphics, to show an example of the preferred color scheme. FIG. 16H shows an example screen 1607 in which a message 1624 "COOL TO" is displayed, which indicates that the cooling system is in cooling mode but is not currently active (i.e. cooling is not being called for by the thermostat). In this example, the current temperature, 70 degrees F., is already lower than the setpoint of 68 degrees F., so an active cooling call is not necessary. This case is analogous to FIG. 16G except that the system is in cooling mode.

Figure 16I:
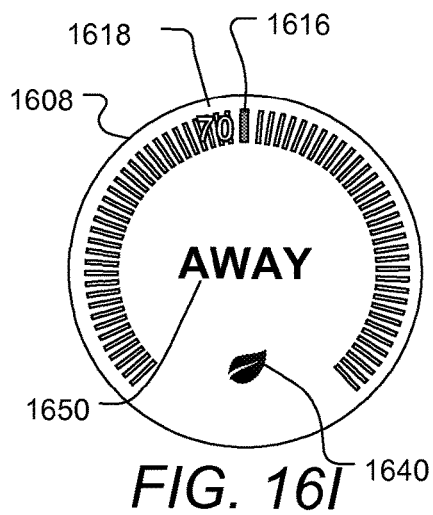

FIG. 16I shows an example screen 1608 where the thermostat has manually been set to "AWAY" mode (e.g., the user has walked up to the thermostat dial and invoked an "AWAY" state using user interface features to be described further infra), which can be performed by the user when a period of expected non-occupancy is about to occur. The display 1608 includes a large "AWAY" icon or text indicator 1650 along with a leaf icon 1640. Note that the current temperature numerals 1618 and tick mark 1616 continue to be displayed. During the away mode, the thermostat uses an energy-saving setpoint according to default or user-input values.

According to some embodiments, if the user manually initiates an "away" mode (as opposed to the thermostat automatically detecting non-occupancy) then the thermostat will only come out of "away" mode by an explicit manual user input, such as by manually using the user interface. In other words, when manual "away" mode is activated by the user, then the thermostat will not use "auto arrival" to return to standard operation, but rather the user must manually establish his/her re-arrival. In contrast, when the thermostat has automatically entered into an away state based on occupancy sensor data that indicates non-occupancy for a certain period of time (see FIG. 16J and accompanying text below), then the thermostat will exit the "away" state based on either of (i) occupancy sensor data indicating that occupants have returned, or (ii) an explicit manual user input.

Figure 16J:
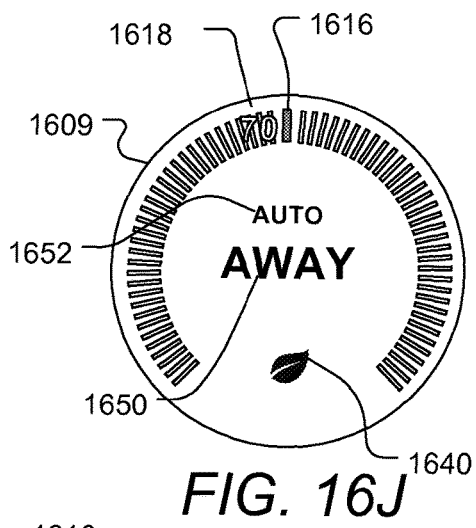

FIG. 16J shows an example screen 1609 where the thermostat has automatically entered into an "AWAY" mode (referred to as "AUTO AWAY" mode), as indicated by the message 1652 and icon 1650, based on an automatically sensed state of non-occupancy for a certain period of time. Note that according to some embodiments, the leaf icon 1640 is always displayed during away modes (auto or manual) to indicate that the away modes are energy-saving modes. Such display of leaf icon 1640 has been found advantageous at this point, because it is reassuring to the user that something green, something good, something positive and beneficial, is going on in terms of energy-savings by virtue of the "away" display. According to some embodiments, the leaf icon 1640 is also displayed when the thermostat is in an "OFF" mode, such as shown in example screen 1610 in FIG. 16K, because energy is inherently being saved through non-use of the HVAC system. Notably, the "OFF" mode is actually one of the working, operational modes of the thermostat 300, and is to be distinguished from a non-operational or "dead" state of the thermostat 300.

Figure 16K:
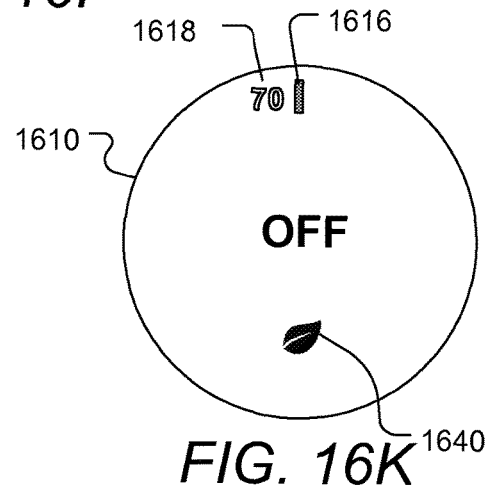

In the "OFF" mode, the thermostat 300 will still acquire sensor data, communicate wirelessly with a central server, and so forth, but will simply not send heating or cooling calls (or other operating calls such as humidification or dehumidification) to the HVAC system. The "OFF" mode can be invoked responsive to an explicit menu selection by the user, either through the rotatable ring 312, or from a network command received via the Wi-Fi capability from a cloud-based server that provides a web browser screen or smartphone user interface to the user and receives an OFF command thereby. As illustrated in FIG. 16K, the current temperature numerals 1618 and current temperature tick mark 1616 are preferably displayed along with the leaf 1640 when the thermostat is in "OFF" mode. In alternative embodiments, background tick marks can also be displayed in "OFF" mode.

According to a preferred embodiment, all of the operational screens of the thermostat 300 described herein that correspond to normal everyday operations, such as the screens of FIGS. 16A-16K, will actually only appear when the proximity sensor 370A (see FIG. 3A, supra) indicates the presence of a user or occupant in relatively close proximity (e.g., 50 cm-200 cm or closer) to the thermostat 300, and the electronic display 316 will otherwise be dark. While the user is proximal to the thermostat 300 the electronic display 316 will remain active, and when the user walks away out of proximity the electronic display 316 will remain active for a predetermined period of time, such as 20 seconds, and then will go dark.

In contrast to an alternative of keeping the electronic display 316 active all of the time, this selective turn-on and turn-off of the electronic display has been found to be a preferable method of operation for several reasons, including the savings of electrical power that would otherwise be needed for an always-on electronic display 316, extension of the hardware life of the electronic display 316, and also aesthetic reasons for domestic installations. These advantages are further detailed, e.g., in commonly assigned U.S. Ser. No. 13/269,501. The screens of FIGS. 16A-16K can be considered as the "main" display for thermostat 300 in that these are the screens that are most often shown to the user as they walk up to the thermostat 300 in correspondence with normal everyday operation.

Figure 17A:
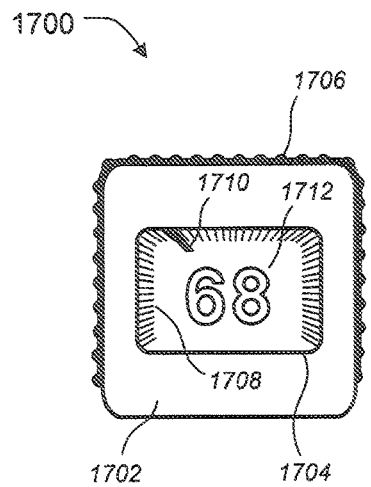
FIGS. 17A-17B illustrate a thermostat having a user-friendly interface, according to some embodiments.
Figure 17B:
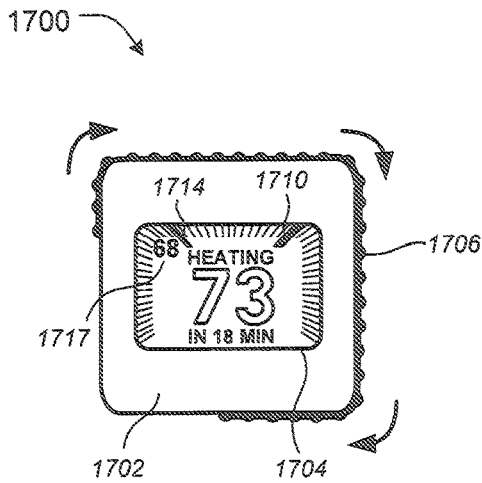

FIGS. 17A-17B illustrate a thermostat 1700 according to an alternative embodiment having a different form factor that, while not believed to be quite as advantageous and/or elegant as the circular form factors of one or more previously described embodiments, is nevertheless indeed within the scope of the present teachings. Thermostat 1700 comprises a body 1702 having a generally rounded-square or rounded-rectangular shape. An electronic display 1704 which is of a rectangular or rounded-rectangular shape is centrally positioned relative to the body 1702. A belt-style rotatable ring 1706 is provided around a periphery of the body 1702. As illustrated in FIGS. 17A-17B, it is not required that the belt-style rotatable ring 1706 extend around the centrally located electronic display 1704 by a full 360 degrees of subtended arc, although it is preferable that it extend for at least 180 degrees therearound so that it can be conveniently contacted by the thumb on one side and one or more fingers on the other side and slidably rotated around the centrally located electronic display 1704. The body 1702 can be mounted on a backplate (not shown) and configured to provide an inward click capability when the user's hand presses inwardly on or near the belt-style rotatable ring 1706.

Illustrated on the electronic display 1704 is a population of background tick marks 1708 arcuately arranged within a range area on the electronic display 1704. Although not circular in their distribution, the background tick marks 1708 are arcuately arranged in that they subtend an arc from one angular location to another angular location relative to a center of the electronic display 1704. The particular arcuate arrangement of the background tick marks can be termed a rectangular arcuate arrangement, analogous to the way the minutewise tick marks of a rectangular or square clockface can be termed a rectangular arcuate arrangement. It is to be appreciated that the arcuate arrangement of tick marks can correspond to any of a variety of closed or semi-closed shapes without departing from the scope of the present teachings, including circular shapes, oval shapes, triangular shapes, rectangular shapes, pentagonal shapes, hexagonal shapes, and so forth. In alternative embodiments (not shown) the arrangement of background tick marks can be linear or quasi-linear, simply extending from left to right or bottom to top of the electronic display or in some other linear direction, wherein an arc is subtended between a first line extending from a reference point (such as the bottom center or center right side of the display) to the beginning of the range, and a second line extending from the reference point to the end of the tick mark range. A setpoint tick mark 1710 is displayed in a manner that is more visible to the user than the background tick marks 1708, and a numerical setpoint representation 1712 is prominently displayed in the center of the electronic display 1704.

As illustrated in FIGS. 17A-17B, the user can perform a ring rotation to change the setpoint, with FIG. 17B showing a new setpoint of 73 degrees along with a shift in the setpoint tick mark 1710 to a different arc location representative of the higher setpoint, and with a current temperature tick mark 1714 and current temperature numerical display 1716 appearing as shown. As with other embodiments, there is preferably a "sweeping" visual display of tick marks (not illustrated in FIGS. 17A-17B) that sweeps from the current temperature tick mark 1714 to the setpoint temperature tick mark 1710, analogous to the tick mark sweep shown in FIG. 15, supra.

With the exception of the differently implemented ring rotation facility and the changing of various display layouts to conform to the rectangular electronic display screen 1704, operation of the thermostat 1700 is preferably similar to that of the circularly-shaped thermostat embodiments described supra. Thus, by way of non-limiting example, the thermostat 1700 is configured to provide a menu options screen (not shown) on electronic display 1704 that contains menu options such as Heat/Cool, Schedule, Energy, Settings, Away, and Done, as described above, responsive to rotation of the belt-style rotatable ring 1706, with the exception that instead of the electronically displayed words moving around in a circular trajectory, those words move around in a rectangular trajectory along the periphery of the electronic display 1704.

Figure 18A:
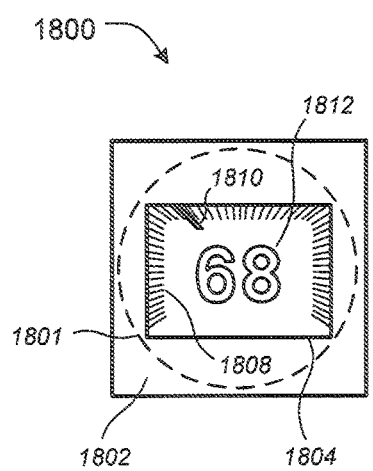
FIGS. 18A-18B illustrate a thermostat having a user-friendly interface, according to some embodiments.
Figure 18B:
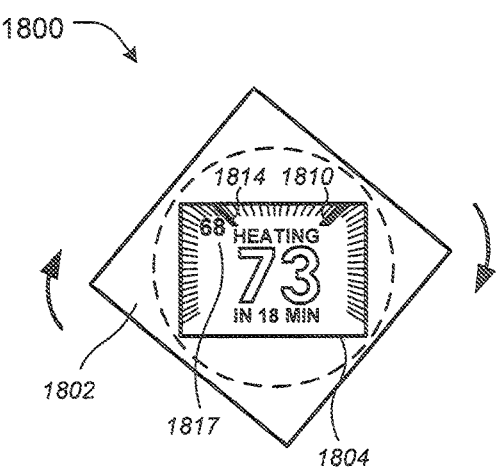

FIGS. 18A-18B illustrate a thermostat 1800 according to another alternative embodiment likewise having a different form factor that, while not believed to be quite as advantageous and/or elegant as the circular form factor, is nevertheless indeed within the scope of the present teachings. Thermostat 1800 comprises a body 1802 having a square or rectangular shape, and further comprises a rectangular electronic display 1804 that is centrally positioned relative to the body 1802. The body 1802 and electronic display 1804 are configured, such as by virtue of appropriate mechanical couplings to a common underlying support structure 1802, such that the body 1802 is manually rotatable by the user while the electronic display 1804 remains at a fixed horizontal angle, and further such that the body 1802 can be inwardly pressed by the user to achieve an inward click input, whereby the body 1802 itself forms and constitutes an inwardly pressable ring that is rotatable relative to an outwardly extending axis of rotation.

With the exception of the different form factor assumed by the rotating ring/body 1802 and altered display layouts to conform to the rectangular electronic display screen 1804, operation of the thermostat 1800 is preferably similar to that of the circularly-shaped thermostat embodiments described supra. Background tick marks 1808, setpoint tick mark 1810, current temperature tick mark 1814, numerical current setpoint 1812, and numerical current setpoint 1816 appear and function similarly to their counterpart numbered elements 1708, 1710, 1714, 1712, and 1716 of FIGS. 17A-17B responsive to ring rotations and inward clicks. It is to be appreciated that the square or rectangular form factor of the body/rotatable ring 1802 and/or electronic display 1804 can be selected and/or and mixed-and-matched from among a variety of different shapes without departing from the scope of the present teachings, including circular shapes, oval shapes, triangular shapes, pentagonal shapes, hexagonal shapes, and so forth.

Although the foregoing has been described in some detail for purposes of clarity, it will be apparent that certain changes and modifications may be made without departing from the principles thereof. By way of example, the front face of the thermostat 110/900 is set forth in one or more embodiments supra as being a solid lens that tends to magnify the information being displayed in the underlying electronic display. The solid lens element furthermore provides a hard, solid surface that allows the user to treat the overall cap-like structure as a single, unitary input button for providing the inward click in many embodiments, such that the user does not need to press only on the outer ring but can also press anywhere on the interior as well to achieve an inward click input. Notably, however, the scope of the present teachings is not so limited. In alternative embodiments, this thicker lens may be omitted in favor of a thinner covering and the underlying electronic display can comprise a touch screen display to allow a user to directly interact with the monitor. In other alternative embodiments, the outer ring is itself a touch screen or touch-sensitive surface, such that it may be virtually rotated by a user's finger movement. The display within the ring can include or omit touch-detection capabilities without departing from the scope of the present teachings. In one instance, an outer ring may be a physically rotatable ring, and a display presented in a middle aperture inside the ring may be a touch screen such that, for example, the user may select a type of variable to be set using the touch-screen display and then select a particular value for the variable using the outer ring. By way of further example, while rotation of the outer ring of the thermostat 110/900 is set forth in one or more embodiments supra as being detected optically based on a textured inner surface of the ring (using technology similar to that using in optical mice), the scope of the present teachings is not so limited. For example, the outer ring may be coupled to a disk, the disk having a plurality of holes, whose movement can be detected optically by optical sources and detectors placed on opposite sides. As another example, the outer ring may include a magnet at a fixed location. By detecting the angular location of the magnet over time (e.g., using fixed sensors), a mechanical rotation of the ring may be determined. As another example, the outer ring may include a plurality of mechanical catches, and a fixed switch or other mechanical sensor may count a number of contacts with the mechanical catches and estimate the mechanical rotation of the ring. By way of further example, while there are indeed many advantages of using an outer ring that is a continuous without fiducial markers, it is not necessarily outside the scope of the present teachings for the outer ring to be provided with some fiducial markers, or for the outer ring to be replaced by some other arc-shaped or linear component having equivalent functionality and advantages.

By way of further example, it is within the scope of the present teachings for the rotatable ring of the above-described thermostat to be provided in a "virtual," "static," or "solid state" form instead of a mechanical form, whereby the outer periphery of the thermostat body contains a touch-sensitive material similar to that used on touchpad computing displays and smartphone displays. For such embodiments, the manipulation by the user's hand would be a "swipe" across the touch-sensitive material, rather than a literal rotation of a mechanical ring, the user's fingers sliding around the periphery but not actually causing mechanical movement. This form of user input, which could be termed a "virtual ring rotation," "static ring rotation", "solid state ring rotation", or a "rotational swipe", would otherwise have the same purpose and effect of the above-described mechanical rotations, but would obviate the need for a mechanical ring on the device. Although not believed to be as desirable as a mechanically rotatable ring insofar as there may be a lesser amount of tactile satisfaction on the part of the user, such embodiments may be advantageous for reasons such as reduced fabrication cost.

By way of further example, it is within the scope of the present teachings for the inward mechanical pressability or "inward click" functionality of the rotatable ring to be provided in a "virtual" or "solid state" form instead of a mechanical form, whereby an inward pressing effort by the user's hand or fingers is detected using internal solid state sensors (for example, solid state piezoelectric transducers) coupled to the outer body of the thermostat. For such embodiments, the inward pressing by the user's hand or fingers would not cause actual inward movement of the front face of the thermostat as with the above-described embodiments, but would otherwise have the same purpose and effect as the above-described "inward clicks" of the rotatable ring. Optionally, an audible beep or clicking sound can be provided from an internal speaker or other sound transducer, to provide feedback that the user has sufficiently pressed inward on the rotatable ring or virtual/solid state rotatable ring. Although not believed to be as desirable as the previously described embodiments, whose inwardly moving rotatable ring and sheet-metal style rebounding mechanical "click" has been found to be particularly satisfying to users, such embodiments may be advantageous for reasons including reduced fabrication cost. It is likewise within the scope of the present teachings for the described thermostat to provide both the ring rotations and inward clicks in "virtual" or "solid state" form, whereby the overall device could be provided in fully solid state form with no moving parts at all.

By way of further example, although described above as having ring rotations and inward clicks as the exclusive user input modalities, which has been found particularly advantageous in terms of device elegance and simplicity, it is nevertheless within the scope of the present teachings to alternatively provide the described thermostat with an additional button, such as a "back" button. In one option, the "back" button could be provided on the side of the device, such as described in the commonly assigned U.S. Ser. No. 13/033,573, supra. In other embodiments, plural additional buttons, such as a "menu" button and so forth, could be provided on the side of the device. For one embodiment, the actuation of the additional buttons would be fully optional on the part of the user, that is, the device could still be fully controlled using only the ring rotations and inward clicks. However, for users that really want to use the "menu" and "back" buttons because of the habits they may have formed with other computing devices such as smartphones and the like, the device would accommodate and respond accordingly to such "menu" and "back" button inputs.

By way of even further example, other forms of user input modalities could be provided by the above-described thermostat as additions and/or alternative to the above-described ring rotations and inward clicks without necessarily departing from the scope of the present teachings. Examples include optically sensed gesture-based user inputs similar to those provided with modern video game consoles, and voice inputs implemented using known speech recognition algorithms. It is to be appreciated that there are many alternative ways of implementing both the processes and apparatuses described herein. Accordingly, the present embodiments are to be considered as illustrative and not restrictive, and the inventive body of work is not to be limited to the details given herein, which may be modified within the scope and equivalents of the appended claims.

What is claimed is:

1. A computer implemented method comprising:
displaying, on an electronic display of a thermostat device, a plurality of tick marks in a tick mark range area, wherein the plurality of tick marks includes a plurality of background tick marks representing a plurality of temperatures, a prominent ambient tick mark representing an ambient temperature, and a prominent setpoint tick mark representing a setpoint temperature;
displaying a background color on the electronic display, wherein the displayed background color varies according to a type of call in effect, and wherein the type of call includes a heating call and a cooling call;
receiving input corresponding to a selection of a new setpoint temperature;
updating the prominent setpoint tick mark to represent the new setpoint temperature;
determining the type of call in effect;
updating the electronic display according to the new setpoint temperature, wherein updating includes displaying an animated sweep highlighting one or more tickmarks sequentially along the tick mark range area between the prominent ambient tick mark and the updated prominent setpoint tick mark, said animated tick sweep further characterized by a respective sequential unhighlighting of tick marks previously highlighted along the tick mark range area as subsequent tick marks are highlighted; and
concurrently displaying one or more background colors according to the type of call in effect.

2. The computer implemented method of claim 1, wherein updating the prominent setpoint tick mark to represent the new setpoint temperature comprises moving the prominent setpoint tick mark from a first setpoint tick mark representative of the setpoint temperature to a second setpoint tick mark representative of the new setpoint temperature.

3. The computer implemented method of claim 1, further comprising displaying a gradual decrease in intensity of the one or more background colors as a difference between the ambient temperature and the new setpoint temperature decreases.

4. The computer implemented method of claim 1, further comprising displaying a representation of an estimated time for the ambient temperature to reach the new setpoint temperature.

5. The computer implemented method of claim 1, further comprising displaying a numerical representation of the ambient temperature in close proximity to the prominent ambient temperature tick mark.

6. The computer implemented method of claim 1, wherein the tick mark range area is displayed along a circular outer area of the electronic display.

7. The computer implemented method of claim 1, further comprising:
displaying, on the electronic display, a plurality of user-selectable menu options arranged in an arcuate arrangement along a menu option range area; and
selectively highlighting respective ones of the plurality of menu options responsive to received input.

8. A computer implemented system, comprising:
one or more processors;
one or more non transitory computer readable storage mediums containing instructions configured to cause the one or more processors to perform operations including:
displaying, on an electronic display of a thermostat device, a plurality of tick marks in a tick mark range area, wherein the plurality of tick marks includes a plurality of background tick marks representing a plurality of temperatures, a prominent ambient tick mark representing an ambient temperature, and a prominent setpoint tick mark representing a setpoint temperature;
displaying a background color on the electronic display, wherein the displayed background color varies according to a type of call in effect, and wherein the type of call includes a heating call and a cooling call;
receiving input corresponding to a selection of a new setpoint temperature;
updating the prominent setpoint tick mark to represent the new setpoint temperature;
determining the type of call in effect;
updating the electronic display according to the new setpoint temperature, wherein updating includes displaying an animated sweep highlighting one or more tickmarks sequentially along the tick mark range area between the prominent ambient tick mark and the updated prominent setpoint tick mark, said animated tick sweep further characterized by a respective sequential unhighlighting of tick marks previously highlighted along the tick mark range area as subsequent tick marks are highlighted; and
concurrently displaying one or more background colors according to the type of call in effect.

9. The system of claim 8, wherein updating the prominent setpoint tick mark to represent the new setpoint temperature comprises moving the prominent setpoint tick mark from a first setpoint tick mark representative of the setpoint temperature to a second setpoint tick mark representative of the new setpoint temperature.

10. The system of claim 8, wherein the operations further include displaying a gradual decrease in intensity of the one or more background colors as a difference between the ambient temperature and the new setpoint temperature decreases.

11. The system of claim 8, wherein the operations further include displaying a representation of an estimated time for the ambient temperature to reach the new setpoint temperature.

12. The system of claim 8, wherein the operations further include displaying a numerical representation of the ambient temperature in close proximity to the prominent ambient temperature tick mark.

13. The system of claim 8, wherein the tick mark range area is displayed along a circular outer area of the electronic display.

14. The system of claim 8, wherein the operations further include:
displaying, on the electronic display, a plurality of user-selectable menu options arranged in an arcuate arrangement along a menu option range area; and
selectively highlighting respective ones of the plurality of menu options responsive to received input.

15. A computer-program product, tangibly embodied in a non transitory machine readable storage medium, including instructions configured to cause a data processing apparatus to:

display, on an electronic display of a thermostat device, a plurality of tick marks in a tick mark range area, wherein the plurality of tick marks includes a plurality of background tick marks representing a plurality of temperatures, a prominent ambient tick mark representing an ambient temperature, and a prominent setpoint tick mark representing a setpoint temperature;

display a background color on the electronic display, wherein the displayed background color varies according to a type of call in effect, and wherein the type of call includes a heating call and a cooling call;

receive input corresponding to a selection of a new setpoint temperature;

update the prominent setpoint tick mark to represent the new setpoint temperature;

determine the type of call in effect;

update the electronic display according to the new setpoint temperature, wherein updating includes displaying an animated sweep highlighting one or more tickmarks sequentially along the tick mark range area between the prominent ambient tick mark and the updated prominent setpoint tick mark, said animated tick sweep further characterized by a respective sequential unhighlighting of tick marks previously highlighted along the tick mark range area as subsequent tick marks are highlighted; and concurrently display one or more background colors according to the type of call in effect.

16. The computer-program product of claim 15, wherein updating the prominent setpoint tick mark to represent the new setpoint temperature comprises moving the prominent setpoint tick mark from a first setpoint tick mark representative of the setpoint temperature to a second setpoint tick mark representative of the new setpoint temperature.

17. The computer-program product of claim 15, wherein the instructions further cause the data processing apparatus to display a gradual decrease in intensity of the one or more background colors as a difference between the ambient temperature and the new setpoint temperature decreases.

18. The computer-program product of claim 15, wherein the instructions further cause the data processing apparatus to display a representation of an estimated time for the ambient temperature to reach the new setpoint temperature.

19. The computer-program product of claim 15, wherein the instructions further cause the data processing apparatus to display a numerical representation of the ambient temperature in close proximity to the prominent ambient temperature tick mark.

20. The computer-program product of claim 15, wherein the tick mark range area is displayed along a circular outer area of the electronic display.

\* \* \* \* \*